United States Patent [19]

Hanratty

[11] Patent Number: 5,990,897
[45] Date of Patent: Nov. 23, 1999

[54] METHODS FOR AUTOMATICALLY GENERATING A THREE-DIMENSIONAL GEOMETRIC SOLID FROM TWO-DIMENSIONAL VIEW SETS INCLUDING AUTOMATIC SEGREGATION OF OPEN, CLOSED AND DISJOINT CURVES INTO VIEWS USING THEIR CENTER OF GRAVITY

[76] Inventor: Patrick J. Hanratty, 2560 Liveoak Dr., Prescott, Ariz. 86301

[21] Appl. No.: 08/928,831

[22] Filed: Sep. 12, 1997

[51] Int. Cl.⁶ ............ G06T 15/10; G06T 15/00; G06K 9/52
[52] U.S. Cl. ............ 345/420; 345/427; 382/288
[58] Field of Search ............... 345/420, 427; 382/288

[56] References Cited

U.S. PATENT DOCUMENTS

| | | | |
|---|---|---|---|
| 4,858,150 | 8/1989 | Aizawa et al. | 345/420 |
| 4,888,711 | 12/1989 | Nguyen | 345/420 |
| 5,363,476 | 11/1994 | Kurashige et al. | 345/425 |
| 5,428,715 | 6/1995 | Suzuki | 345/419 |
| 5,511,153 | 4/1996 | Azarbayejani et al. | 345/419 |
| 5,561,748 | 10/1996 | Niu et al. | 345/420 |
| 5,587,913 | 12/1996 | Abrams et al. | 364/468.26 |
| 5,663,883 | 9/1997 | Thomas et al. | 364/474.24 |
| 5,671,343 | 9/1997 | Kondo et al. | 345/419 |
| 5,745,117 | 4/1998 | Masuda et al. | 345/420 |
| 5,821,941 | 10/1998 | Millstein | 345/420 |
| 5,883,630 | 3/1999 | O'Donnell et al. | 345/420 |

OTHER PUBLICATIONS

Ganesan, R. et al. "FlexiCAD: an Architecture for Integrated Product Modeling and Manufacture by Features", Proceedings of the Fourth International Conference on Computer Integrated Manufacturing and Automation Technology, pp. 60–5, Oct. 12, 1994.

Anonymous. "Method for Generation of Solid Models by Sweeping Regions in an Orthographic View", International Buisness Machines Technical Disclosure Bulletin, vol. 37, No. 8, pp. 439–40, Aug. 1994.

Sundaramurthy Vijayashree et al. "Reconstruction of 3–D CAD Models from 2–D Orthographic Views", Proceedings, International Conference on CAD, CAM, Robotics and Autonomous Factories held in New Delhi, ISBN 0074621742, pp. 71–80, Dec. 1993.

Bin, Ho. "Inputting Constructive Solid Geometry Representations Directly from 2–D Orthographic Views", Computer Aided Design, vol. 18, No. 3, pp. 147–55, ISSN 0010–4485, Apr. 1986.

Sakurai, Hiroshi and Gossard, David C. "Solid Model Input through Orthographic Views", in Computer Graphics (Magazine), published by the Association for Computing Machinery, vol. 17, No. 3, pp. 243–252, Jul. 1983.

Aldefeld, B. "On automatic Recognition of 3–D Structures from 2–D Representations", Computer –Aided Design, vol. 15, No. 2, pp. 59–64, Mar. 1983.

(List continued on next page.)

*Primary Examiner*—Mark R. Powell
*Assistant Examiner*—Jeffrey Allen Rossi
*Attorney, Agent, or Firm*—Snell & Wilmer L.L.P.; Daniel R. Pote, ESQ

[57] ABSTRACT

Techniques are developed for defining an engine which has as its input two-dimensional drawing views, wherein the engine produces a three-dimensional geometric solid. The engine comprises, among other things, a set of rules for identifying particular elements within the various two-dimensional views, and for determining the useful relationships between elements (e.g., arcs, lines, and the like) in one view vis-a-vis related elements in another view, to thereby ascertain the three-dimensional form defined by these elements and their corresponding relations to other elements.

21 Claims, 65 Drawing Sheets

OTHER PUBLICATIONS

Tomiyama, Ken and Nakaniwa, Ken'ichi. "Reconstruction of 3D Solid Model from Three Orthographic Views– Top–down Approach", 1st Graphics Recognition International Workshop, printed in Lecture Notes in Computer Science, Issue 1072, pp. 260–269, Aug. 1995.

Chen, Zen and Pernd, Der–Baau. "Automatic Recognition of 3D Solid Objects from 2D Orthographic Views", Pattern Recognition, v. 21, No. 5, pp. 439–449, Oct. 1988.

Harada, Tsuyoshi and Fumihiko, Kimura. "Solid Model Input System Based on Orthographic Views", Joho Shori Gakkai Kenkyu Hokoku, v. 87, No. 56, pp. 15–22 (in Japanese, as indexed by Japan Science and Technical Corp.), 1987.

Harada, Tsuyoshi and Fumihiko, Kimura. "Solid Model Input System Based on Orthographic Views" (English Translation), Joho Shori Gakkai Kenkyu Hokoku, v. 87, No. 56, pp. 15–22, translated by Schreiber Translations, Inc., pp. 1–19, Jan. 1999.

Kaneko, Yoichiro et al. "3D Solid Model Reconstruction from Three Orthographic Views.", Joho Shori Gakkai Zenkoku Taikai Koen Ronbunshu, v. 50, No. 2, pp. 2.411–2.412 (in Japanese, indexed by Japan Science and Technical Corp., Japan), 1995.

Kaneko, Yoichiro et al. "3D Solid Model Reconstruction from Three Orthographic Views (in English)", Joho Shori Gakkai Zenkoku Taikai Koen Ronbunshu (Proc. 50th Nat'l Conf. of Information Processing Society, Japan), v. 50, n. 2, pp. 2.411–2.412, trans. by United States Patent and Trademark Office,Washington DC, Jan. 1999.

Katajima, Katsuhiro and Tasaka, Moriyasu. "A Method to Reconstruct a CSG Solid Model from a Set of Orthographic Three Views", Trans. of the Institute of Electronics, Information, and Communications Engineers, v. J75D–II, n. 9, pp. 1526–38 (Japan), Sep. 1992.

Katajima, Katsuhiro and Tasaka, Moriyasu. "A Method to Reconstruct a CSG Solid Model from a Set of Orthographic Three Views (in English)", Trans. of the Institute of Electronics, Information, and Communications Engineers, v. J75D–II, No. 9, pp. 1526–38 (translated by Schreiber, Inc. Washington DC), Jan. 1999.

Shibamiya, Tohru et al. "Automatic Reconstruction of 3D Solid Model from Three Orthographic Views", Joho Shori Gakkai Kenkyu Hokoku, v.93, n.62, pp. 91–98 (in Japanese, as indexed by Japan Science and Technical Corp.),1993.

Shibamiya, Tohru et al. "Automatic Reconstruction of 3D Solid Model from Three Orthographic Views", Joho Shori Gakkai Kenkyu Hokoku, v.93, n.62, pp. 91–98 translation by Diplomatic Language Services, Inc., Washington DC, Jan. 1999.

"Make It 3D1.0 2D Multi–view Drawings to 3D", Reference Manual and Tutorial, EMT Software, Inc., Dec. 1995 pp. 1–90.

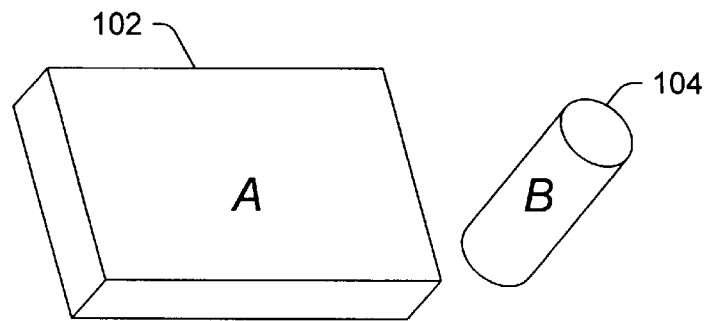
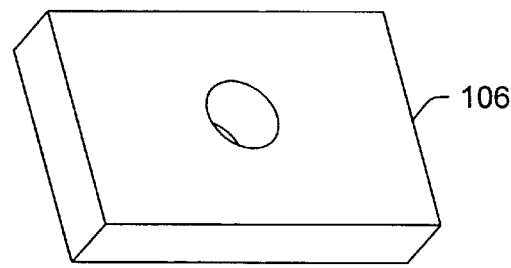
A-B
(Difference)
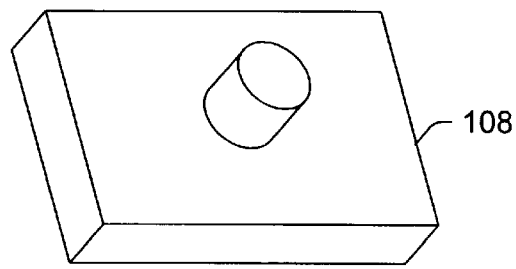
A+B
(Union)
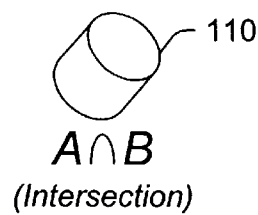
A∩B
(Intersection)
*Fig. 1A*

| VIEW SET COUNT |
|---|
| VIEW SET 1 IDENTIFIER |
| VIEW SET 2 IDENTIFIER |
| . |
| . |
| . |
| VIEW SET n IDENTIFIER |

STRUCTURE 1A
(VIEW CLUSTER)

| CURVE COUNT |
|---|
| CURVE 1 IDENTIFIER |
| CURVE 2 IDENTIFIER |
| . |
| . |
| . |
| CURVE n IDENTIFIER |

STRUCTURE 1B
(VIEW SET and
VIEW SET BOUNDARIES)

*Fig. 5C*

| Count of Curves in Structure (nC) |
|---|
| Curve Identifier 1 (Axis for Type 2 only) |
| Curve Identifier 2 |
| . . . |
| Curve Identifier nC |

STRUCTURE 5A
(CURVE IDENTIFIERS)
Axial and Rotational

| Count of Segments in Structure (nS) |
|---|
| Closed Count (n) in Segment 1<br>Curve 1 ID, Curve 2 ID,...,Curve n ID<br>View 2 Horizontal Line ID |
| Closed Count (n) in Segment 2<br>Curve 1 ID, Curve 2 ID,...,Curve n ID<br>View 2 Horizontal Line ID |
| . . . |
| Closed Count (n) in Segment nS<br>Curve 1 ID, Curve 2 ID,...,Curve n ID<br>View 2 Horizontal Line ID |

STRUCTURE 5B
(CURVE IDENTIFIERS)
Smooth Blended      1822

| Number of ATOMS (nA) |       1824 |
|---|---|
| Identifier to curves for Atom 1<br>BOOLEAN key:1=>Union, 2=>Difference, 3=>Intersection<br>Work View number<br>Solid Type:1=>Axial Sweep, 2=>Rotational Sweep, 3=>Smooth Blended<br>ZTOP for Atom 1, ZBOTTOM for Atom 1<br>ZTOP Blend Radius for Atom 1, ZBOTTOM Blend Radius for Atom 1 | 1826A |
| Identifier to curves for Atom 2<br>BOOLEAN key:1=>Union, 2=>Difference, 3=>Intersection<br>Work View number<br>Solid Type:1=>Axial Sweep, 2=>Rotational Sweep, 3=>Smooth Blended<br>ZTOP for Atom 2, ZBOTTOM for Atom 2<br>ZTOP Blend Radius for Atom 2, ZBOTTOM Blend Radius for Atom 2 | 1826B |
| . . . | |
| Identifier to curves for Atom nA<br>BOOLEAN key:1=>Union, 2=>Difference, 3=>Intersection<br>Work View number<br>Solid Type:1=>Axial Sweep, 2=>Rotational Sweep, 3=>Smooth Blended<br>ZTOP for Atom nA, ZBOTTOM for Atom nA<br>ZTOP Blend Radius for Atom nA ZBOTTOM Blend Radius for Atom nA | 1826n |

STRUCTURE 5C
(ATOM DEFINITIONS)

*Fig. 12B*

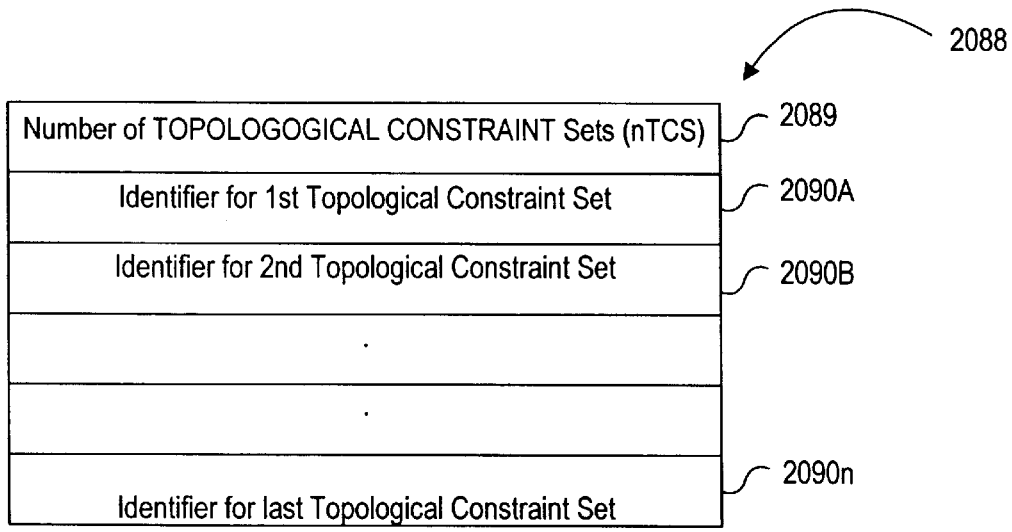
STRUCTURE 6A
(TOPOLOGICAL CONSTRAINT IDENTIFIERS)
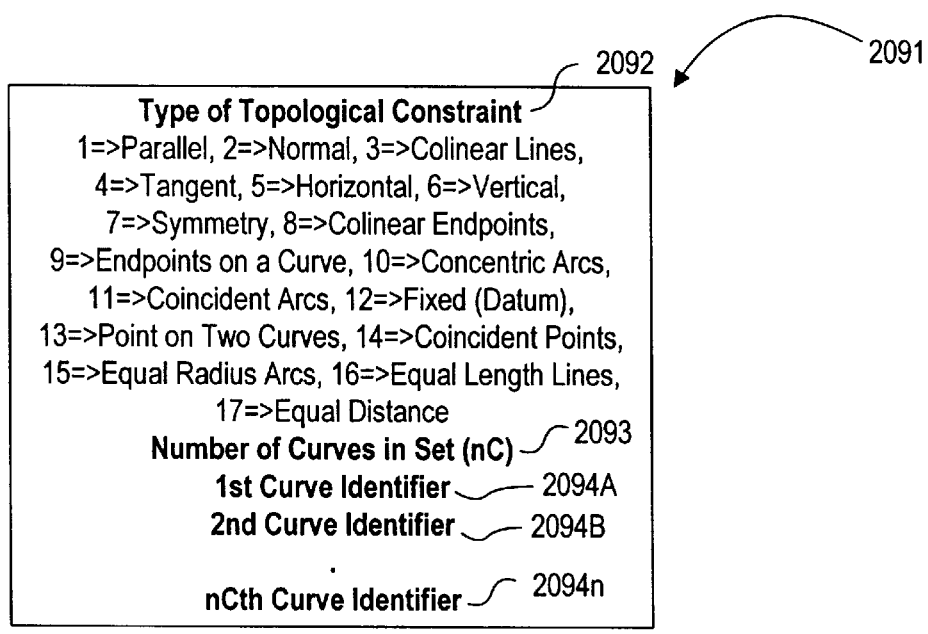
STRUCTURE 6B
(TOPOLOGICAL CONSTRAINT SET)
Fig. 13K

METHODS FOR AUTOMATICALLY GENERATING A THREE-DIMENSIONAL GEOMETRIC SOLID FROM TWO-DIMENSIONAL VIEW SETS INCLUDING AUTOMATIC SEGREGATION OF OPEN, CLOSED AND DISJOINT CURVES INTO VIEWS USING THEIR CENTER OF GRAVITY

TECHNICAL FIELD

The present invention relates, generally, to computer aided design/drafting (CADD) and computer aided manufacturing (CAM) systems and, more particularly, to a system for analyzing the information associated with a plurality of two-dimensional views of an object to thereby generate a true, three-dimensional geometric solid.

BACKGROUND ART AND TECHNICAL PROBLEMS

The pervasiveness of CADD/CAM systems over the last thirty years has revolutionized the design and manufacturing industries worldwide. Specifically, the wide availability of advanced modeling tools since the early 1970's has enabled engineers and designers to design, modify, and fabricate three-dimensional objects quickly and economically. Toward this end, much emphasis has been placed on the manufacturing end of the process—i.e., the task of using three-dimensional design data to create prototypes, molds, and finished products via numeric control techniques (NC) and stereo lithography. The actual design and creation of three dimensional models, however, is in many respects problematic, and can best be understood in the context of the basic principles of three-dimensional design.

Solid modeling packages traditionally use one of two solid generation modes: constructive solid geometry (CSG), and boundary representation (B-REP). The CSG approach involves using the three main operations defined by George Boole (thus known as Boolean operations), namely: "union", "difference", and "intersection". These Boolean operations are applied to pairs of objects at a time. Thus, as is well known in the art, the union operation is used to add the volumes of two solids, the difference operation is used to subtract one volume from another, and the intersection operation is used to define a volume consisting only of the region in space occupied by both solids. For example, with reference to FIG. 1A, a cylindrical rod 104 and block 102 are shown along with the various solids that result from each of the three Boolean operations—i.e. difference (solid 106), union (solid 108), and intersection (solid 110).

In contrast, The B-REP approach represents a solid as a set of vertices, edges, and faces, wherein the faces completely enclose a volume. For example, referring now to FIG. 1B, a three-quarter cylinder 112 is represented by four surface elements: three planar surfaces (top face 114, bottom face 116, and front plane face 118) and one cylindrical surface 120. The topology of this solid can be represented using a linear graph 122 wherein the nodes of the graph represent the faces and the connections represent shared edges.

There are four primary methods of generating basic solids: axial sweeps, rotational sweeps, blended solids, and free-form solids. Axial sweeps are solids defined by the volume created by translation of a planar object axially through space. For example, a cylinder can be created through axial sweep of a circle. Rotational sweeps are solids defined by the volume created by rotation of a planar object through space around a line. Blended solids are solids defined by a series of closed curve sets, wherein either straight or smooth blends are used to transition between each successive curve. Free form solids are usually generated by fitting a dense set of points, or by meshing two orthogonal curve sets, to create a skin which encloses the volume. A fifth category, analytic solids, consists of boxes (right rectangular hexahedron), right cylindrical rods, cones, spheroids, and toroids. These solids are all special cases of the axial and rotational sweep.

Further information regarding these and other solid generation methods as used in a CADD/CAM environment can be found in a number of standard texts, for example: HANDBOOK OF SOLID MODELING (LaCourse ed., 1995) and Martti Mantyla, AN INTRODUCTION TO SOLID MODELING (1988). The contents of these texts are hereby incorporated by reference.

In addition to the references listed above, well-known subroutines and equations related to basic solid geometry can be found in a number of standard texts, for example: Korn & Korn, MATHEMATICAL HANDBOOK FOR SCIENTISTS AND ENGINEERS (1961); Gerald Farin, CURVES AND SURFACES FOR COMPUTER AIDED GEOMETRIC DESIGN (2d ed., 1990); Su Bu-Qing & Liu Ding-Yuan, COMPUTATIONAL GEOMETRY: CURVE AND SURFACE MODELING (1989); Peter Lancaster & Kestutis Salkaukas, CURVE AND SURFACE FITTING (1986); Tom Lyche and Larry L. Schumaker, MATHEMATICAL METHODS IN COMPUTER AIDED GEOMETRIC DESIGN (1989). These texts are hereby incorporated by reference.

Despite the extensive use of software-based systems for facilitating the design of articles of manufacture, existing software-based design tools generally focus on the development of a set of two-dimensional views, leaving it to the experience, intuition, and expertise of the machinist to create a three-dimensional object from the information set forth in a plurality of two-dimensional representations of the object.

Other presently known systems permit a designer to prepare a three-dimensional drawing in simulated three-dimensional space; however, the systems are typically cumbersome, and are neither intuitive, easy to learn, nor particularly user-friendly once learned. Moreover, such three-dimensional design packages do not adequately take into account the fact that most qualified designers are trained in a two-dimensional paradigm; that is, the engineering and design curricula extant today are built around various teaching and training models which, although mature and powerful, are unambiguously two-dimensional in focus and orientation.

At least one study has shown that approximately 70% of all three-dimensional CADD system users employ these systems in a two-dimensional mode—that is, they perform three-dimensional design by creating multiple two-dimensional drawings which are later converted by human machinists into a three-dimensional object. As a result, designers and engineers have accumulated vast inventories of two-dimensional drawings and data which cannot be conveniently converted into three-dimensional objects.

Methods have been developed to facilitate, on a limited scale, generation of three-dimensional objects using two-dimensional data as input; see, for example: Suzuki, U.S. Pat. Nos. 5,428,715, issued Jun. 27, 1995; Azarbayejani et al., 5,511,153, issued Apr. 23, 1996; Kurashige et al., 5,363, 476, issued Nov. 8, 1994; Abrams et al., 5,587,913, issued Dec. 24, 1996; and Niu et al., 5,561,748, issued Oct. 1, 1996.

However, these methods are concerned generally with projection, extrusion, or mapping of two-dimensional data within three-space rather than the substantially more vexing problem of constructing solid objects from an arbitrary set of two-dimensional views.

Systems and methods are therefore needed which overcome the shortcomings of the prior art and which facilitate the conversion of two-dimensional drawings into three-dimensional object data.

SUMMARY OF THE INVENTION

The present invention provides systems and methods for parsing, interpreting, and manipulating two-dimensional views of a three-dimensional object and, through the use of techniques which mimic the machinist's experience and intuition, transform the information contained in the two-dimensional views to automatically produce a three-dimensional geometric solid.

In accordance with a preferred embodiment of the present invention, techniques are developed for defining an engine which has as its input two-dimensional drawing views, wherein the engine produces a three-dimensional geometric solid. The engine comprises, among other things, a set of rules for identifying particular elements within the various two-dimensional views, and for determining the useful relationships between elements (e.g., arcs, lines, and the like) in one view vis-a-vis related elements in another view, to thereby ascertain the three-dimensional form defined by these elements and their corresponding relations to other elements.

In accordance with a first embodiment of the present invention, a system is provided which permits an operator to interactively develop a plurality of two-dimensional views relating to a three-dimensional object, whereupon the system automatically generates a three-dimensional geometric solid based on the operator's two-dimensional design drawing. In accordance with an alternate embodiment, the system is configured to retrieve (e.g. from memory, disc drive or the like) archival data relating to previously generated view sets, and to format the archival data as input to the rules engine associated with the system to thereby generate a three-dimensional geometric solid for which two-dimensional drawings had previously been developed and stored.

In accordance with a further aspect of the present invention, two-dimensional drawing data is automatically defined and organized into the appropriate view sets for processing by the system. In accordance with a still further aspect of the present invention, relational constraints between elements within a view set as well as across view sets are automatically generated by the system. In accordance with a still further aspect of the present invention, view sets derived from two dimensional drawing data are automatically ordered into plan view, front view, back view, and so on.

BRIEF DESCRIPTION OF THE DRAWING FIGURES

The subject invention will hereinafter be described in conjunction with the appended drawing figures, wherein like numerals denote like elements, and:

FIG. 5C depicts exemplary data structures showing the various records comprising the view cluster and view set structures;

Figure 9A:
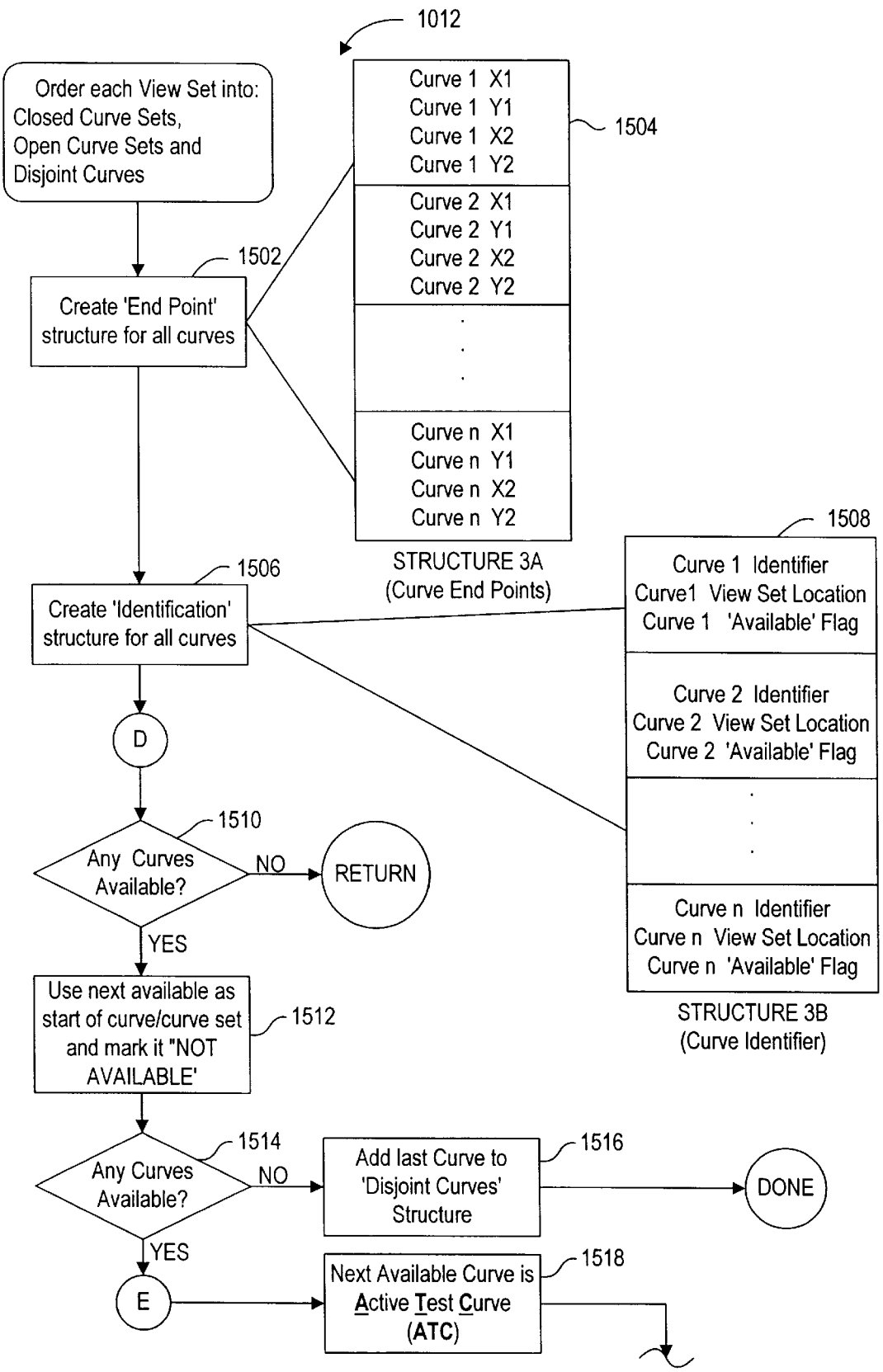
Figure 9B:
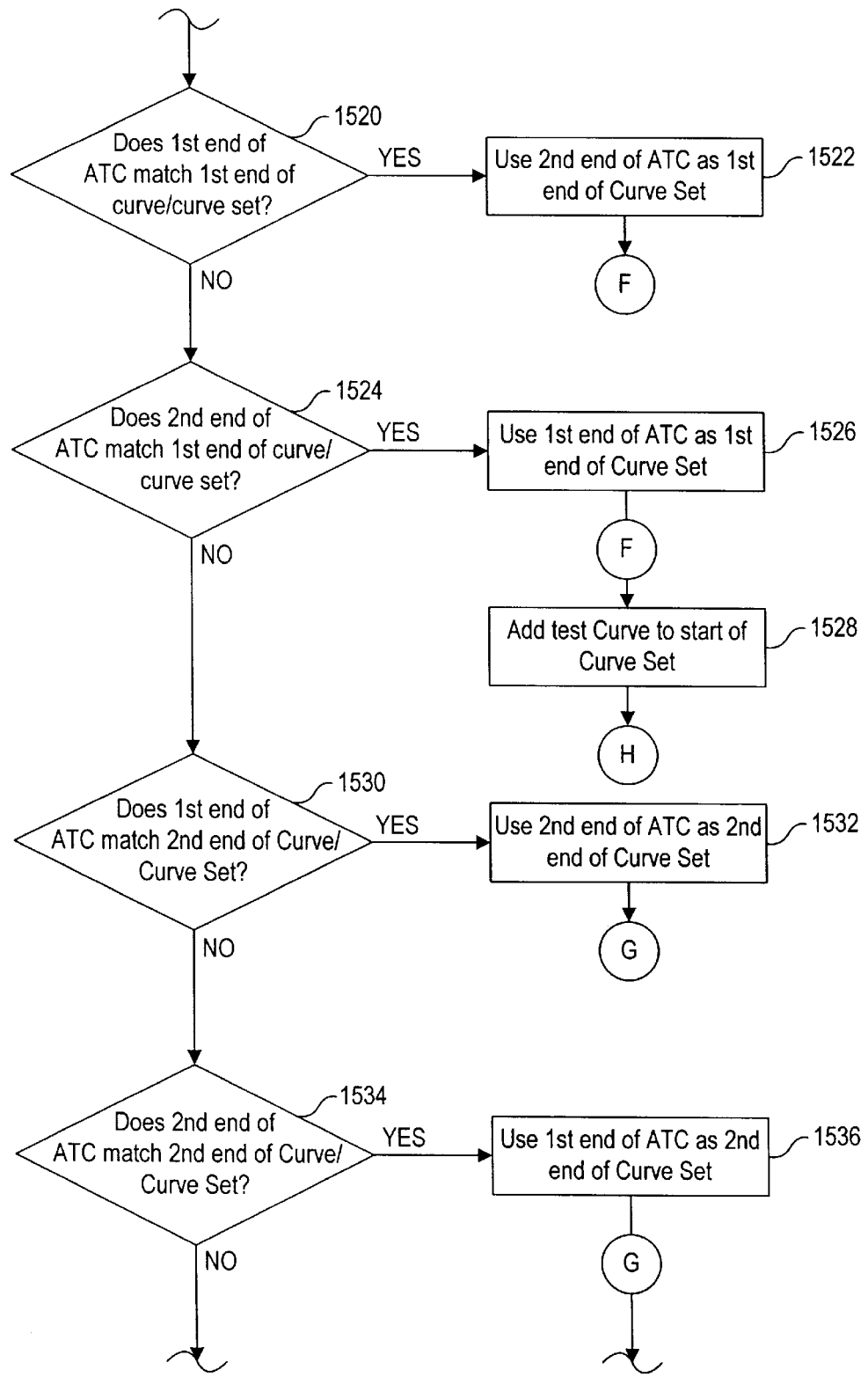
Figure 9C:
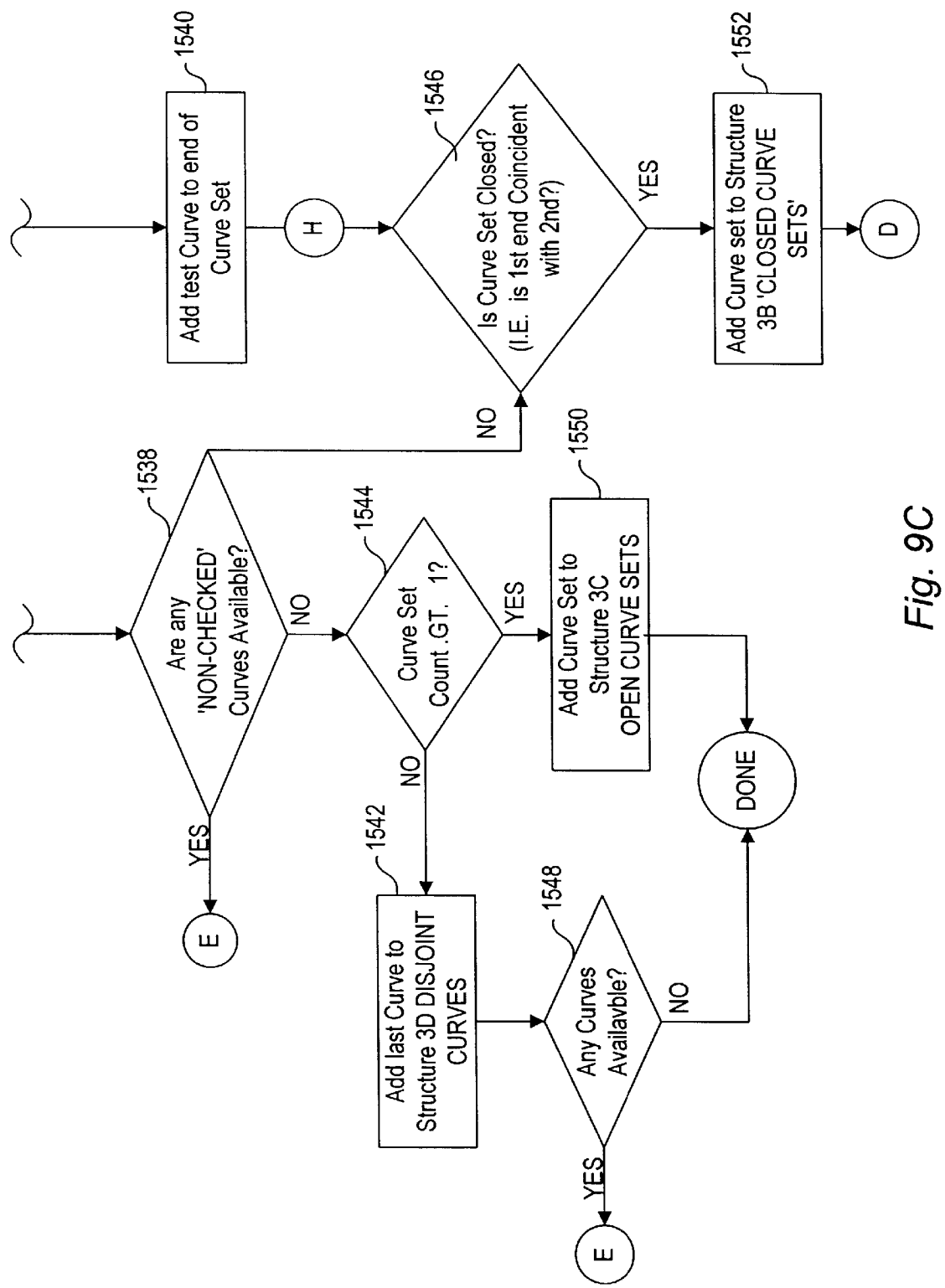
Figure 9D:
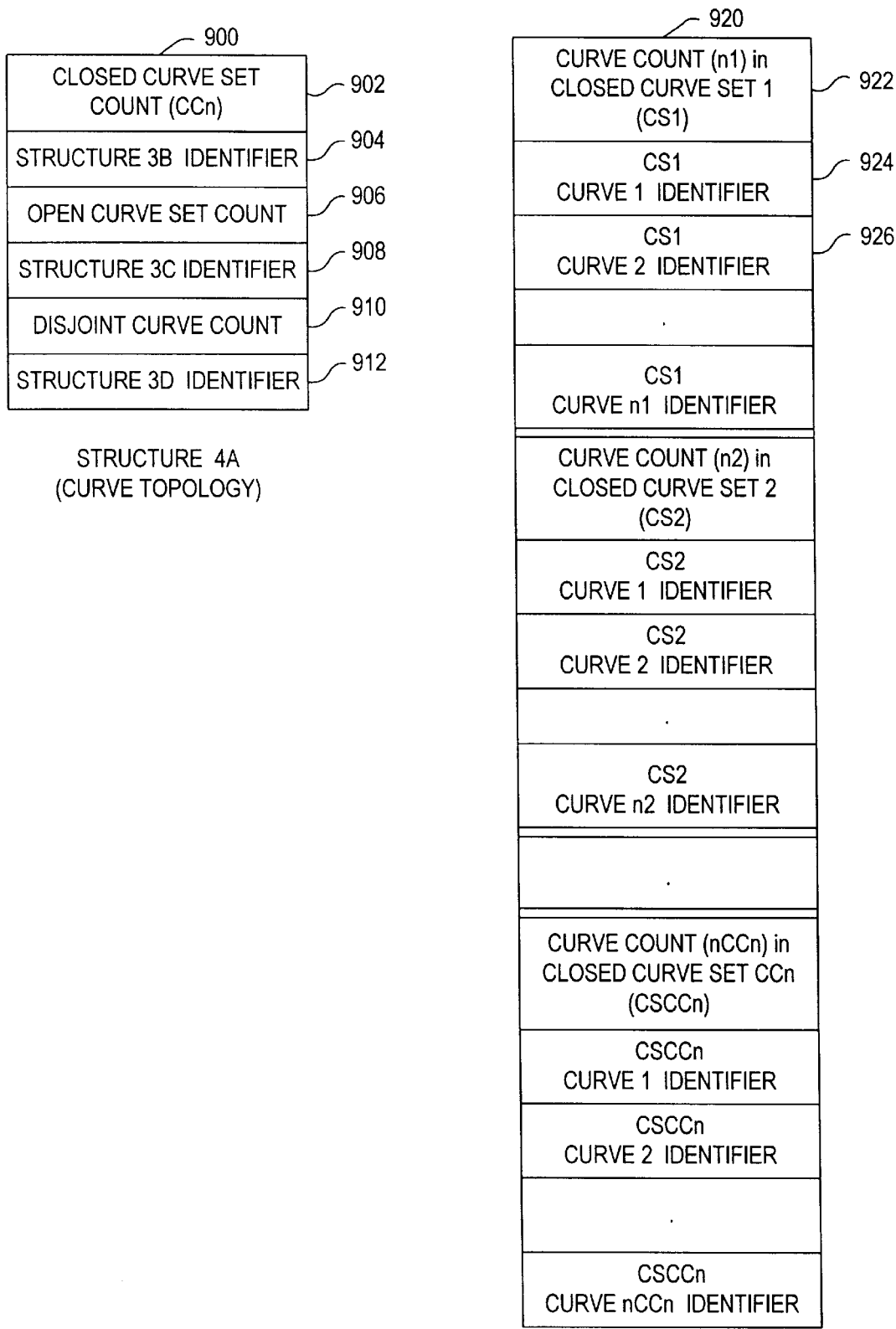
Figure 9E:
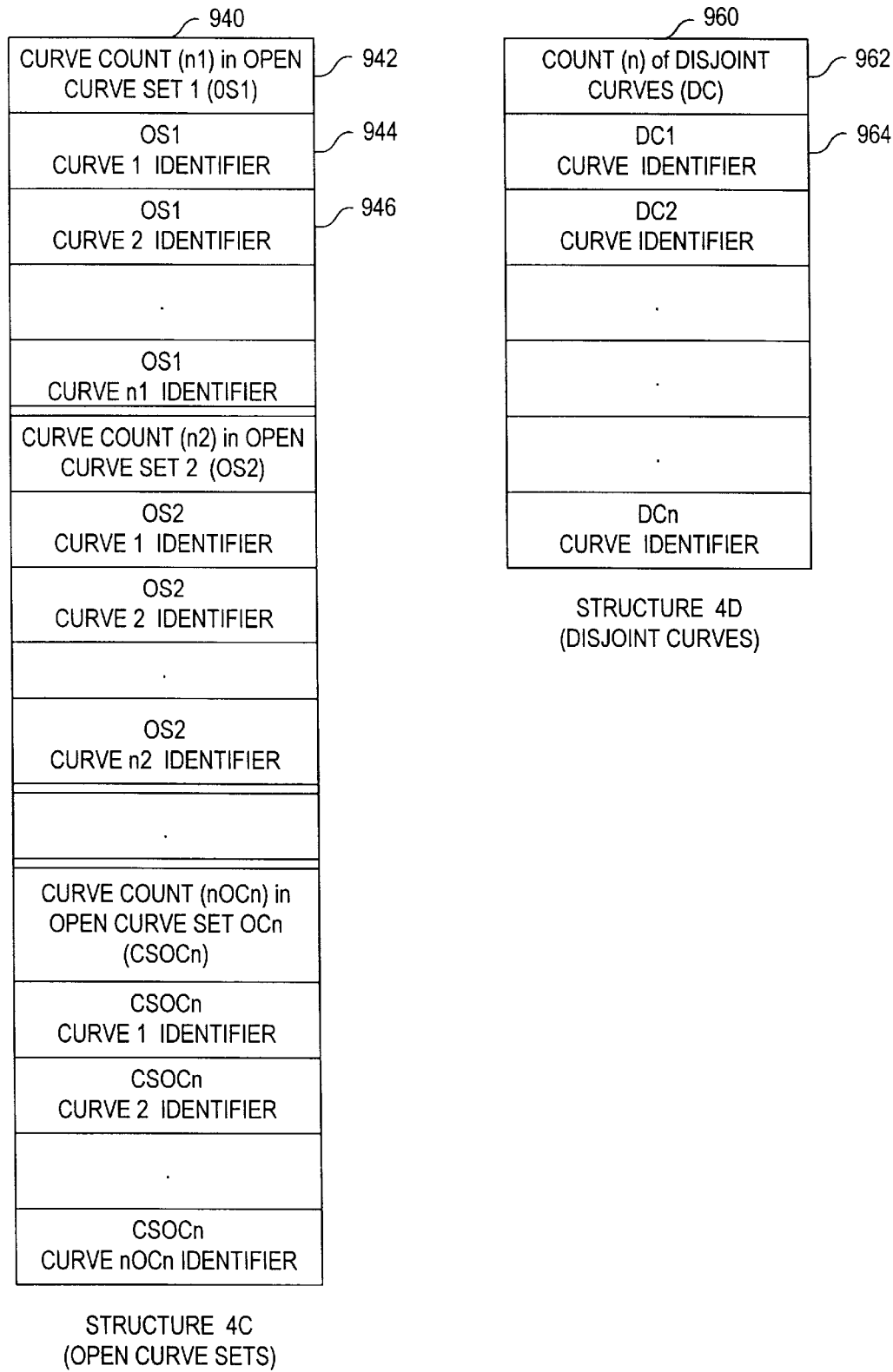
Figure 10:
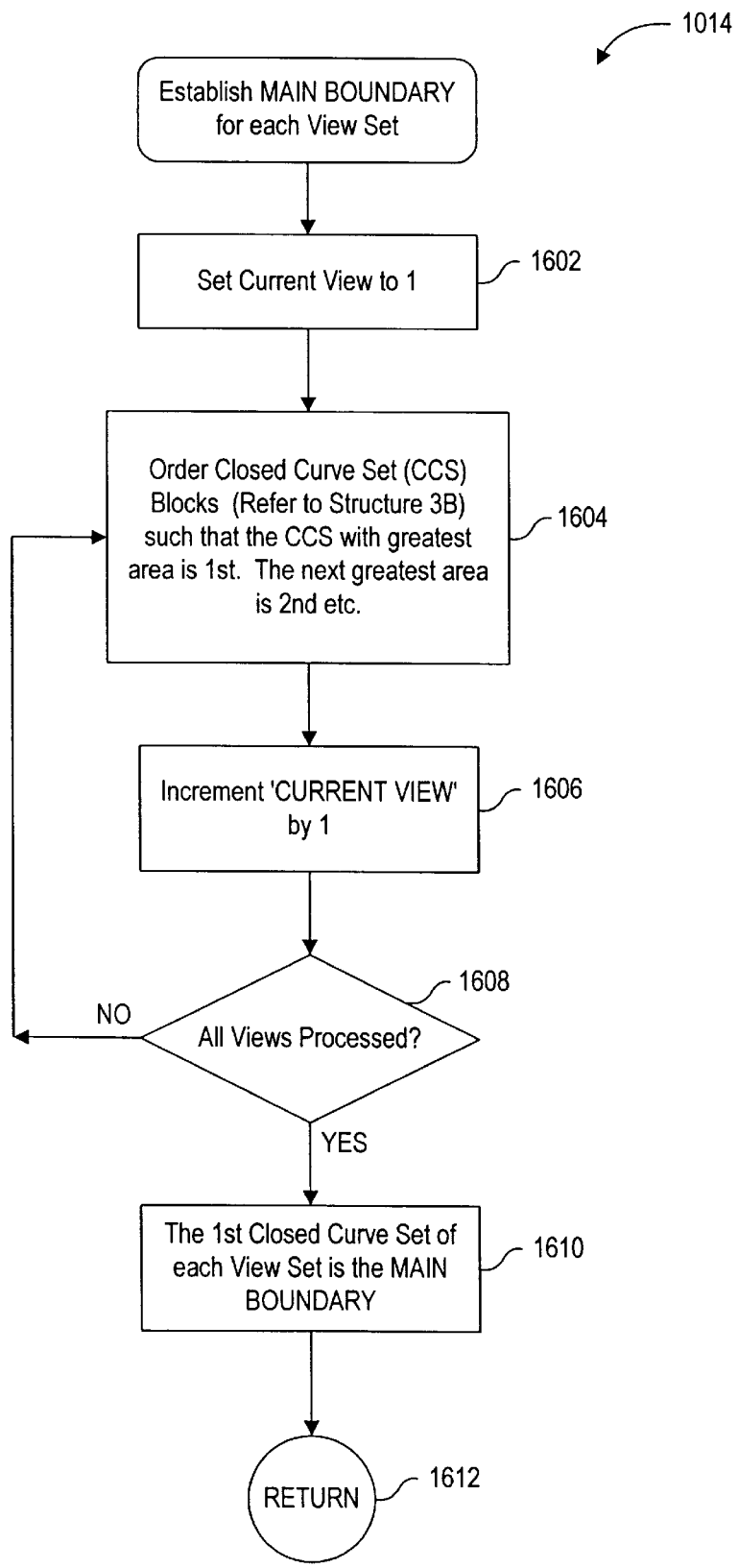
Figure 11:
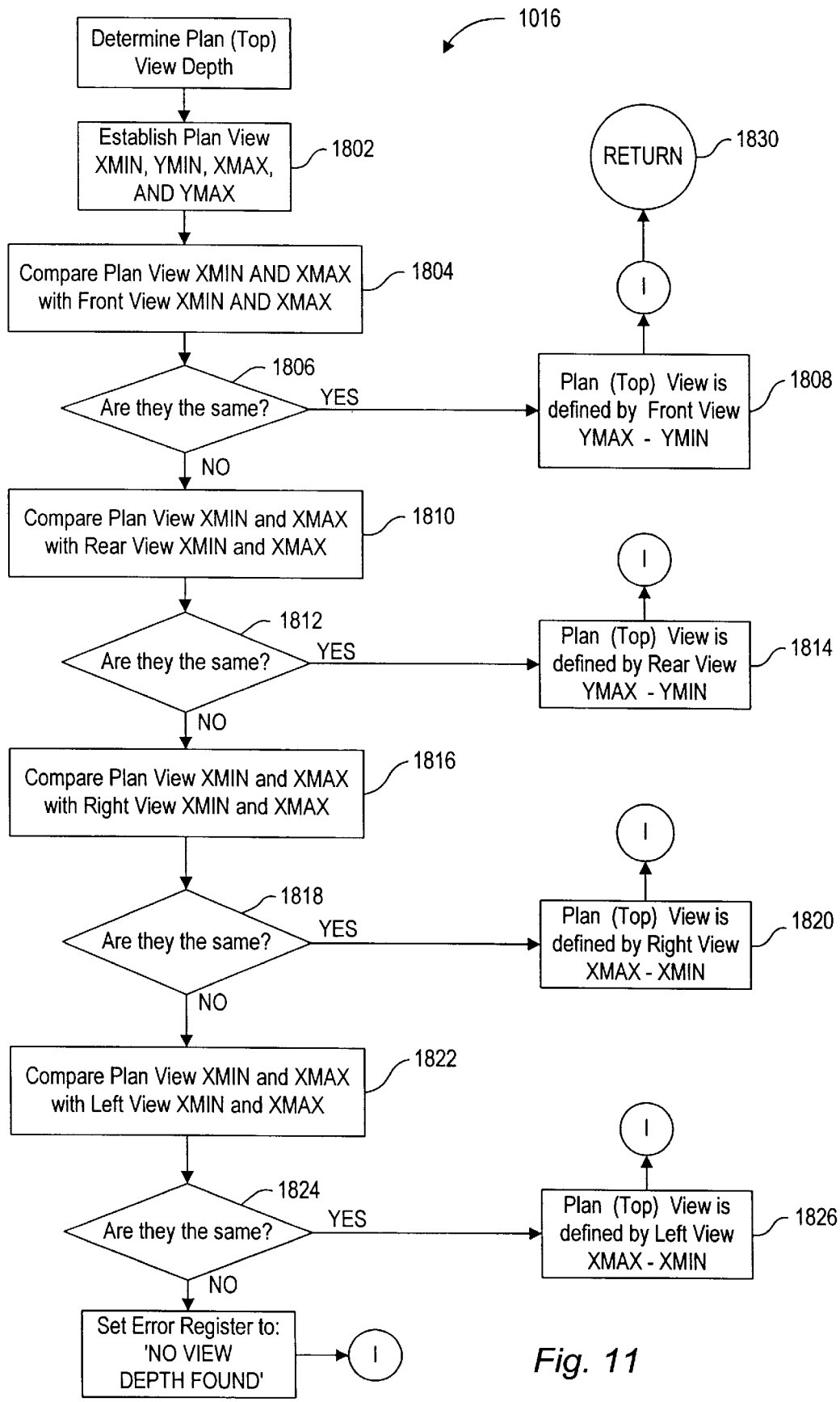
Figure 12A:
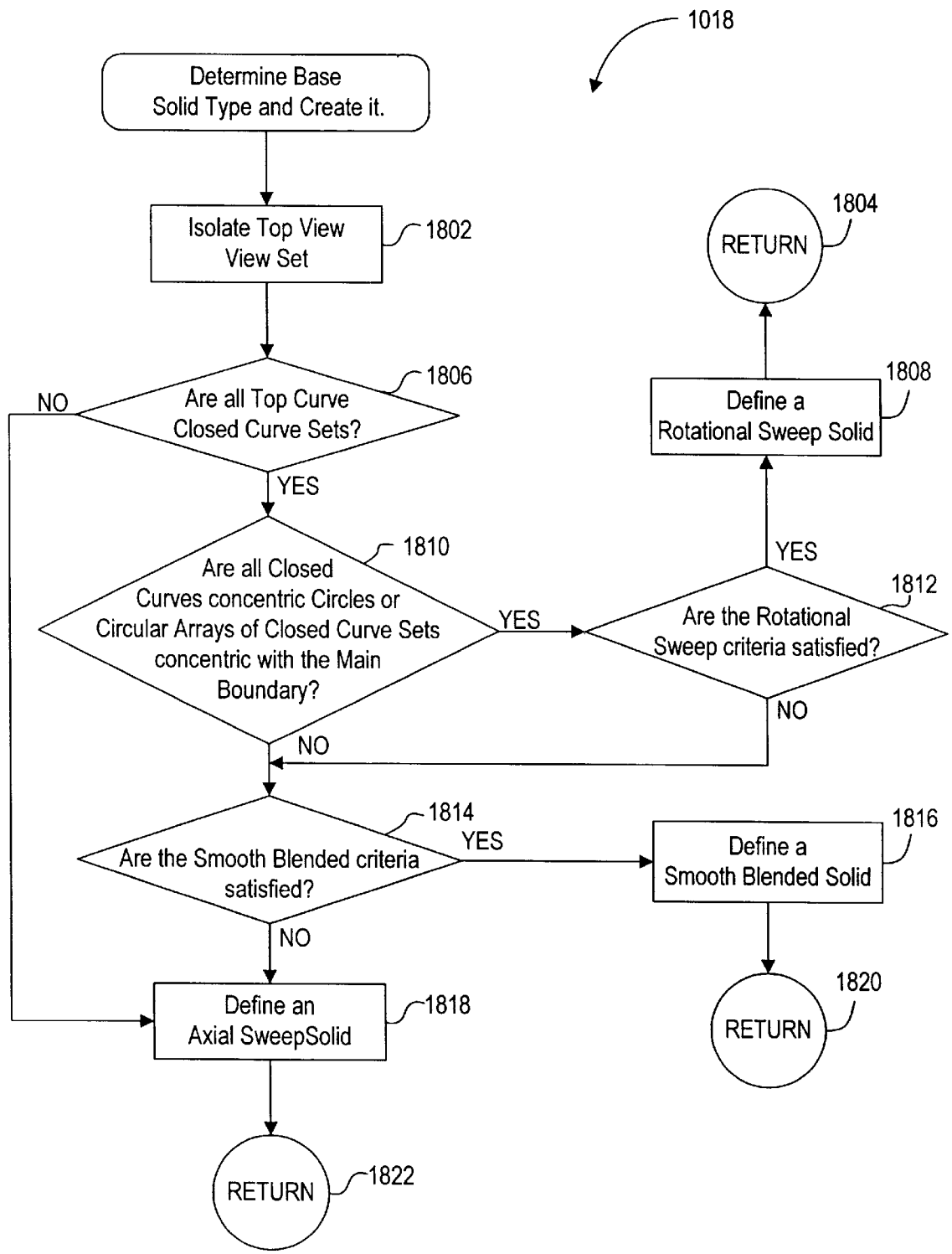
Figure 13A:
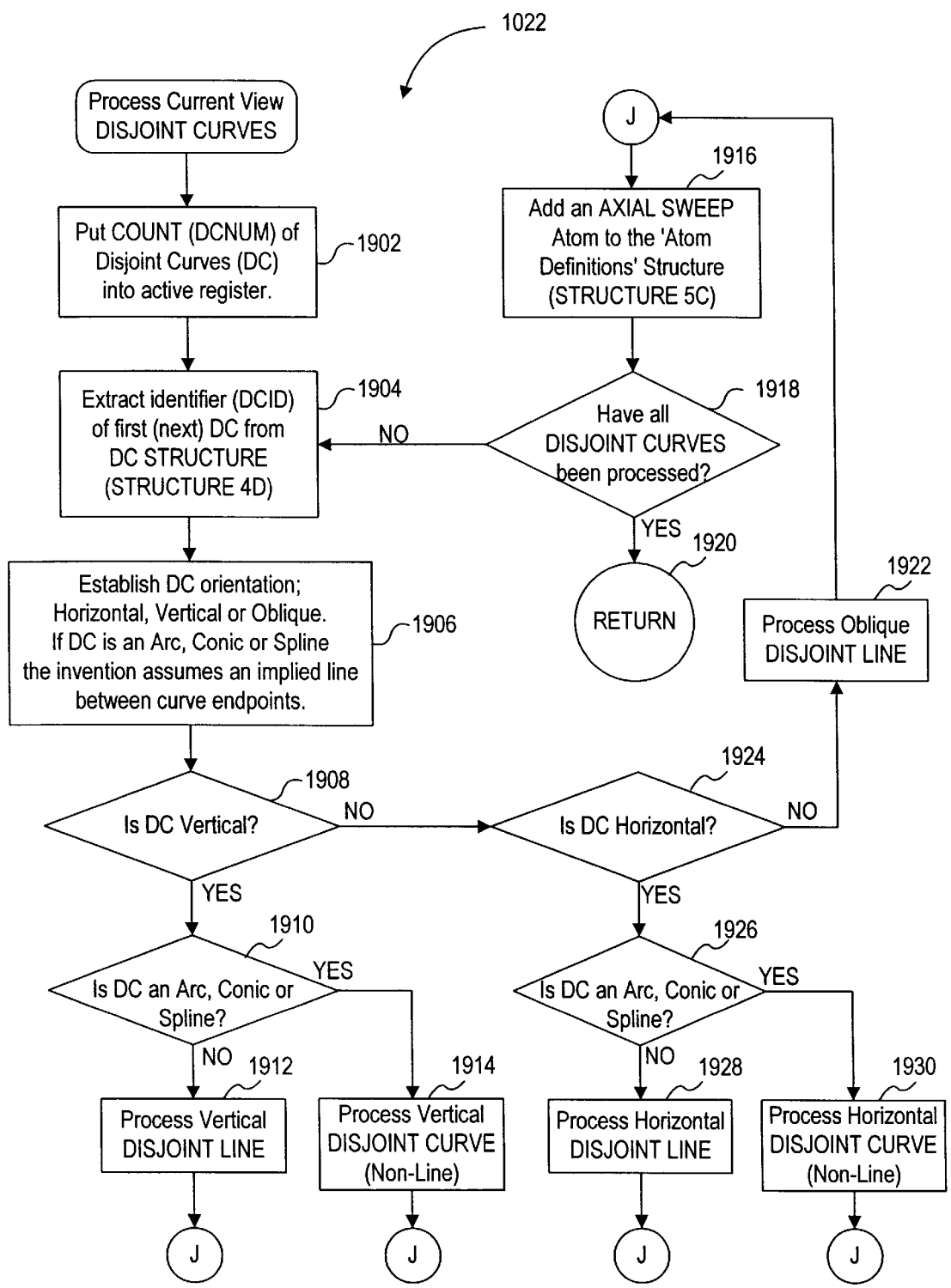
Figure 13B:
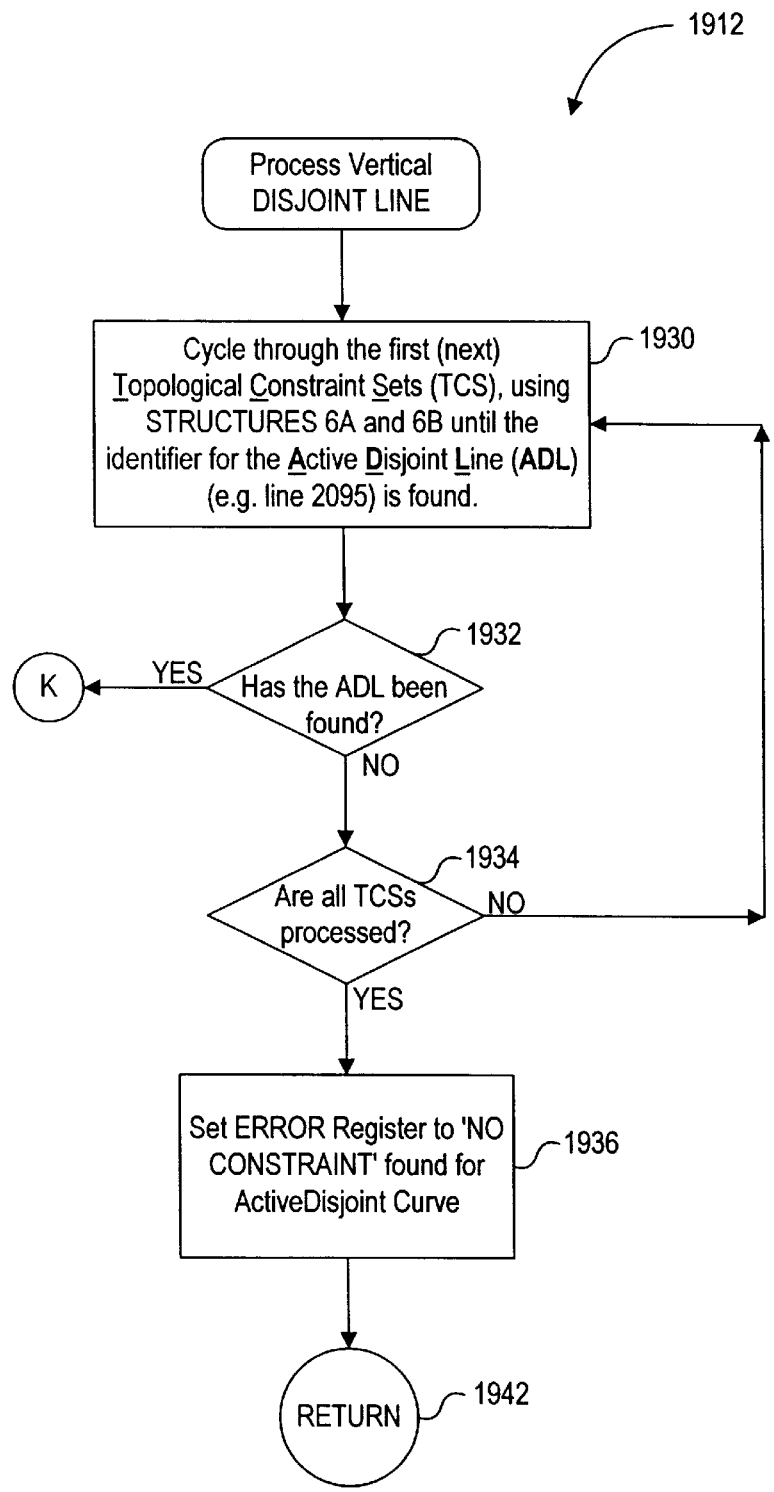
Figures 1, 13C:
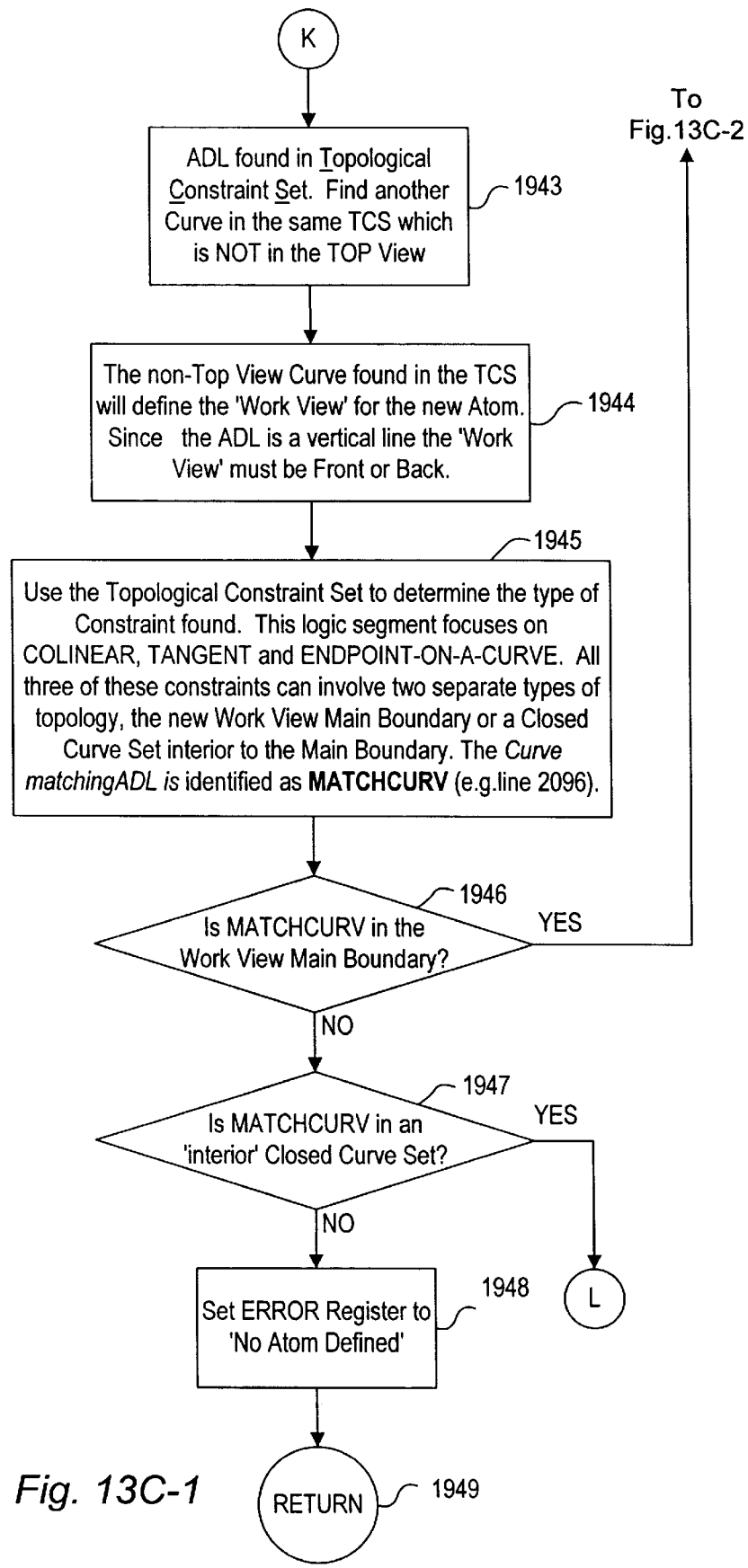
FIG. 1A is an illustration of the three basic Boolean operations as applied to solids.
Figures 2, 13C:
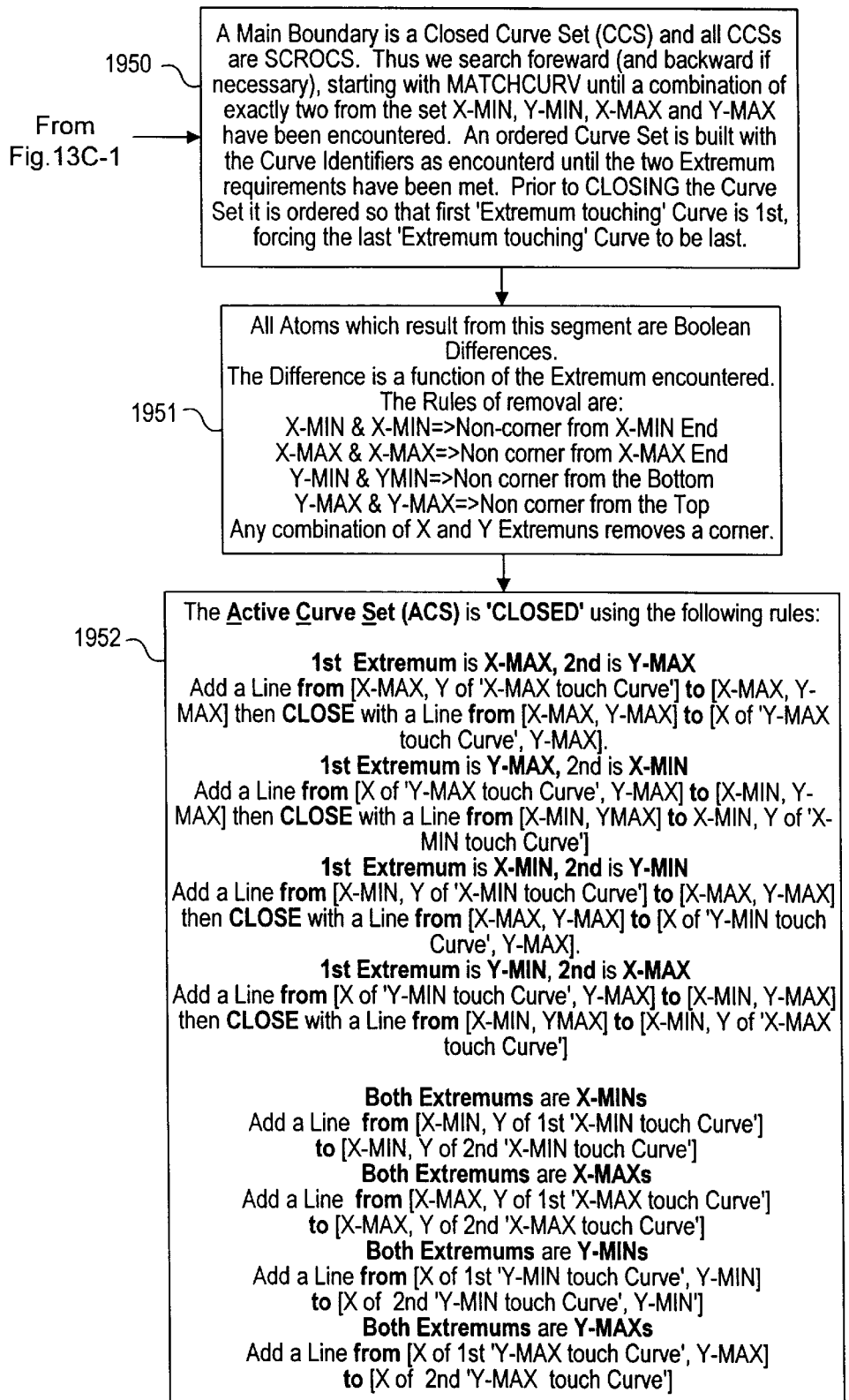
Figure 13D:
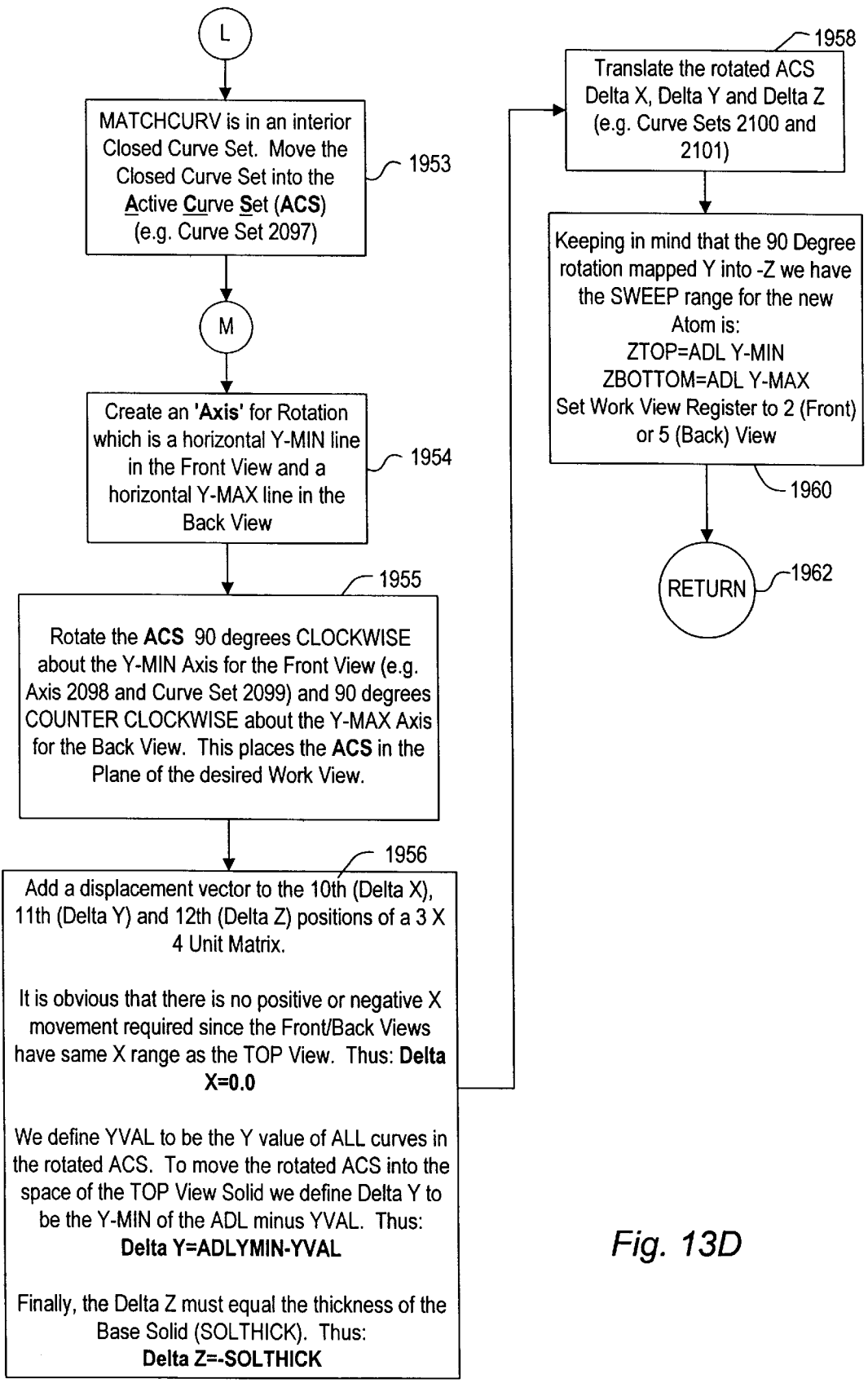
Figure 13E:
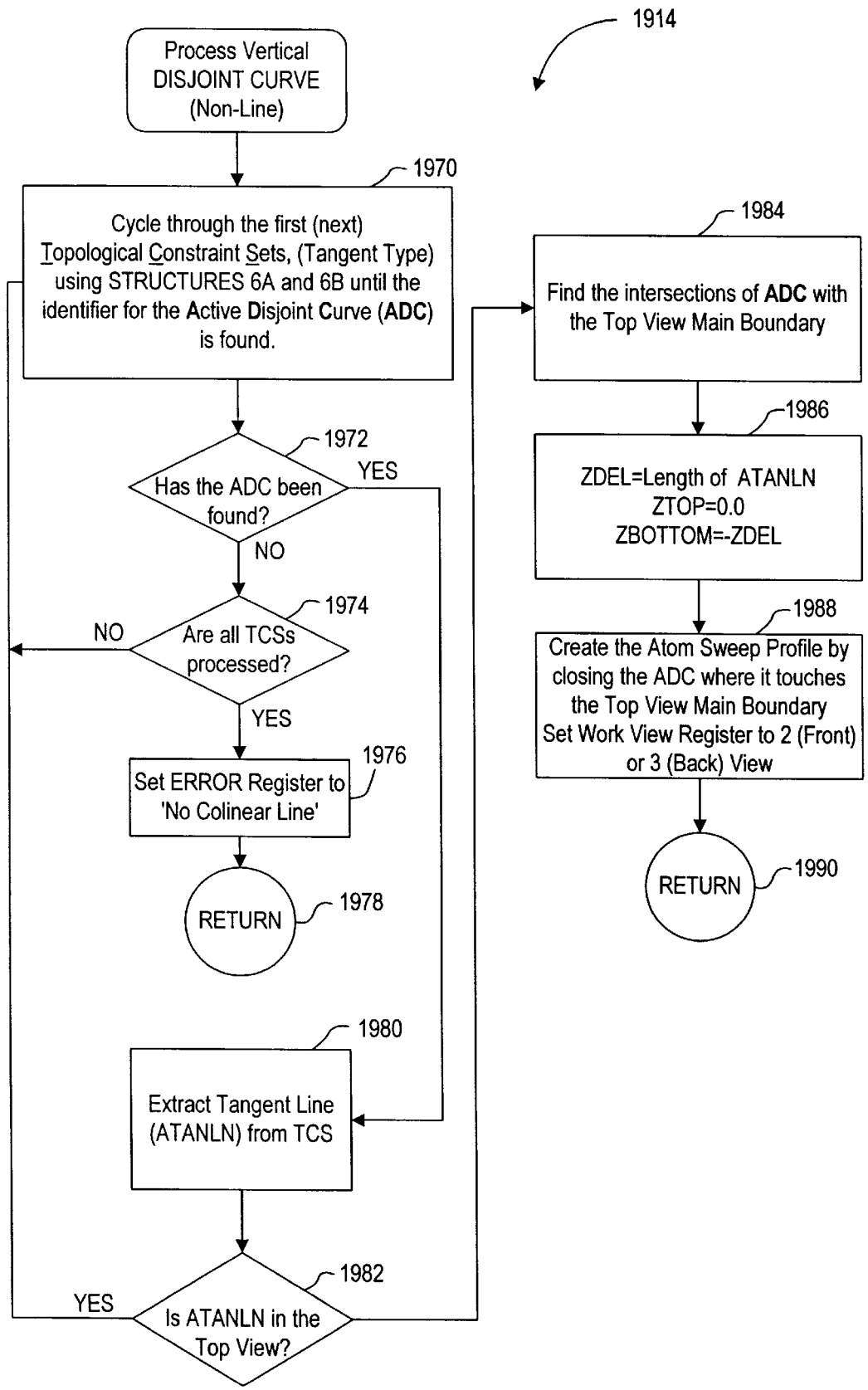
Figure 13F:
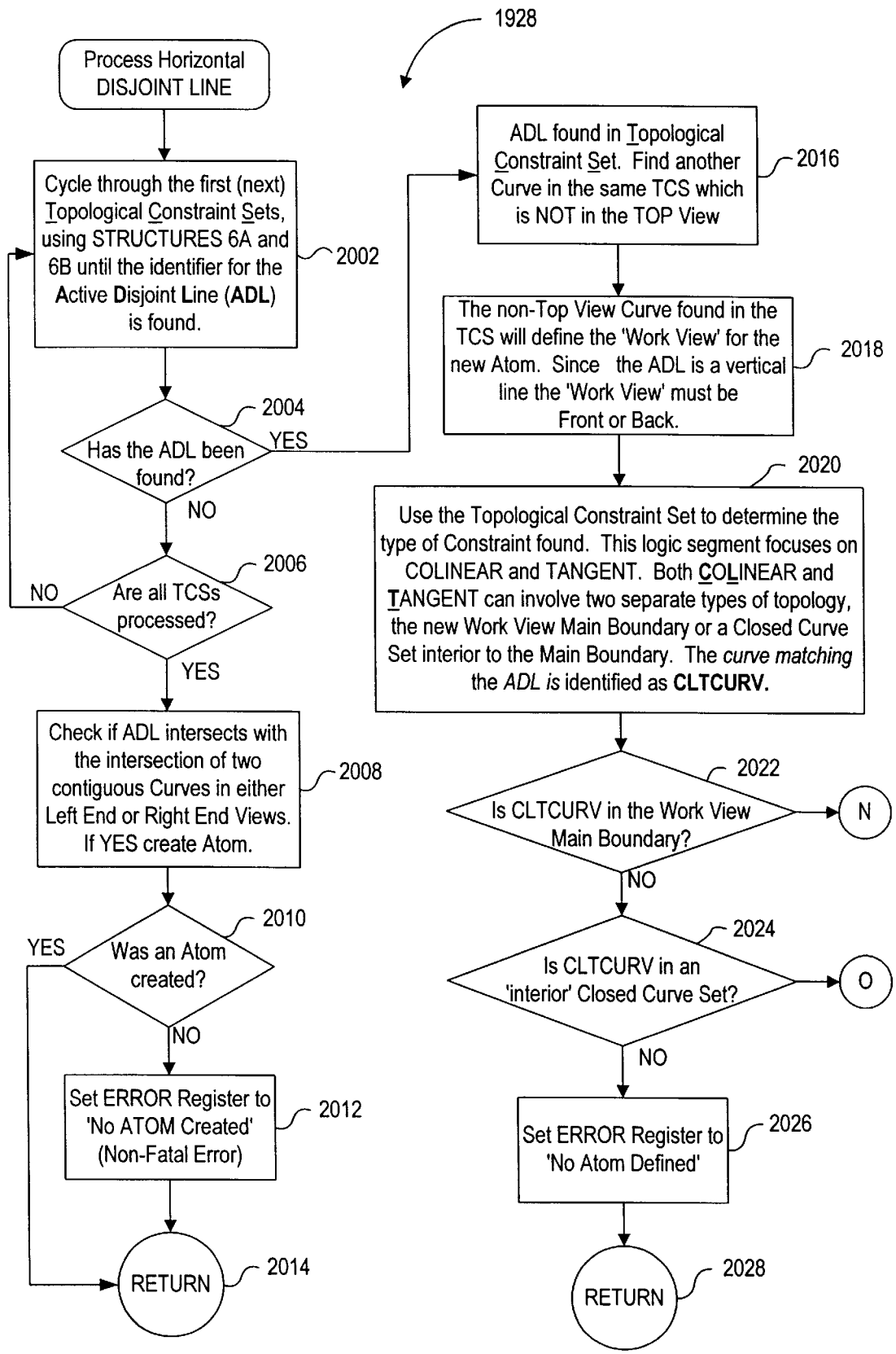
Figure 13G:
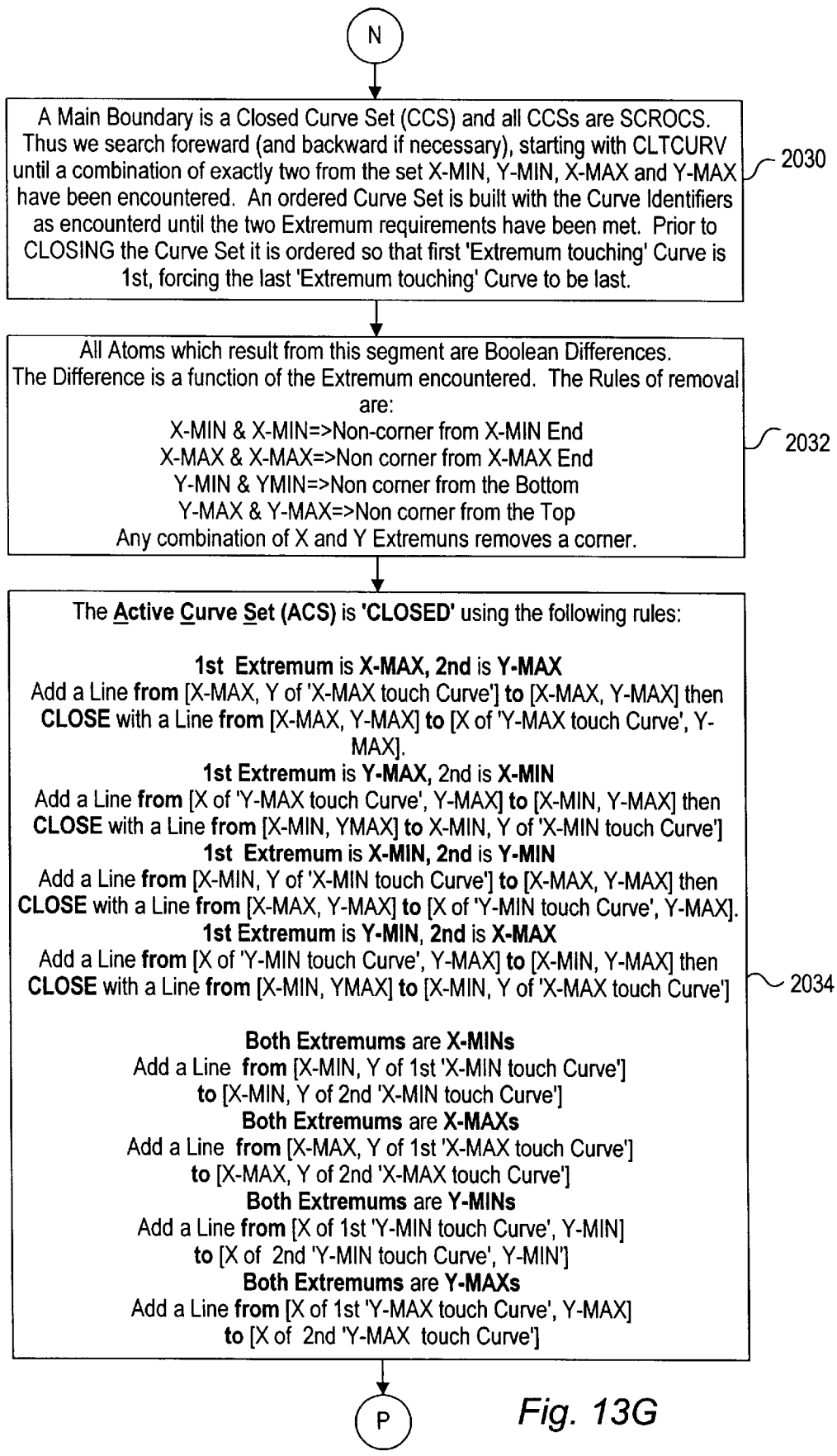
Figure 13H:
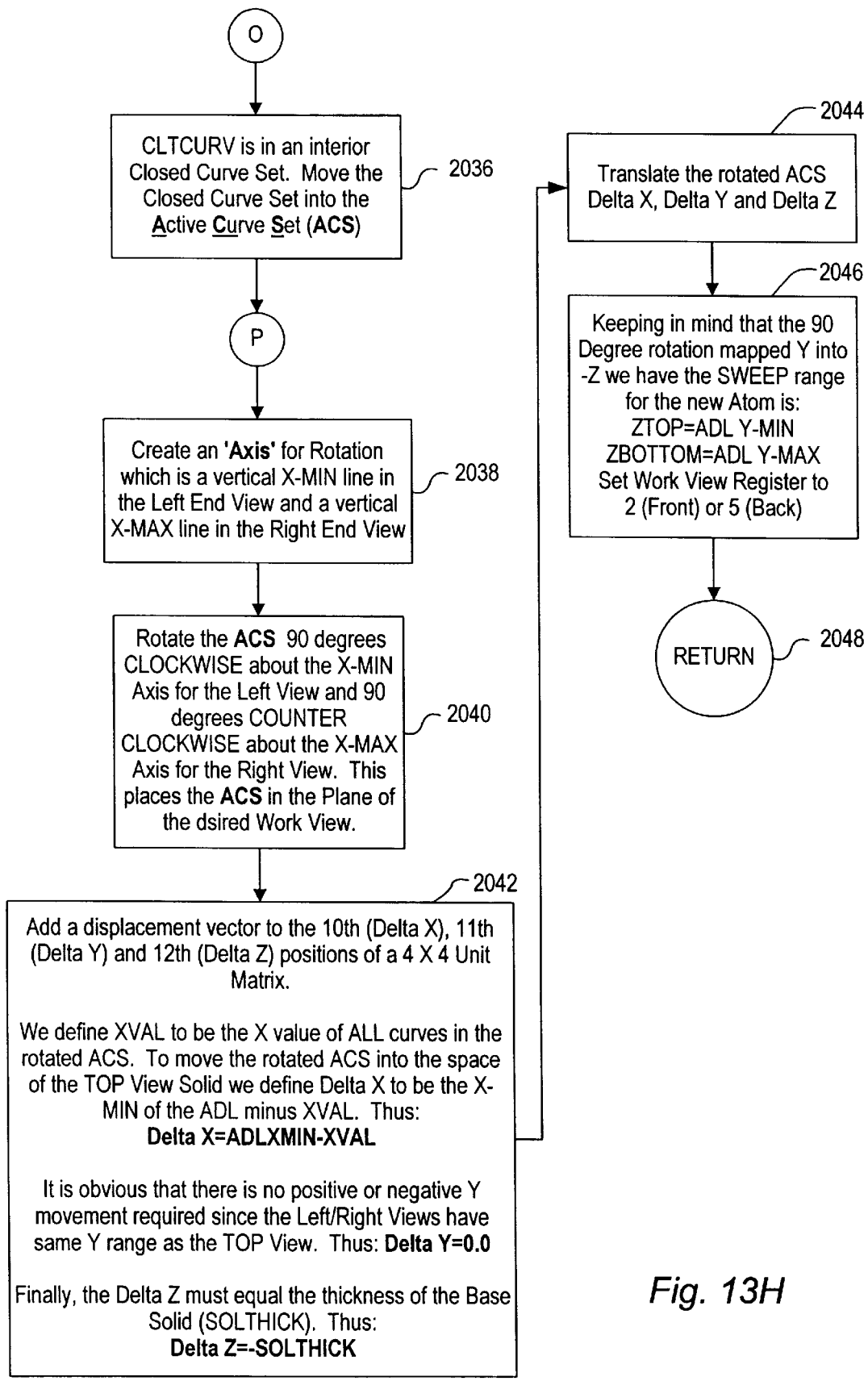
Figure 13I:
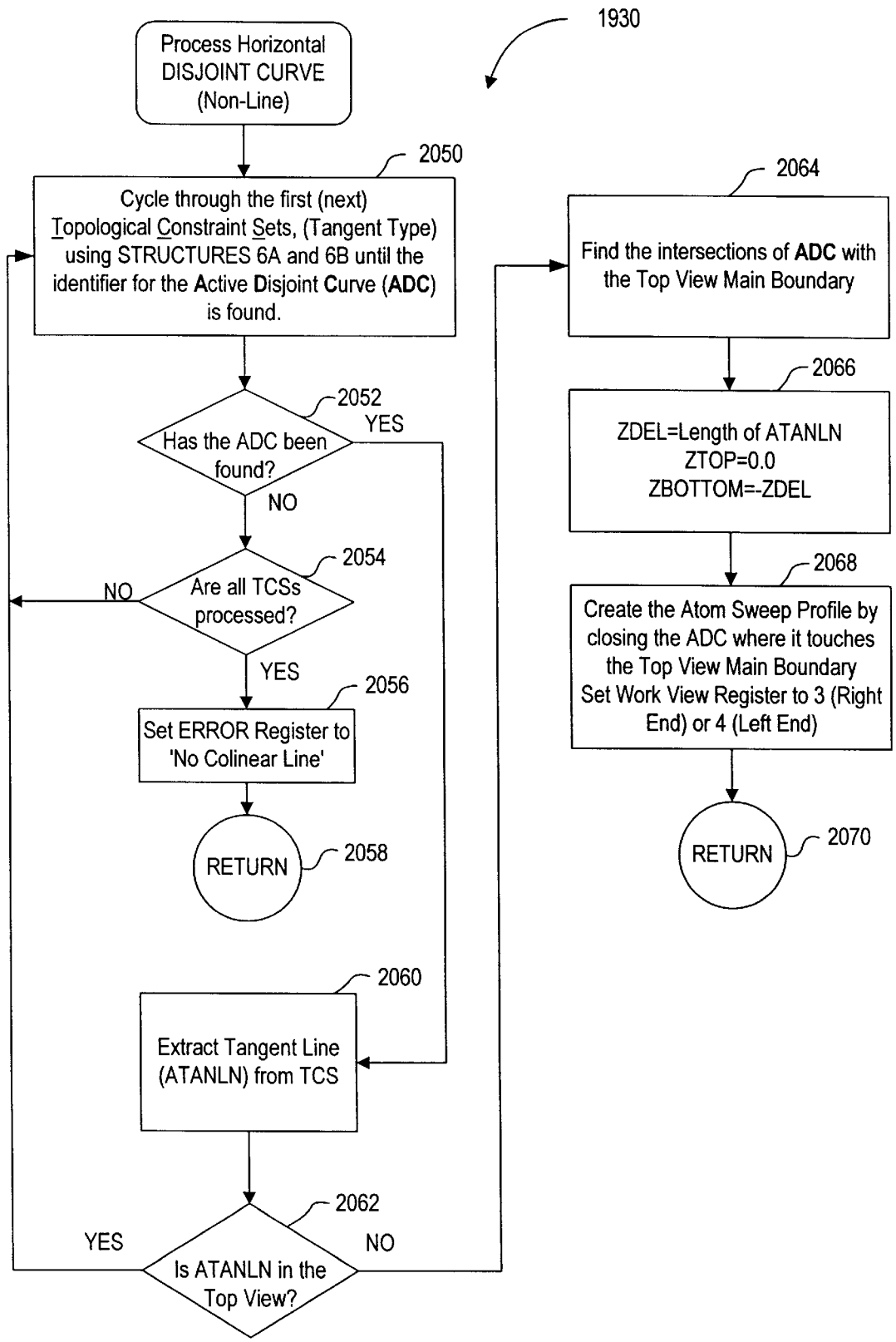
Figure 13J:
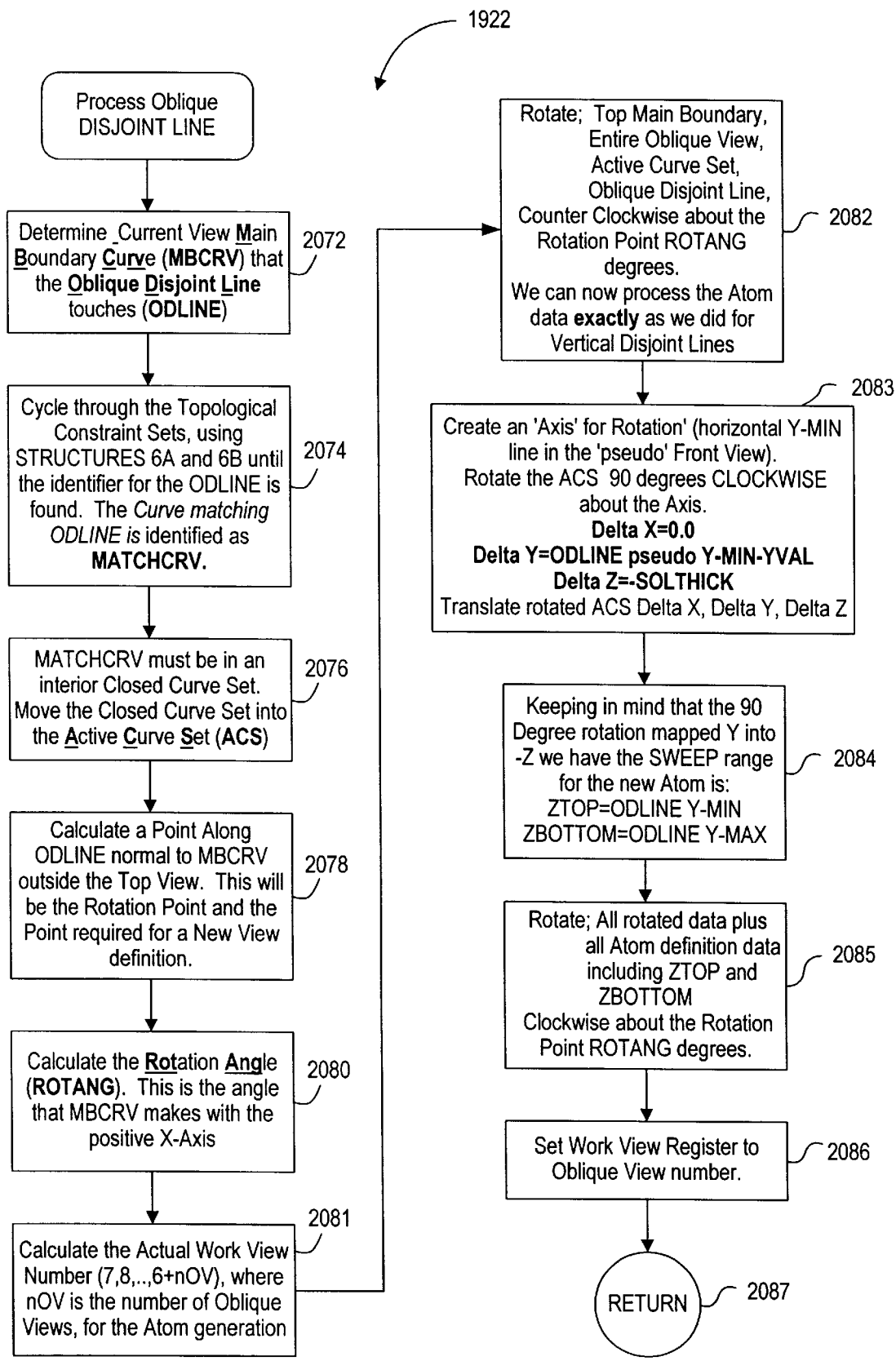
Figure 13L:
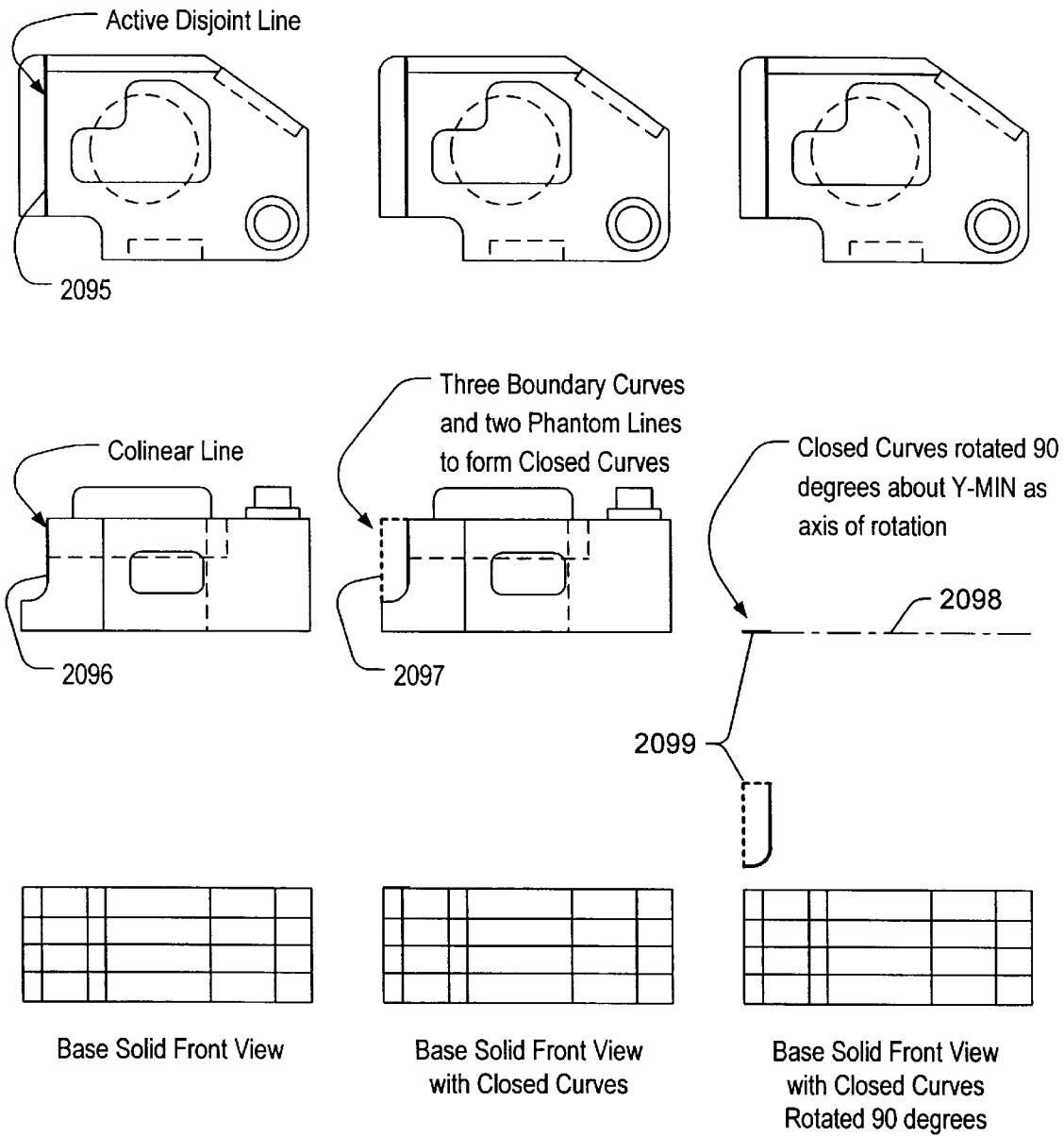
Figure 13M:
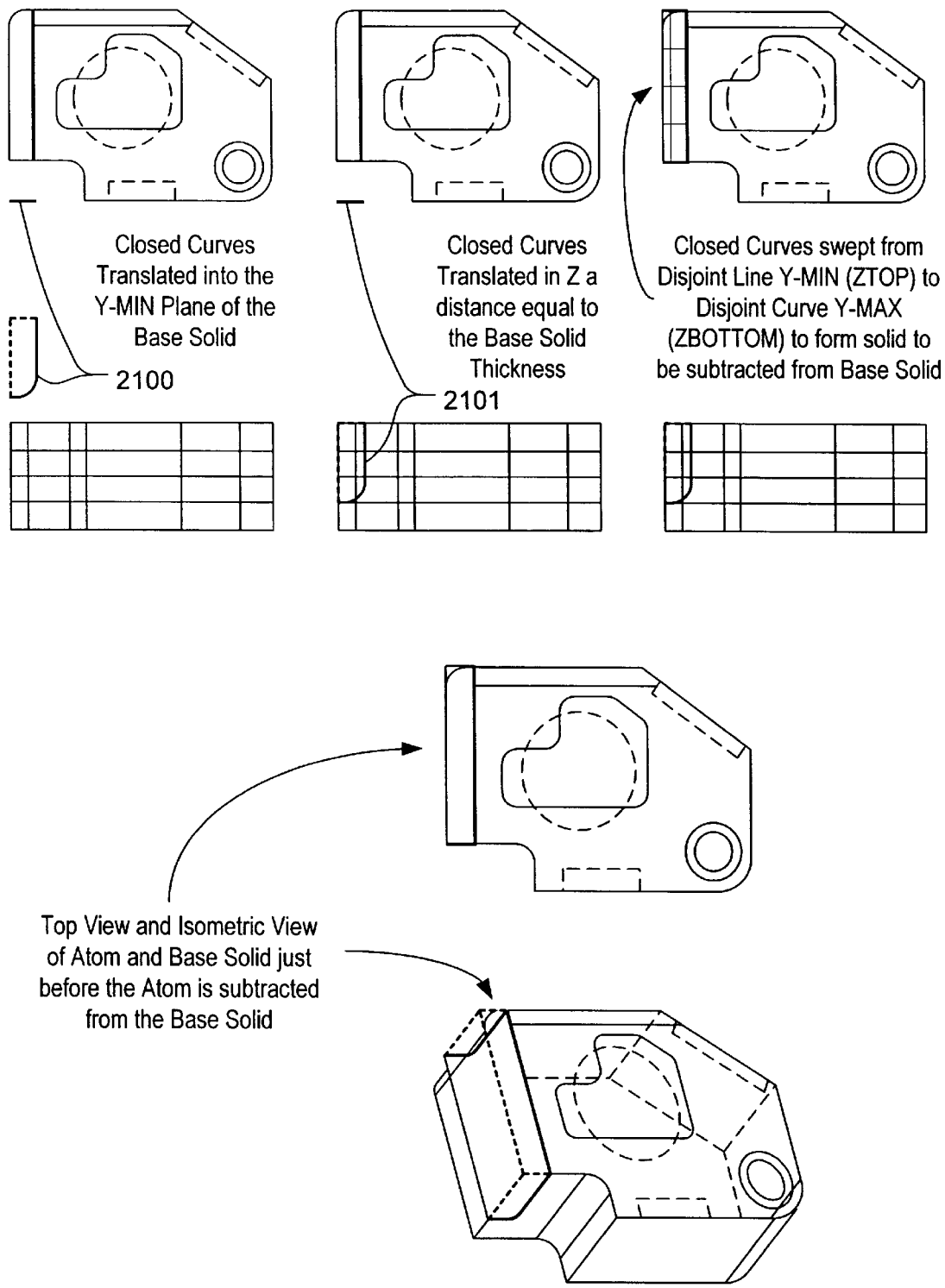
Figure 14A:
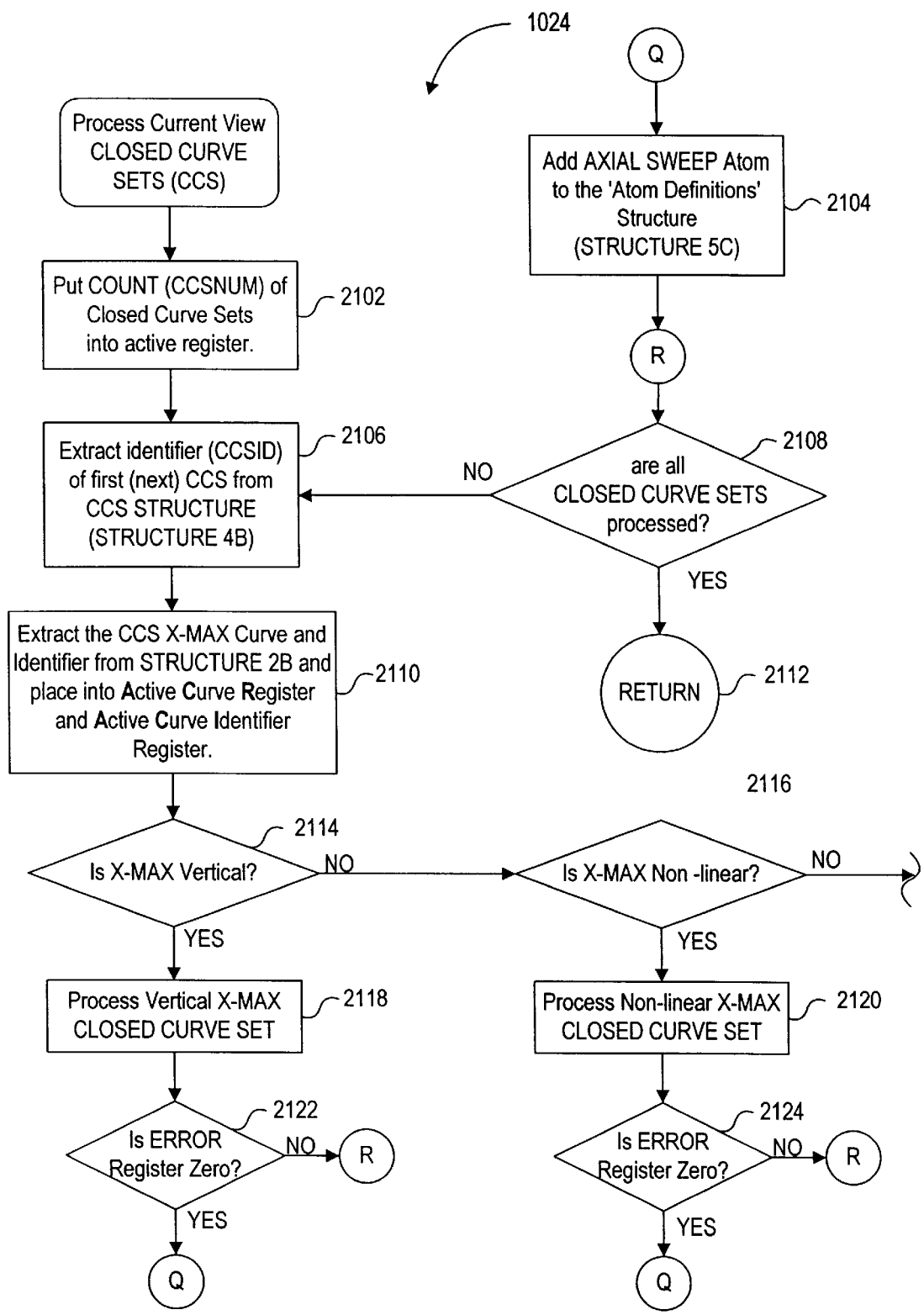
Figure 14B:
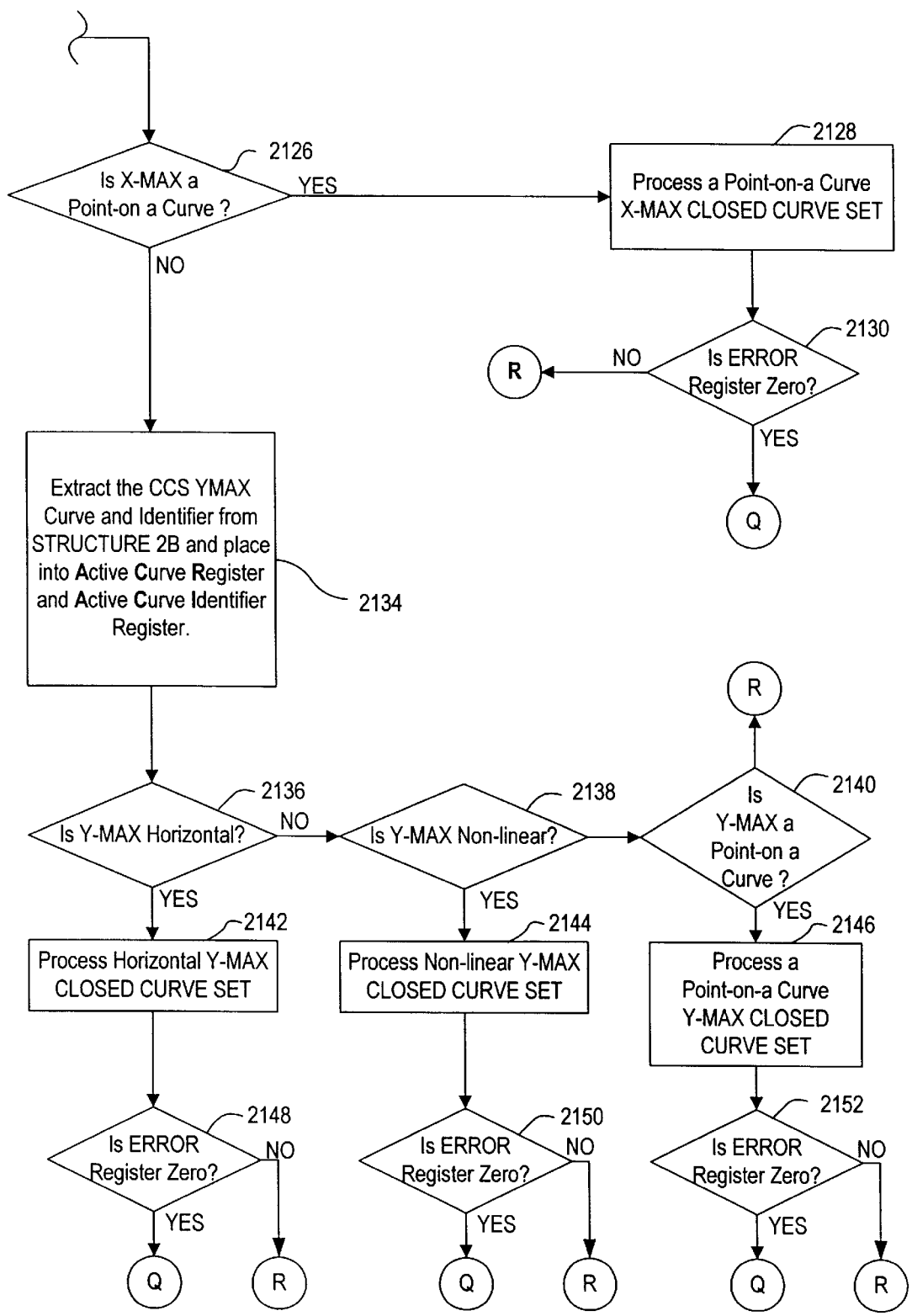
Figure 14C:
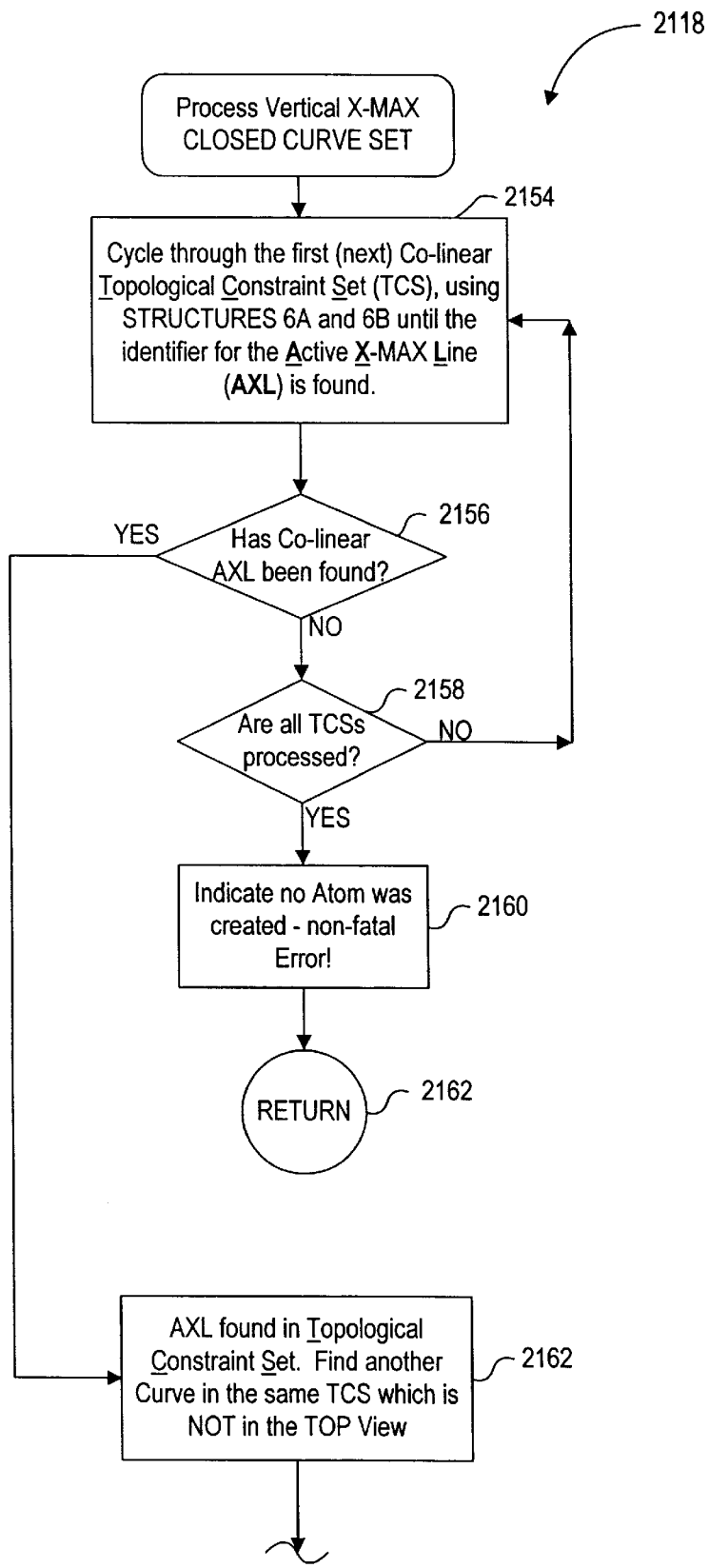
Figure 14D:
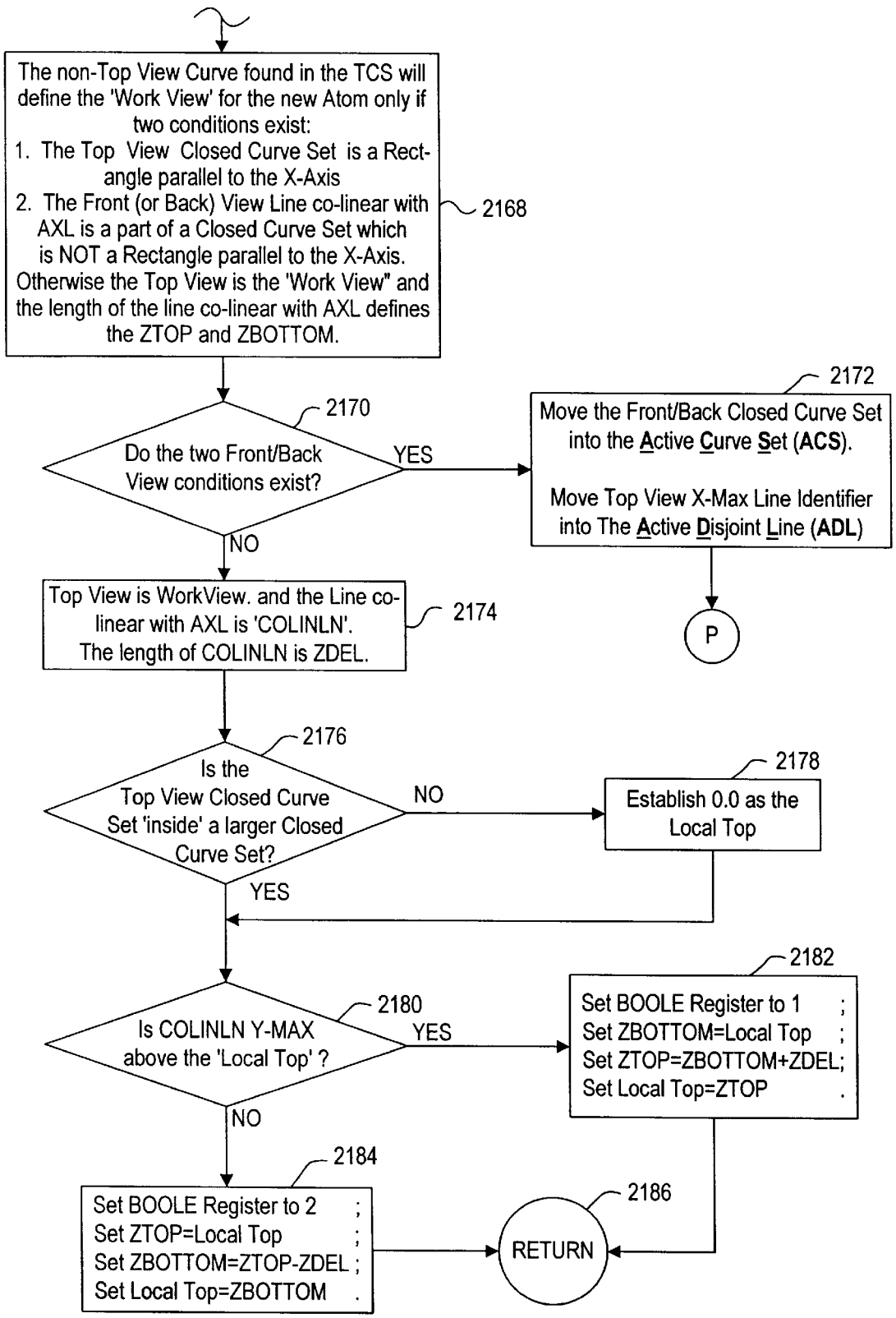
Figure 14E:
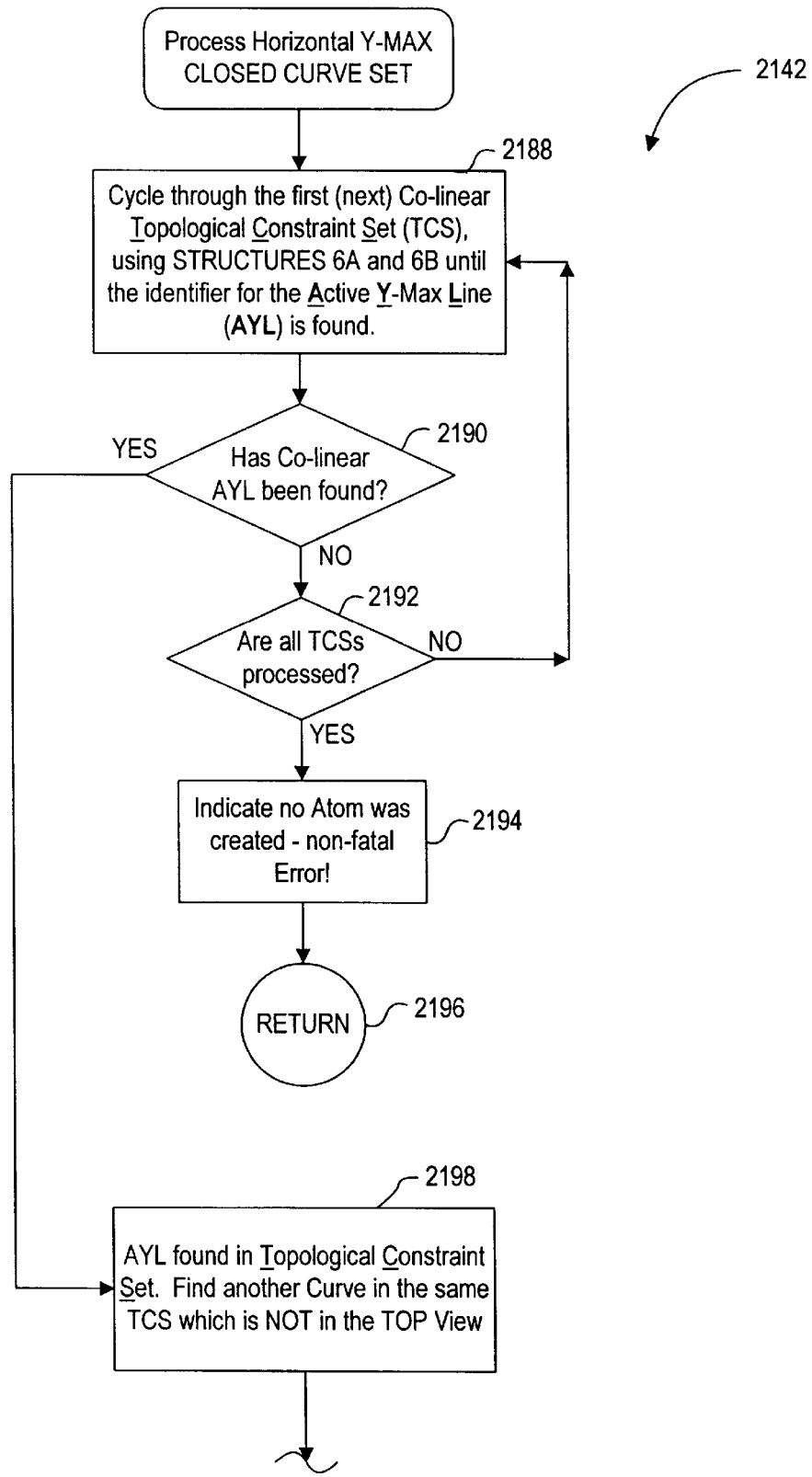
Figure 14F:
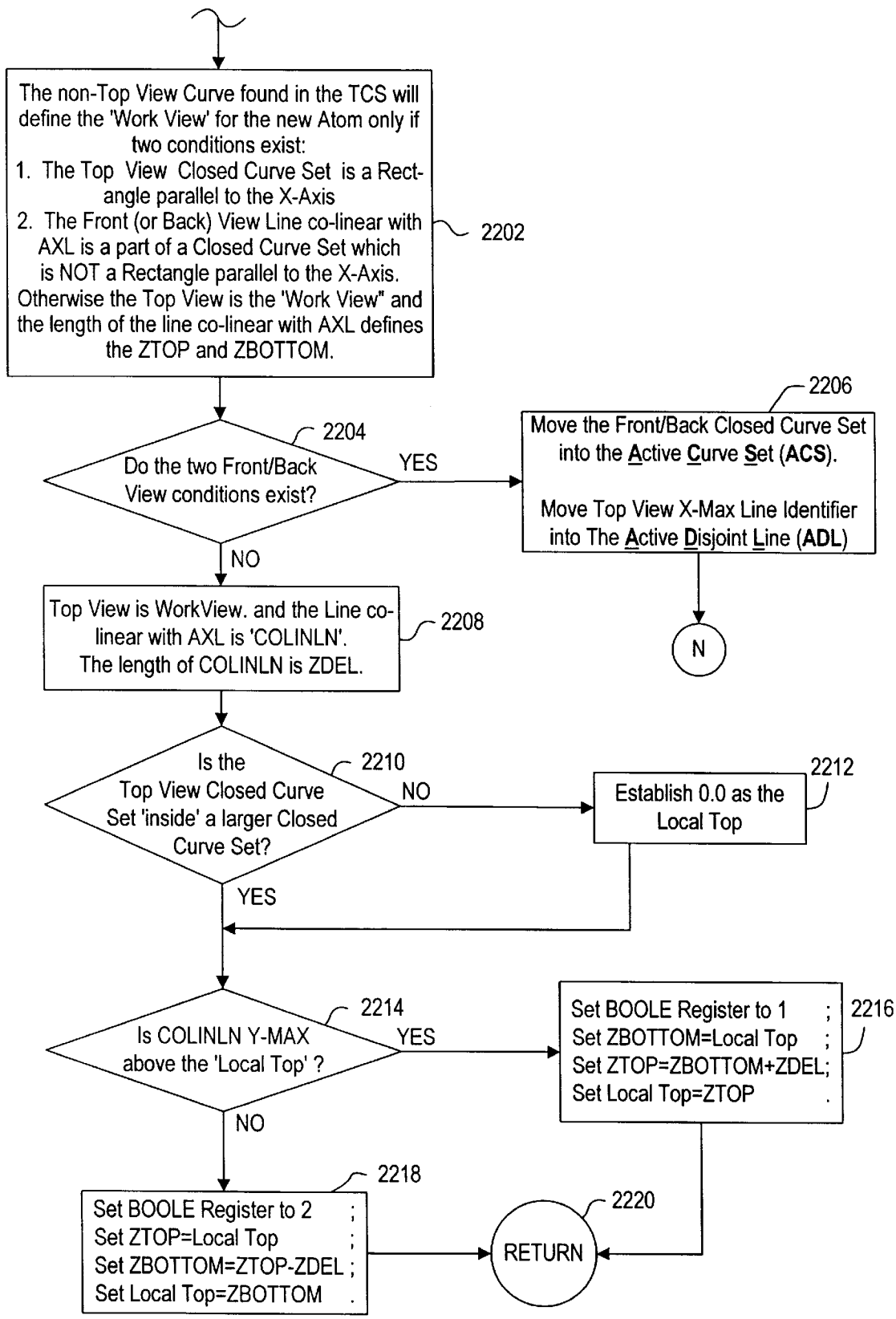
Figure 14G:
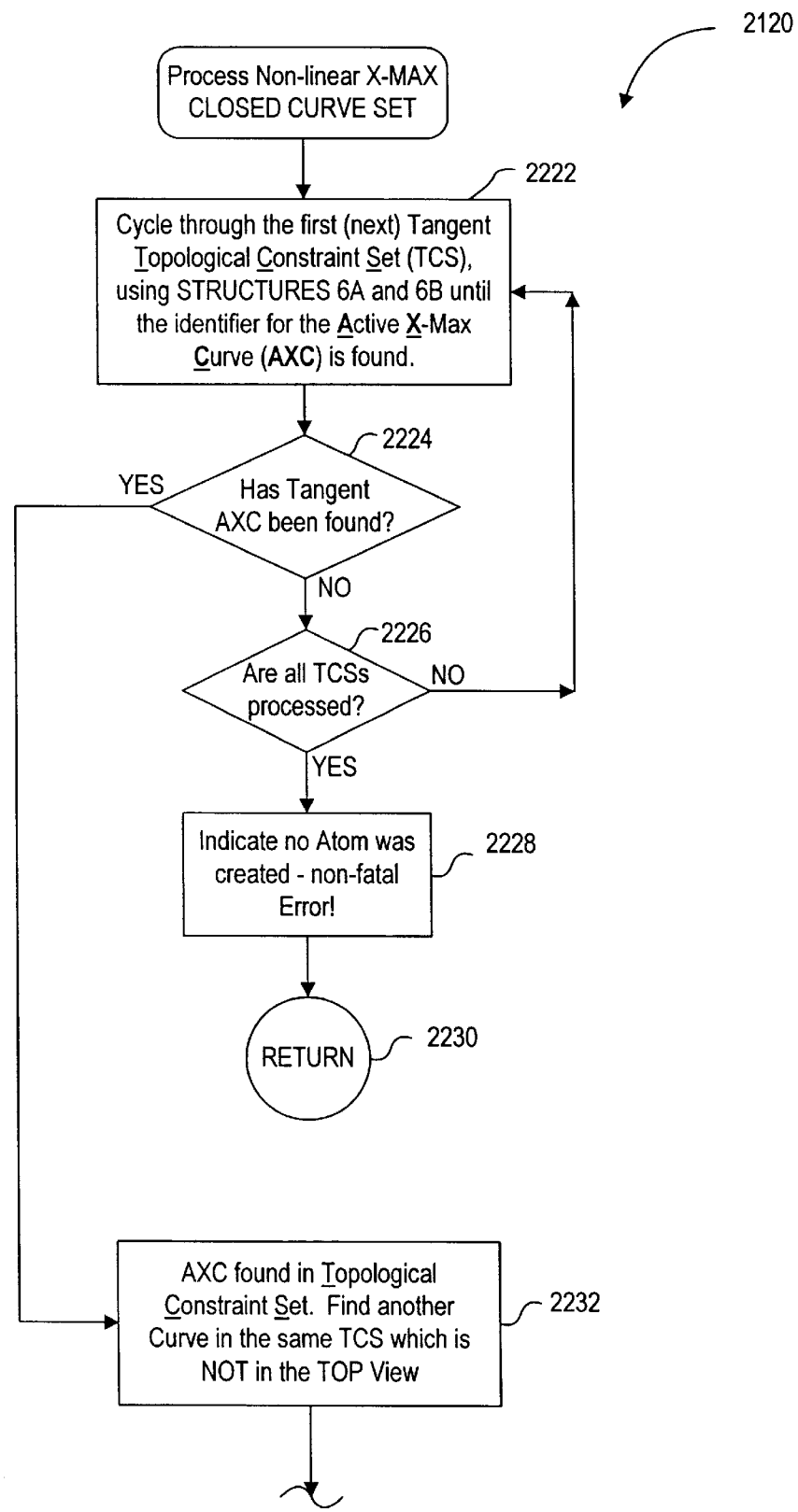
Figure 14H:
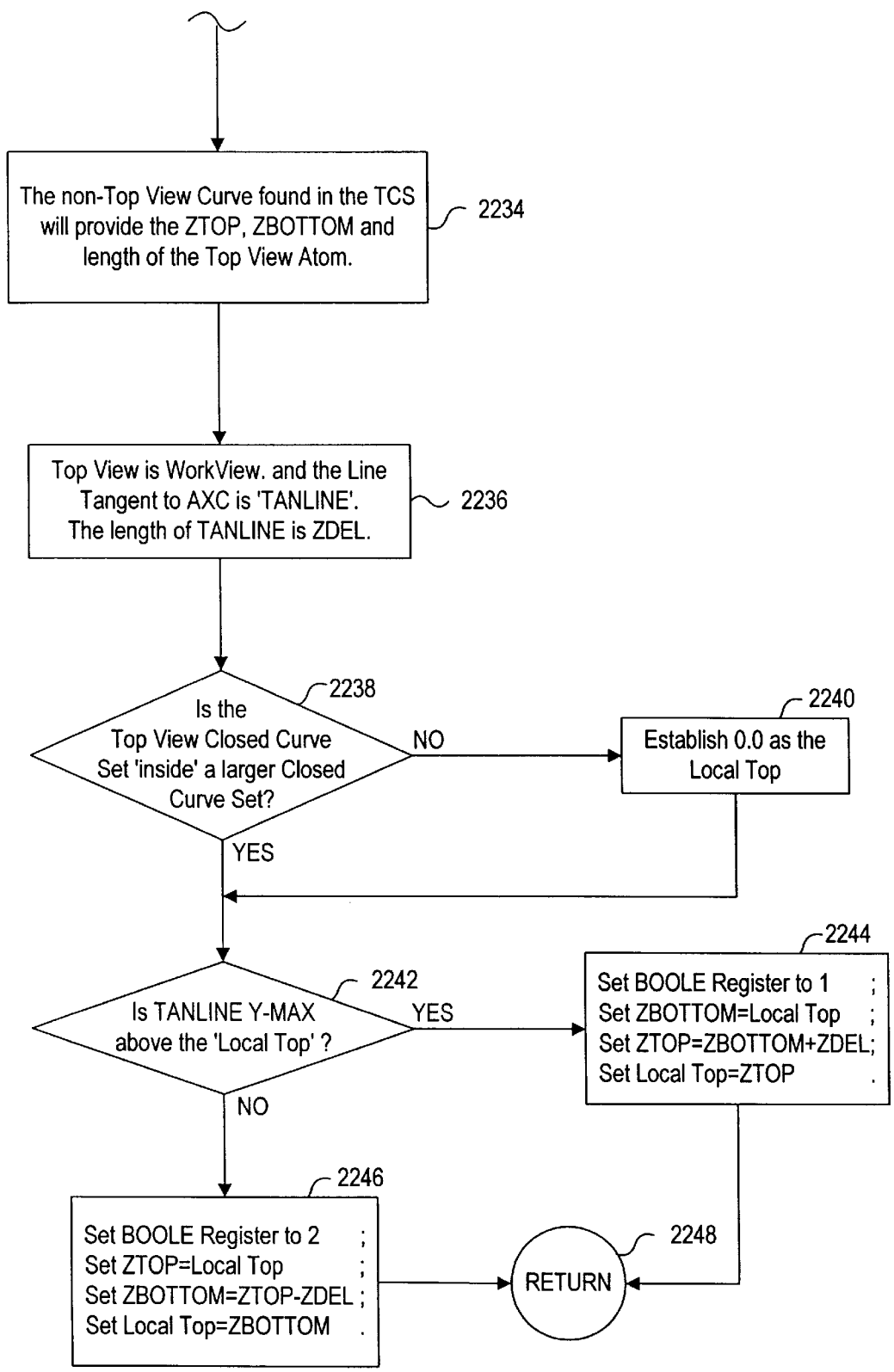
Figure 14I:
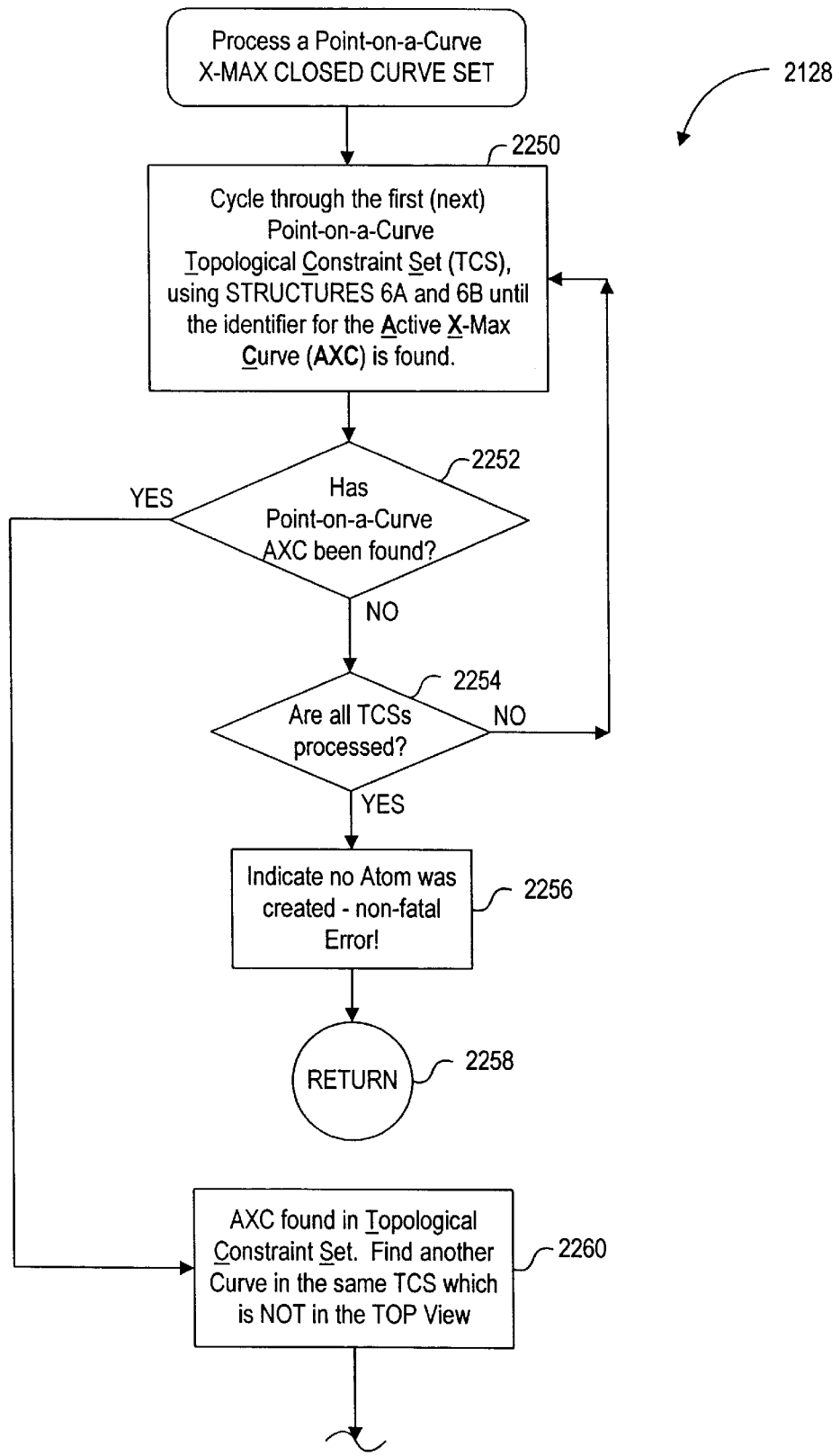
Figure 14J:
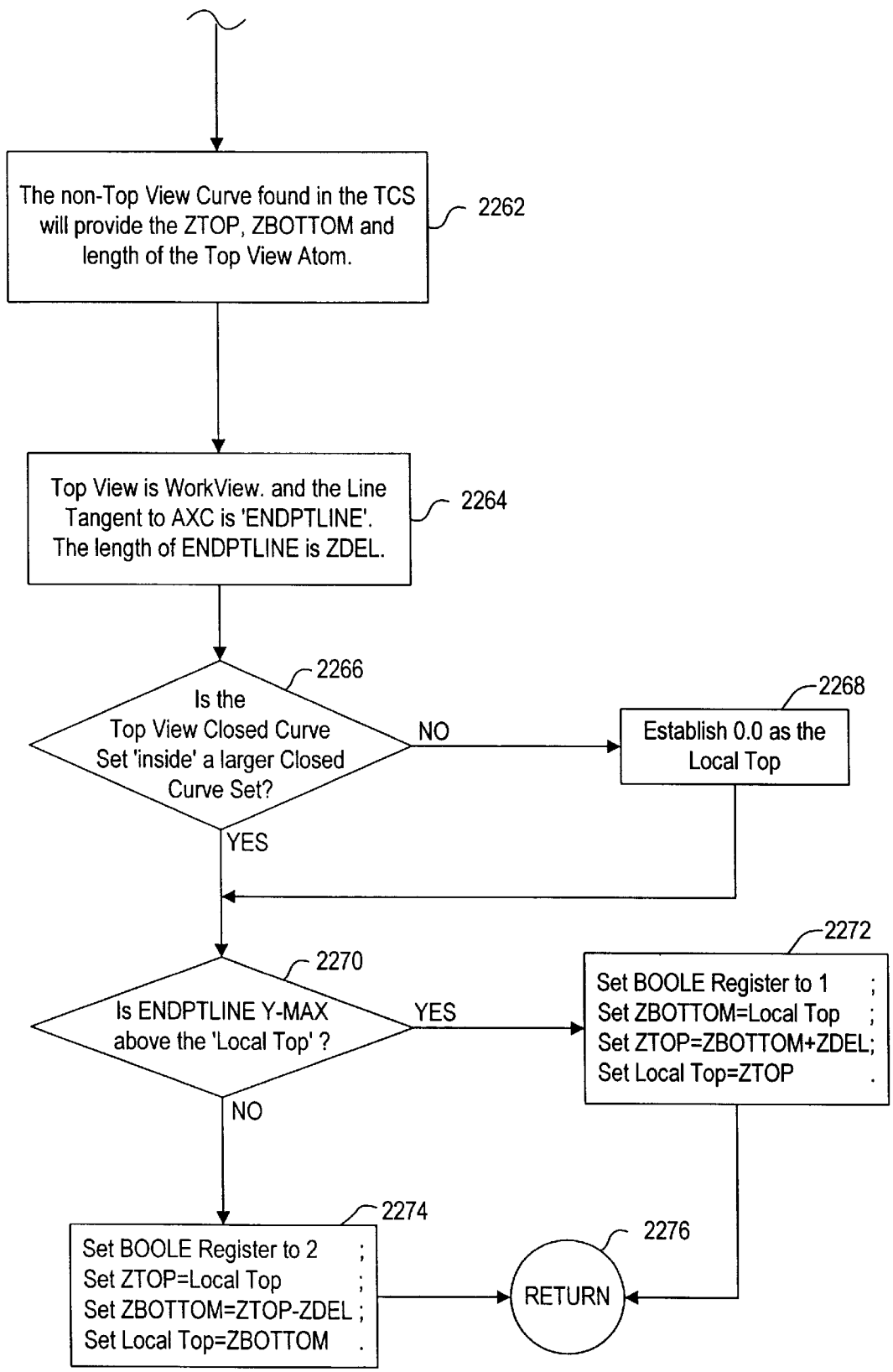
Figure 15A:
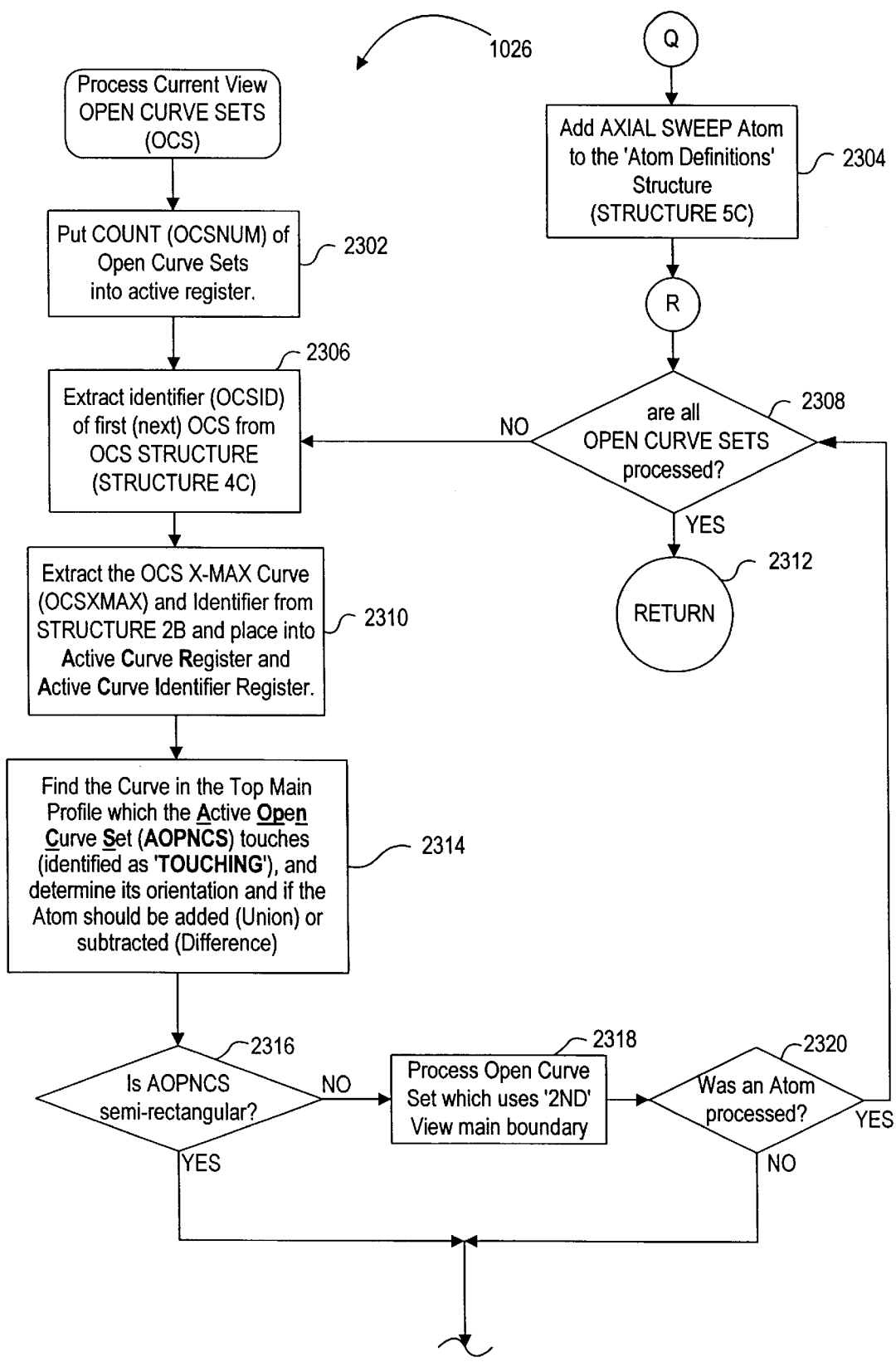
Figure 15B:
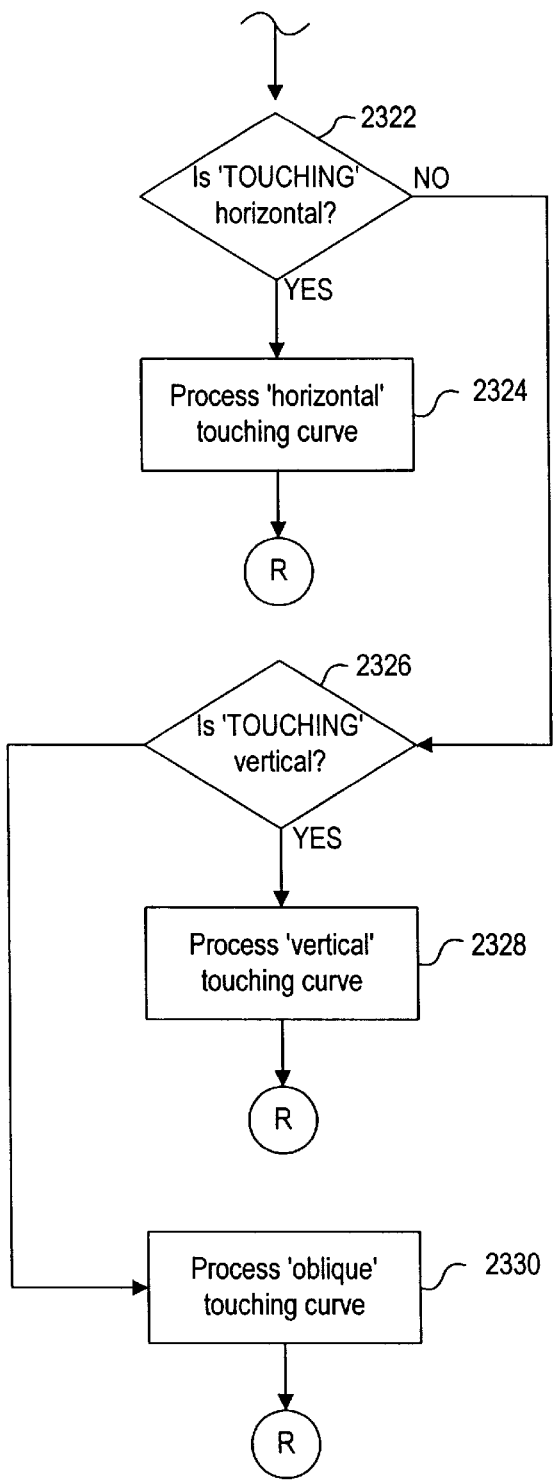

FIGS. 9A, 9B, and 9C set forth an exemplary method of characterizing curve sets as closed, open, or disjoint, in accordance with the present invention;

FIG. 9D depicts exemplary data structures showing the various records comprising the curve topology and closed curve set structures;

FIG. 9E depicts exemplary data structures showing the various records comprising the open curve set and disjoint curve structures;

FIG. 10 is a flowchart setting forth an exemplary method for establishing the main boundary for each view set;

FIG. 11 is a flowchart setting forth an exemplary method for determining the plan view depth;

FIG. 12A is a flowchart setting forth an exemplary method for determining the base solid type and creating said solid;

FIG. 12B depicts exemplary data structures showing the various records comprising the curve identifier structures associated with atom definitions as well as the atom definition structure;

FIGS. 13A–J are flowcharts setting forth an exemplary method for processing disjoint curves;

FIG. 13K depicts exemplary data structures showing the various records comprising the topological constraint identifier structure and the topological constraint set (TCS) structure;

FIGS. 13L and 13M are illustrations of an exemplary method used to position a curve set with respect to the base solid;

FIGS. 14A–J are flowcharts setting forth an exemplary method of processing closed curve sets; and FIGS. 15A–R are flowcharts setting forth an exemplary method of processing open curve sets.

DETAILED DESCRIPTION OF PREFERRED EXEMPLARY EMBODIMENTS

The present invention relates to a computer implemented technique for converting two-dimensional views of a three-dimensional object into a three-dimensional geometric solid. As such, the present invention may be implemented in any number of modalities, for example in the form of a software application for use on a CADD/CAM workstation or other personal computer. Similarly, the present invention may be implemented as a hardware system, for example in the context of a dedicated computer terminal. Alternatively, the system may be implemented in any combination of a hardware, software, or firmware environment, using any convenient user interface, for example conventional computer screen monitors, video monitors, or the like.

Figure 1B:
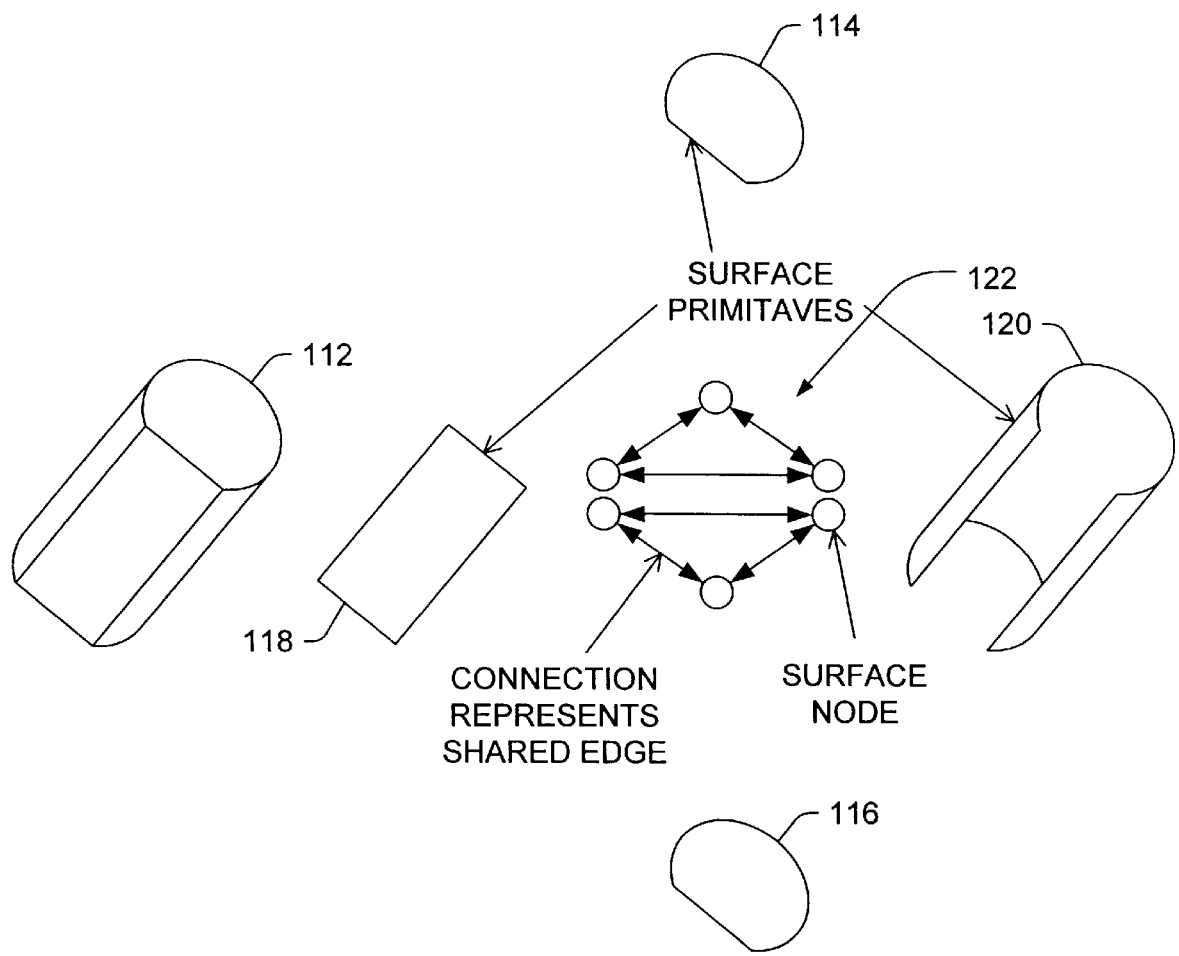
FIG. 1B is an illustration of the B-REP model of solid representation.
Figure 2:
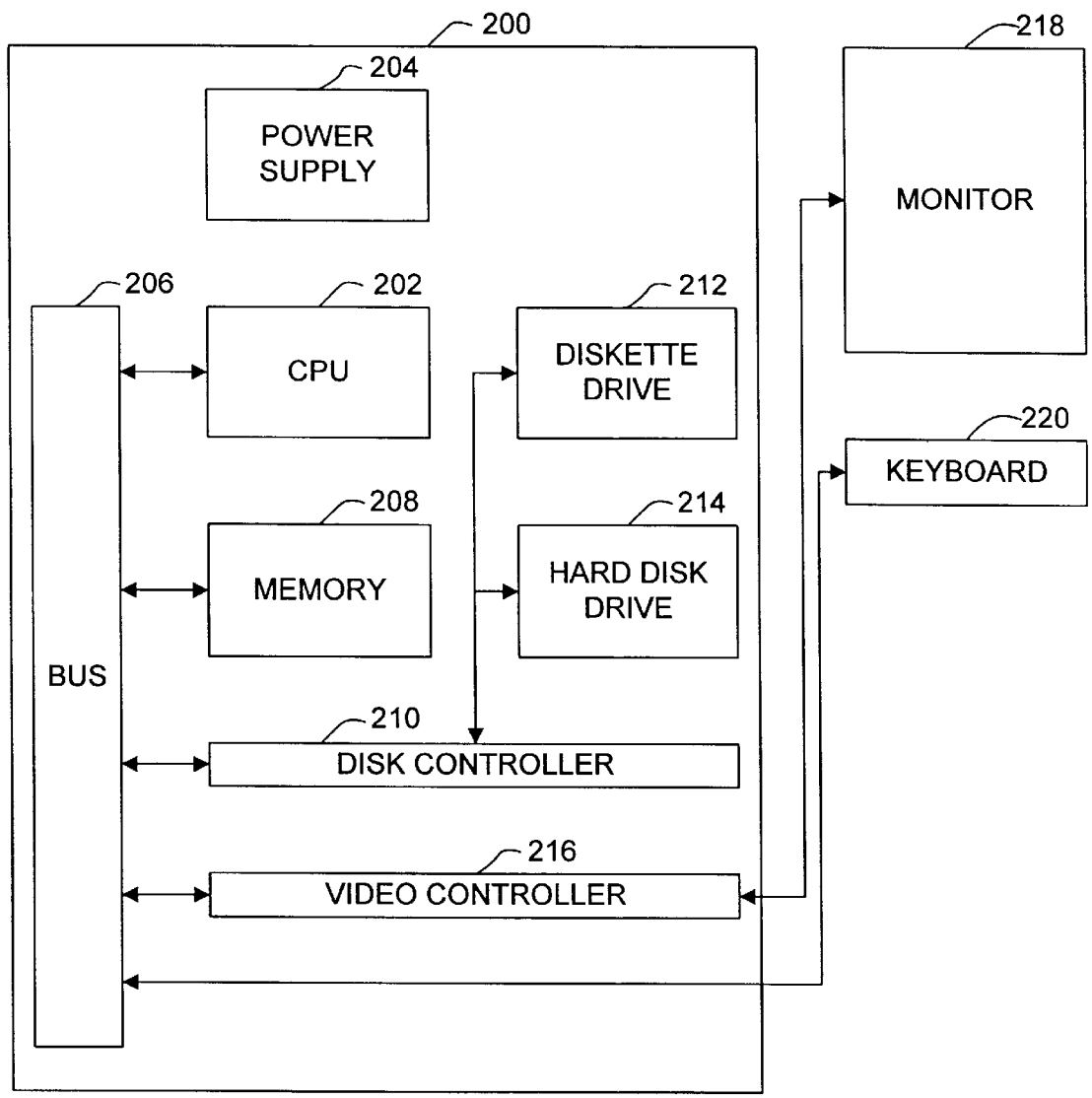
FIG. 2 is a schematic block diagram of an exemplary embodiment of a system in accordance with the present invention.

Referring now to FIG. 2, an exemplary embodiment of the present invention suitably comprises a computer 200, a monitor 218, and an alphanumeric keyboard 220. Computer 200 suitably comprises a CPU 202, a power supply 204, a data communications bus 206, a memory 208, a disk controller 210, a diskette drive 212, a hard disk drive 214, and a video controller 216. Monitor 218 suitably comprises a conventional high resolution video monitor, for example, a monitor of the SVGA type commonly used with personal computers. Computer 200 suitably comprises a conventional desktop computer. Two-dimensional drawing data (described in further detail below) suitably resides and is manipulated within hard disk 212 and memory 208. Said data may be transferred to and from computer 200 through any number of means, such as by diskette, the World Wide Web, serial transfer, smartcard, scanning of hardcopy drawings, or through the interactive generation of data by an operator (e.g., a designer or draftsman) via a software application which runs on computer 200.

It will be appreciated that while various exemplary embodiments described herein comprise a traditional computer system operating in a sequential mode, the present invention may be advantageously utilized in a parallel processing environment.

A general description of the overall theory of operation of a preferred embodiment of the present invention will now be provided, followed by a more detailed discussion of the various steps, components, and logical modules for implementing the overall theory of operation.

Figure 4:
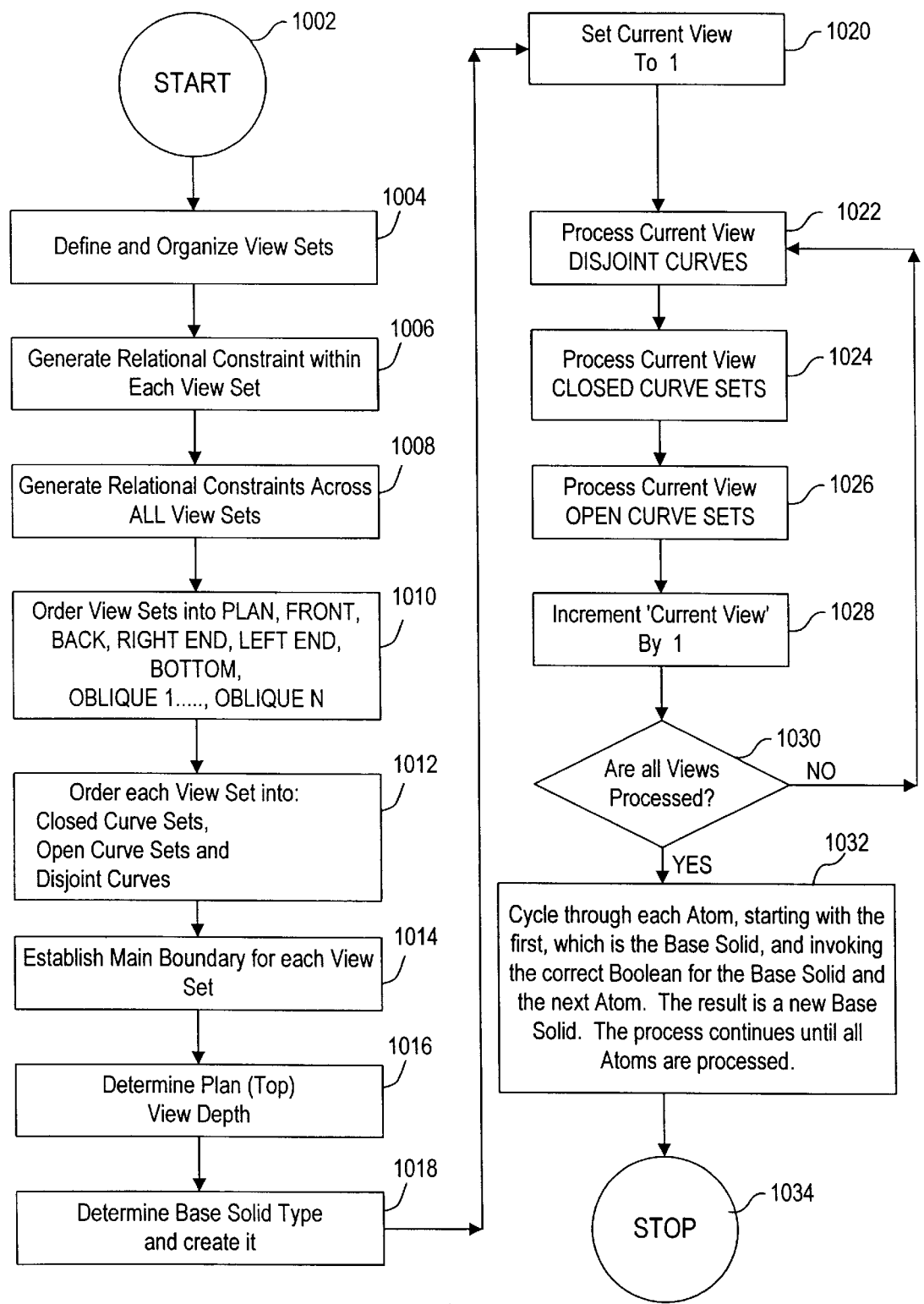
FIG. 4 is a flowchart showing an overview of an exemplary three-dimensional object generation method in accordance with the present invention.

Referring now to FIG. 4, a flow chart of the general theory of operation of the present invention is provided.

Upon system start up (Step 1002), the various flags, registers, switches, and the like associated with a software implementation of the subject invention are initialized.

Upon identifying a particular two-dimensional data set for which a three-dimensional drawing is desired, either by interactively generating the data set, retrieving it from memory, reading the data set from a disk, smartcard, or other interface, the data set is then organized into a plurality of view sets (Step 1004).

Figure 3:
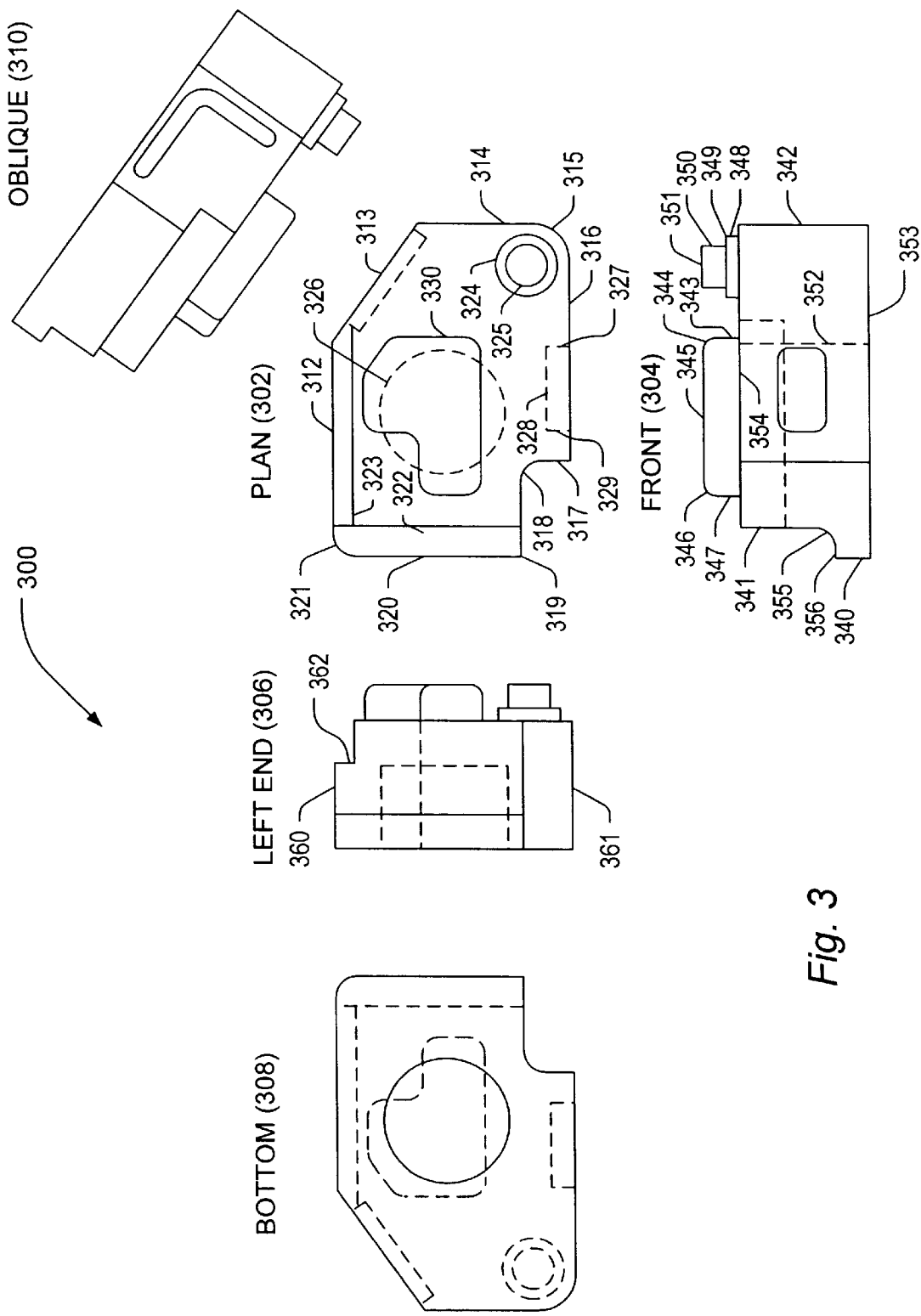
FIG. 3 is an example of a two-dimensional drawings corresponding to five views of a three-dimensional object.

More particularly and with momentary reference to FIG. 3, a series of two-dimensional views are typically utilized to define a three-dimensional object. For purposes of this discussion, each two-dimensional "view" is said to comprise a plurality of geometric "entities", which entities primarily comprise lines and arcs, but which also include splines, conics, and other features which make up a two-dimensional drawing. A particular two-dimensional view in this context refers to a planar projection of the three-dimensional object, for example a top (plan) view, front view, left view, right view, back view, bottom view, or oblique view. Moreover, a "view set" in the context of the present invention refers to the set of entities as seen in a particular view along with any applicable relations among those entities. For example, FIG. 3 comprises five (5) view sets, corresponding to a plan view 302, a front view 304, a left end view 306, a bottom view 308, and an oblique view 310. It will be appreciated, however, that a drawing may comprise virtually any number of view sets to adequately define an object, depending on the complexity of the object. In this regard, it should be noted that the system may accept drawing data in a variety of formats. For example, the user may import data from the popular Initial Graphic Exchange Standard (IGES), or "STEP" (ISO 10303 Standard for the Exchange of Product Model Data)—an international standard of increasing use in the industry—as well as many lesser used standards.

Referring again to Step 1004 in FIG. 4, the organization of view sets may be performed in a variety of ways. For example, in many instances this step may be performed manually. Such manual organization will typically require the user to select, via the system's graphical user interface, a set of drawing elements and designate those elements as comprising a separate, unique view set. Alternatively, the organization of view sets may be implicit in the data itself. More particularly, the data might be imported from a system in which the view set groupings are determined by the user during the design process itself (for example, the user may create the drawing in separate predefined windows corresponding to various views).

In a preferred embodiment, the organization of view sets is performed automatically. In this mode, the system determines which curves should be grouped together by examining, among other things, the relative proximity of the various geometric elements and chains of curves within the drawing. The manner in which the system performs this organization is explained in conjunction with FIGS. 5A and 5B below.

After organizing the two-dimensional drawing elements into view sets, the system then generates relational constraints among the various entities within a view set for each view set (Step 1006). More particularly, a table is suitably generated for each view set which identifies and characterizes each and every entity (sometimes also referred to as an element) (e.g., line, arc, spline, etc.) within that view set.

More particularly, of the universe of geometric, spatial and other relationships which are possible among entities, the following subset of topological constraints (also referred to as relations or constraints) are advantageously employed in the context of a preferred embodiment of the present invention: coincident arcs, coincident endpoints, collinear endpoints, collinear lines, concentric arcs, endpoints on a curve, equal distance, equal length, equal radius, horizontal, parallel, perpendicular, symmetric, tangent, vertical, and fixed (datum).

Coincident arcs may be defined as entities which share the same center, radius, start angle, and end angle within a particular planar view. Coincident endpoints are points which correspond (within some predefined tolerance) within a planar view. Collinear lines are entities (straight line segments) that lie on a single line. Concentric arcs are entities (arcs) which have the same center within a planar view, but which may not have the same radius or start and end angles. Endpoints on a curve refer to elements with at least one endpoint lying on another element—i.e., an element which terminates at its intersection with another element. Equal distance refers to a series of elements distributed at equal intervals along a line. Equal length refers to elements whose scalar lengths are equal. Equal radius refers to elements (arcs and circles) whose scalar radius values are equal. Horizontal and vertical refer to lines which are parallel to the horizontal and vertical axes, respectively. "Endpoint on a curve" refers to the case where at least one of an element's endpoints lie on a curve—i.e., when one curve terminates at another curve. Parallel, perpendicular, tangent, and symmetric are relations well known in the art.

Note that not just lines, but also pairs of curves, may be perpendicular at a point, and that two curves may also be parallel or tangent to each other.

Referring momentarily to FIG. 3, it can be seen that a single element may be subject to many different relations with respect to other elements in a view set. For example, line 312 in plan view 302 shares coincident endpoints with both arc 321 and line 313. It is also parallel to a number of other lines in the view, including line 323 and line 328, as well being perpendicular to others, such as line 330 and line 314.

Figure 6A:
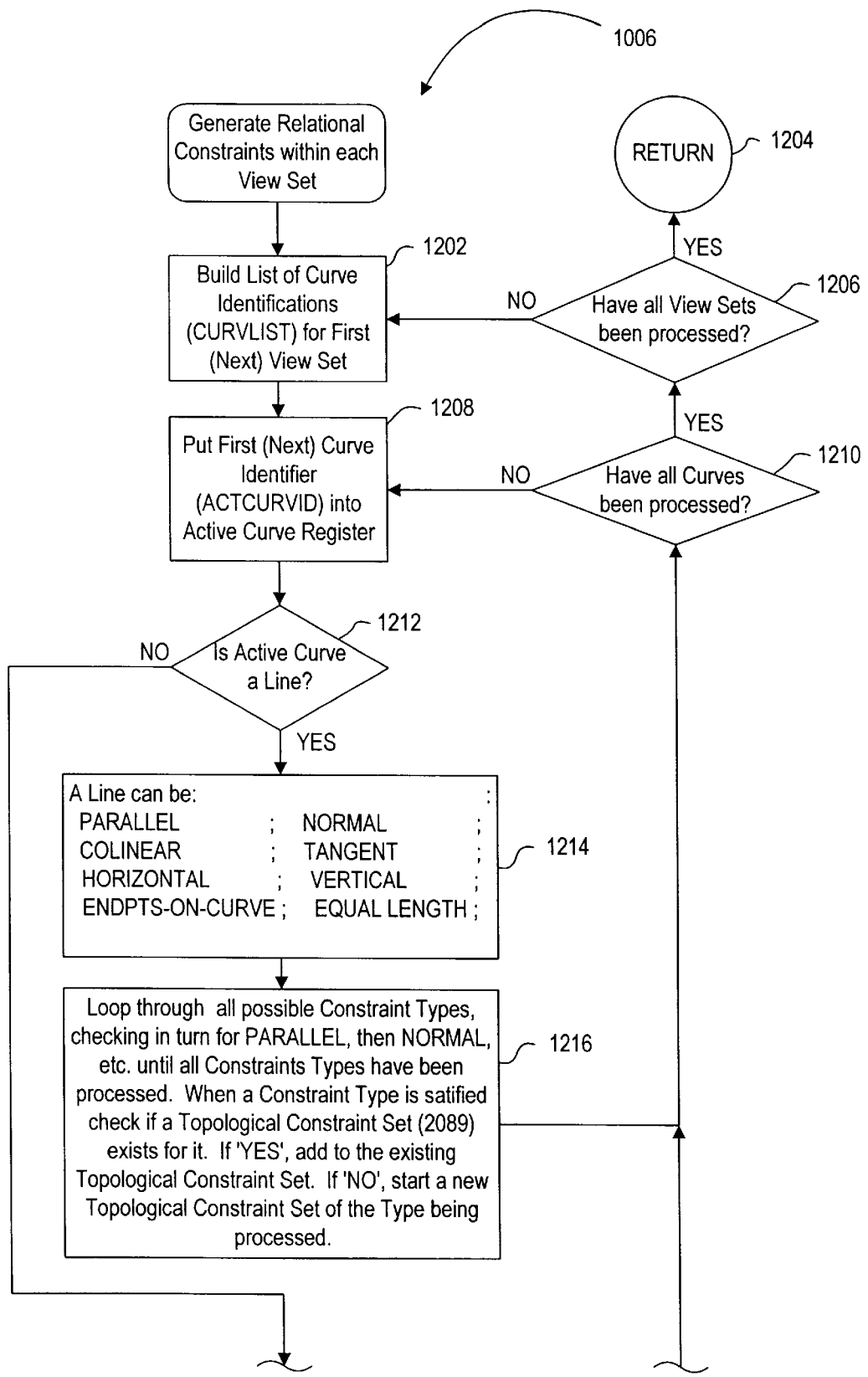
FIGS. 6A and 6B are flowcharts setting forth an exemplary method of determining relational constraints within a view set.
Figure 6B:
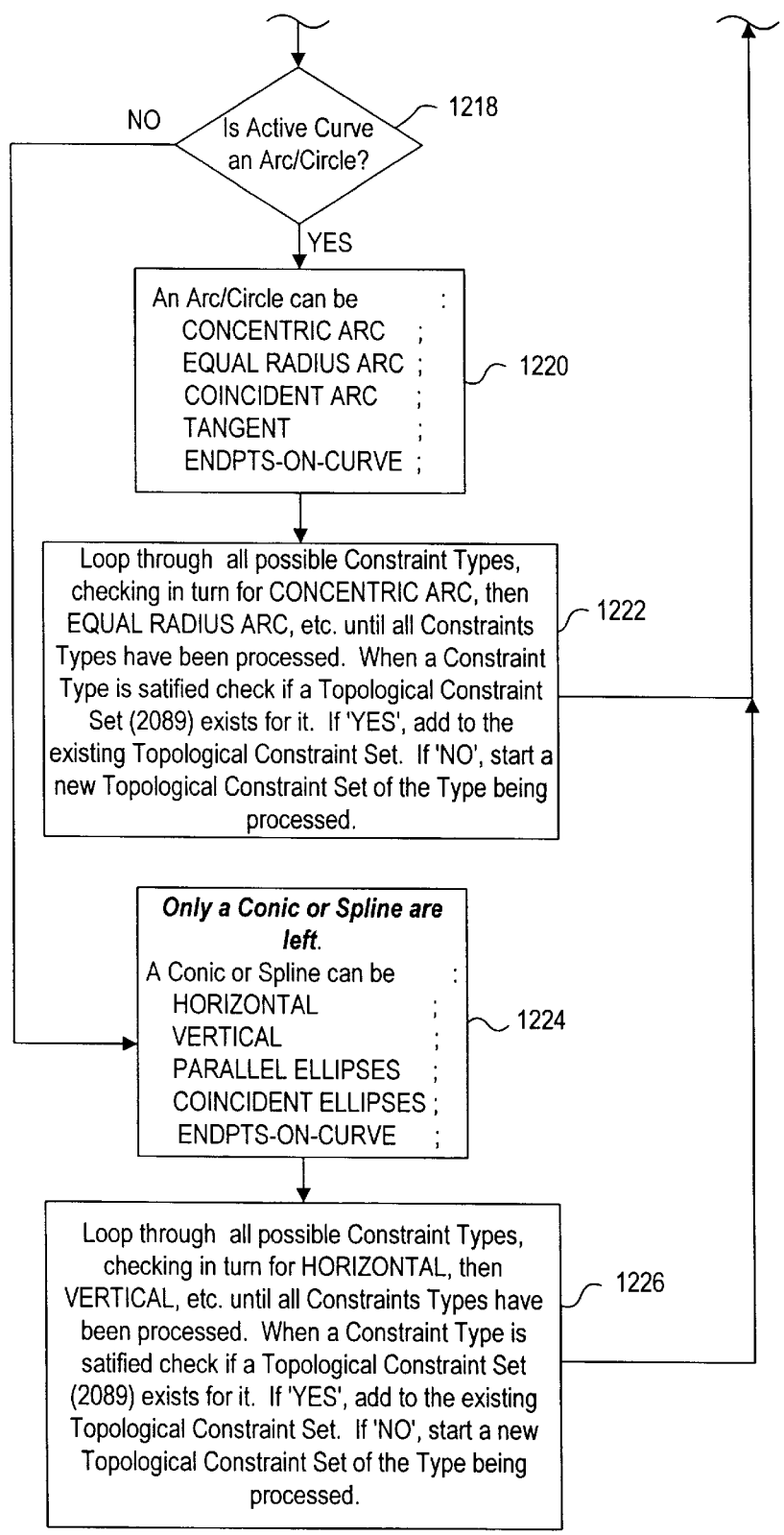

The particular manner in which the system analyzes the various elements within a view set (or among view sets) and establishes the relations among the various elements within a view set is described in greater detail below in conjunction with FIGS. 6A and 6B.

Referring now to Step 1008, the system then generates a second table, which advantageously exhibits structure similar to that described above in conjunction with Step 1006, setting forth all entities for all views and the relational constraints exhibited by each entity with respect to all other entities in all other view sets. Stated another way, the system then identifies the relationship between a particular entity and all other entities contained in all other view sets, and performs this operation for every entity in every view set. For example, with reference to FIG. 3, it can be seen that line 350 in front view 304 is tangent to circle 325 in plan view 302, and line 314 is collinear with line 342. These and all other combinations of relations between view sets are compiled by the system in Step 1008.

In this regard, it is worth noting that when a machinist studies a drawing containing a plurality of two-dimensional views, many of the relationships between an entity in one view and a related entity in another view may be ascertained by the machinist by inspecting the drawing. Indeed, it is the machinist's experience, intellect, and intuition which allows the machinist to create a three-dimensional mental picture of the object by understanding the various two-dimensional views set forth in the drawing. In Step 1008, the system of the present invention imitates the mental processes performed by the machinist, and executes a rules engine for interpreting the relationships between entities in different views to facilitate the generation of a three-dimensional drawing, as discussed in greater detail below. The method of generating relational constraints across view sets is described in greater detail below in conjunction with FIG. 7.

After generating all applicable relations, the system then prioritizes the various view sets (Step 1010), for example by identifying the main or plan view, and thereafter defining the relationship of each of the other views with respect to the main view. The method employed by the system in defining view sets is discussed in conjunction with FIGS. 8A and 8B below.

With reference to step 1012, the system then examines each view set, and divides the elements comprising a view set into a unique one of the following three categories: closed curve sets, open curve sets, and disjoint curves.

More particularly, a disjoint curve is a single element that shares no endpoints with any other element within the view set. With momentary reference to the sample drawing shown in FIG. 3, lines 322 and 323 in plan view 302 are examples of disjoint curves, inasmuch as neither line shares an endpoint with any other curve in the view set.

An open curve set is a chain of curves wherein (1) each successive curve shares an endpoint with the previous curve, and (2) the chain of curves is not closed—i.e., two elements within the chain each have one endpoint not coincident with any other element within the view set. Referring again to FIG. 3, lines 327, 328, and 329 in plan view 302 represent an example of an open curve set.

A closed curve set is a chain of curves wherein (1) each successive curve shares an endpoint with the previous curve, and (2) the chain of curves is closed (there are no open endpoints). In FIG. 3, the outer boundary defined by arc 321, line 312, line 313, line 314, arc 315, line 316, line 317, arc 318, line 319, and line 320 is an example of a closed curve set. The manner in which the system categorizes curve sets is discussed in greater detail with FIGS. 8A, 8B, and 8C below.

Having characterized each element of each view set as belonging to either a closed curve set, an open curve set, or as a disjoint curve, the system then establishes the main boundary for each view set (Step 1014). In particular and again referring to FIG. 3, the main boundary for each view set may be described as the closed curve set having the largest area. The manner in which the system determines the main boundary for each view set is discussed in greater detail below in conjunction with FIG. 10.

The system then isolates the main boundary for the plan view, and determines the view depth of the plan view main boundary (Step 1016). At a first level, this corresponds to identifying the gross shape of the main portion of the object under inspection, which may be thought of as corresponding to the main boundary as seen in the top view, and then sweeping that main boundary vertically to create a three-dimensional main boundary. The extent to which this main boundary as seen in the plan view is swept vertically may be determined by inspecting the relationship between the plan view main boundary to the front view of that same main boundary as seen in the front view. An exemplary procedure for determining the view depth of the main boundary is described below in conjunction with FIG. 11.

Having determined the view depth of the main boundary of the plan view, the system then creates a base solid by performing, for example, an axial sweep (Step 1018). In this regard, it should be appreciated that an axial sweep is but one of a plurality of techniques for generating a base solid, depending upon the particular configuration of the object under inspection. More particularly, there are three primary classes of solid generation methods: axial sweeps, rotational sweeps, and blended solids.

Axial sweeps are solids defined by the volume created by translation of a planar object axially through space. For example, a cylinder can be created through axial sweep of a circle. Rotational sweeps are solids defined by the volume created by rotation of a planar object through space around a line. Blended solids are solids defined by a series of curves, wherein straight, smooth, or rotational blends are used to transition along each successive curve.

Having created the base solid in Step 1018, the system then sets a "current view" flag to "one" (Step 1020); that is, the plan view is considered first.

Next, the set of disjoint curves within the current view are processed (Step 1022). This processing involves, in a broad sense, identifying disjoint curves in the current view then forming a solid atom to operate on the base solid using corresponding curves (e.g., collinear and tangent curves) present in other views. A detailed description of an exemplary method of processing disjoint curves is presented below in conjunction with FIGS. 13A through 13M.

Having processed the disjoint curves in Step 1022, the system then processes all closed curve sets within the current view (Step 1024). An exemplary method of processing closed curve sets is presented below in conjunction with FIGS. 14A through 14J.

Finally, having processed all closed curves in Step 1024, the system then processes all open curve sets within the current view (Step 1026). An exemplary method of processing open curve sets is presented below in conjunction with FIGS. 15A through 15P.

Having processed all disjoint, closed, and open curve sets, the system then increments the "current view" flag by one (Step 1030), then queries whether all views have been processed (Step 1030). If not, then Steps 1022, 1024, 1026, and 1028 are repeated until all views have been processed, at which time the system stops (Step 1032).

Finally, after processing all curve sets, the system takes the first two atoms (atom number one being the base solid generated previously in Step 1018) and, in accordance with methods well known in the art, applies the corresponding Boolean operation to the base solid. The resulting solid then becomes the new working base solid, and the system continues through the list of atoms until the finished geometric solid is created (Step 1032). After all views have been processed, a true three-dimensional geometric model of the target solid will reside in the system in such a form that it can be altered, supplemented, and exported for subsequent use. For example, the finished solid data may be exported to a variety of finite-element packages for further thermo-mechanical simulation. Similarly, in a production environment, the solid data may be exported to an automated system suitable for fabrication of a finished product, for example, a numerical control system (NC).

Having presented an overview of the general theory of operation in conjunction with FIG. 4, a more detailed description of the various steps will now be presented.

Figure 5A:
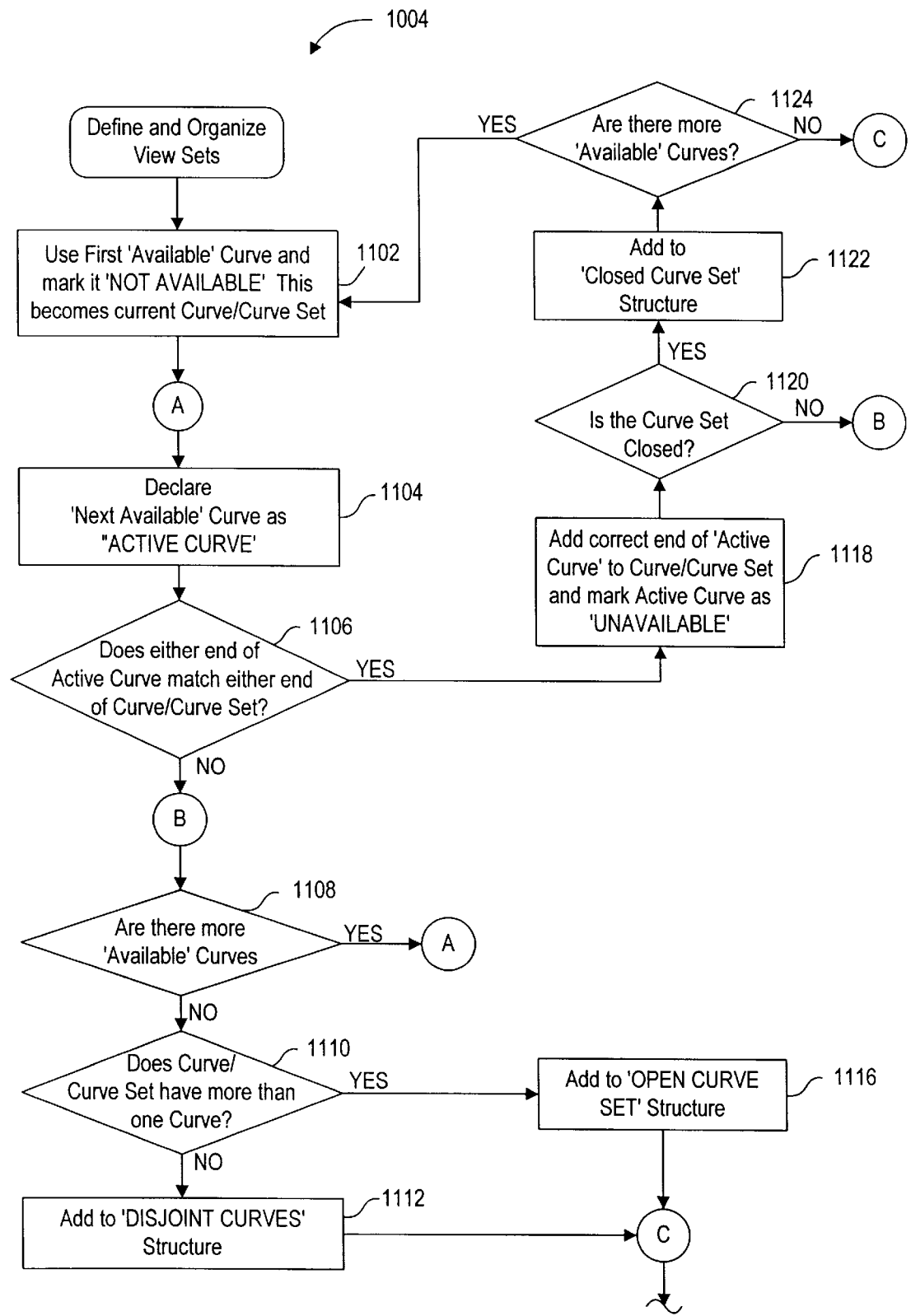
FIGS. 5A and 5B are flowcharts setting forth an exemplary method for automatic definition and organization of view sets in accordance with the present invention.

Referring now to FIG. 5A, an exemplary method of automatically organizing view sets (Step 1004 in FIG. 4) will now be described. As noted above, the process of organizing view sets—i.e., segmenting all drawing elements into groups corresponding to their respective views—may suitably be (1) performed manually by an operator, (2) implicit in the data itself, or (3) performed automatically (or interactively) by the system.

In the automatic mode, the general flow presented in FIG. 4 may be advantageously modified. Specifically, as automatic organization requires categorization of curve sets as open, closed, and disjoint, the ordering procedure of Step 1012 as detailed below in conjunction with FIGS. 9A, 9B, and 9C is performed first. That is, if an operator chooses to allow the system to organize view sets, then Step 1012 is performed prior to step 1006; as such, Step 1012 need not be repeated between Steps 1010 and 1014.

Figure 5B:
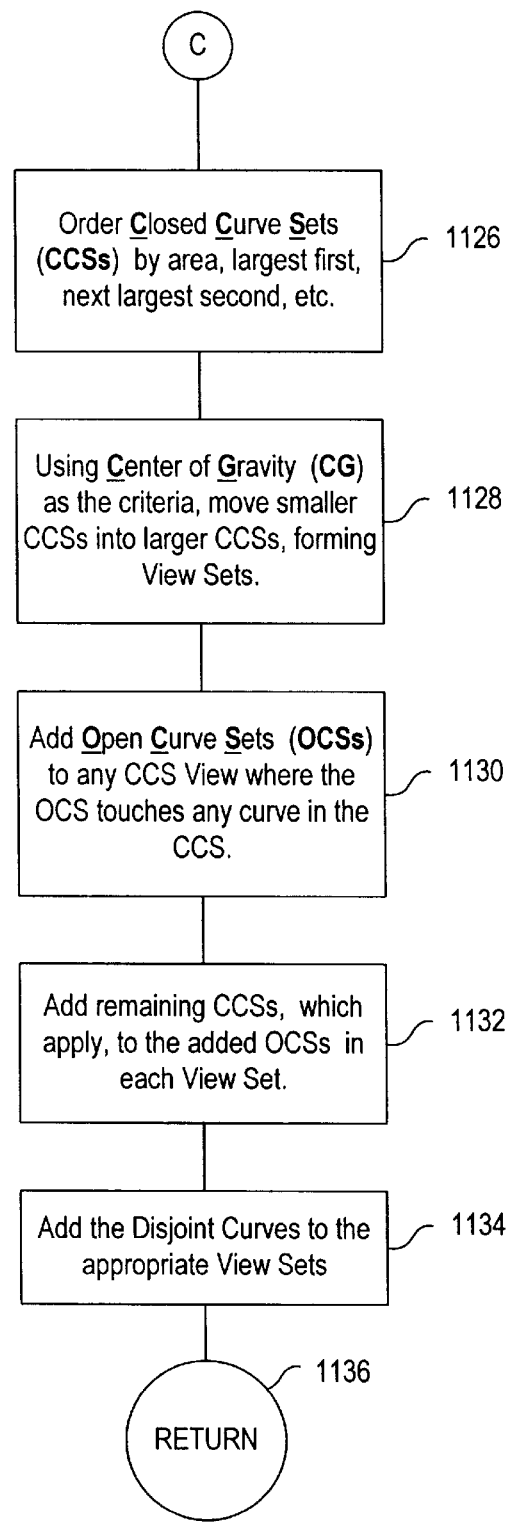

Assuming that all curves have been categorized as open, closed, or disjoint, the system then continues as shown in FIG. 5B. First, the closed curve sets are ordered by decreasing area (Step 1126). Next, the center of gravity of each closed curve set is examined, and smaller closed curves with centers of gravity within larger closed curves are grouped with those larger closed curves (Step 1128). The phrase "center of gravity" in the context of the present invention suitably refers not to the precise computation required to compute the centroid of the region, but rather to the approximate coordinates calculated by computing the average of the X and Y extrema ranges; that is the center of gravity is approximated as (x,y) where x=(XMAX−XMIN)/2 and y=(YMAX−YMN)/2. This approximation is adequate for the purpose of ordering and arranging view sets, although a more precise method may be used.

Suitable methods for computing the area of polygon in the context of the present invention include, for example, performing a planar integration of the area bounded by the curves or, when only a reasonable approximation is necessary, computing the area as:

$$\text{Area} = \tfrac{1}{2}((x_1{}^*y_2 + x_2{}^*y_3 + \ldots + x_n{}^*y_1) - (y_1{}^*x_2 + y_2{}^*x_3 + \ldots + y_n{}^*x_1))$$

where $(x_i, y_i)$ are coordinates of the vertices of a polygon defined by $(x_1, y_1), (x_2, y_2), (x_3, y_3), \ldots, (x_n, y_n), (x_1, y_1)$.

After grouping closed curve sets as set forth above, open curve sets are then considered (Step 1130). Each open curve set is examined to determine whether it intersects or touches any closed curve. If so, then that open curve set is grouped with the closed curve. It should be noted that, in the context of a preferred embodiment of the invention, every open curve necessarily makes contact with at least one closed curve; that is, open curve sets should not exist in isolation within a well-formed two dimensional drawing of a three-dimensional object, since the resulting solid would likely be indeterminate and hence of limited utility.

Next, the system adds remaining closed curve sets to the sets thus far determined (Step 1132). Finally, each disjoint curve is added to the appropriate view set much in the same way open curve sets were dispositioned—i.e., by looking for points of contact between the open curve set and other curves already categorized (Step 1134).

Having thus described a method of organizing view sets, an exemplary method of generating relational constraints within each view set will now be described. As a preliminary matter, an exemplary data structure used to characterize topological constraints will now be described in detail.

Referring now to FIG. 13K, the system suitably generates a table 2088 which suitably comprises a data structure used to store information regarding relations (sometimes also referred to as topological constraints); in a preferred embodiment, a separate data structure 2088 may suitably be created for each view set. Alternatively, a single data structure 2088 may be generated which includes the relational constraint information within a view set, for all view sets.

Data structure 2088 suitably comprises a first entry 2089 which suitably stores indicia of the number of topological constraint sets (nTCS) within the data structure 2088. Data structure 2088 may also comprise respective entries 2090(*a*), 2090(*b*) . . . 2090(*n*), with each respective entry 2090 suitably comprising a unique identifier which identifies a unique, corresponding topological constraint set. In this regard, FIG. 13K sets forth an exemplary schematic representation of a suitable topological constraint set 2091. That is, a plurality of constraint sets 2091 (not shown) are generated, with each one being identified by one of the identifiers 2090(*a*)–2090(*n*).

With continued reference to FIG. 13K, an exemplary data structure 2091 suitably comprises a first field 2092 which identifies the type of topological constraint associated with that particular topological constraint set (TCS). As discussed above, a topological constraint set may comprise a set of entities which exhibit the relation "parallel", the relation "normal", the relation "collinear lines", and so on. Thus, in accordance with the illustrated embodiment, entry 2092 in each data structure 2091 suitably comprises indicia of a unique one of the aforementioned relations which, in a preferred embodiment, comprise a total of seventeen (17) possible relations (parallel, normal, collinear lines, tangent, horizontal, vertical, symmetry, collinear end points, end points on a curve, concentric arcs, coincidental arcs, fixed (datum), point on two curves, coincident points, equal radius arcs, equal length lines, and equal distance.

With continued reference to FIG. 13K, data structure 2091 suitably comprises a second field 2093, which corresponds to the number of elements (sometimes also referred to as entities or simply "curves" herein) which share the topological constraint set forth in entry 2092 of the data structure. In this regard, if data structure 2092 relates to a particular topological constraint for a view set, the number set forth in entry 2093 will correspond to the number of elements within that view set which share the relations set forth in entry 2092; alternatively, if data structure 2091 relates to an entire drawing (corresponding to a plurality of view sets), then the number in entry 2093 suitably corresponds to the total number of curves in all of the view sets which share the relation defined in entry 2092.

Respective entries 2094(a), 2094(b) . . . 2094(n) of data structure 2091 suitably identify the particular elements (or curves) which share the relation defined in entry 2092. It will be appreciated that the number of entries should correspond to the numbers set forth in entry 2093.

With continued reference to FIGS. 3 and 13K, a specific example of a topological constraint set will now be described to further clarify the nature of the data set forth in data structure 2089. Let us select the topological constraint "tangent" for this example, such that some convenient indicia of the "tangent" relation would be set forth in entry 2092. Let us further assume that the data structure 2091 relates to all of the view sets shown in FIG. 3, as opposed to relating to only a single view set within FIG. 3. In that case, the number of elements shown in FIG. 3 which share the "tangent" relation with the other elements to be listed would be set forth in entry 2093. Although a number of elements within the various view sets shown in FIG. 3 satisfy the "tangent" relation, the following specific examples illustrate the nature of the data in data structure 2091, while at the same time highlight the manner in which the present invention emulates the experience and intellect of a machinist by embodying some of the essential techniques mentally employed by machinists into executable codes.

With reference to element 324 in plan view 302 of FIG. 3, it can be seen that line segment 348 is tangent to curve 324. Thus, an identifier corresponding to curve 324 might suitably be set forth in first curve identifier field 2094(a), while an identifier associated with curve 348 might suitably be set forth in second curve identifier entry 2094(b). Similarly, it can also be seen that line 350 (shown in front view 304 of FIG. 3) is tangent to circle 325 (shown in plan view 302); hence, respective identifiers for each of curve 350 and 325 would also be suitably set forth in respective curve identifier entries within data structure 2091.

Moreover, a separate data structure 2091 is advantageously constructed for each of the possible topological constraints set forth in field 2092, although it will be understood that only a subset of the various possible constraints will exist for any particular drawing.

Having thus described exemplary data structures used to characterize topological constraints, an exemplary method generating said constraints will now be described. Referring now to FIGS. 6A and 6B, the system first builds a list of curve identifiers (CURVLIST) for the first view set (Step 1202). Next, the first curve identifier (ACTCURVID) is placed into the active curve register (Step 1208).

In Step 1212, the system queries whether ACTCURVID is a line. If so, the system proceeds to Step 1214; if not, the system proceeds to Step 1218, described below.

In the case where ACTCURVID is a line ("yes" branch from Step 1212), the system in Steps 1214 and 1216 loops through all possible constraint types that can apply to a line (suitably comprising parallel, collinear, horizontal, endpoint-on-a-curve, normal, tangent, vertical, and equal length) and when a constraint type is satisfied, checks whether a TCS exists for it. If such a TCS exists, the system adds ACTCURVID to the existing TCS; if not, the system starts a new TCS of the type being processed. After thus creating or appending to a TCS, the system queries whether All curves have been processed (Step 1210). If so, the system continues at Step 1206, described below; if not, the system selects the next curve identifier in CURVLIST, places it in the active curve register, and continues as before at Step 1212.

In the case where the active curve is not a line ("no" branch in Step 1212), the system queries whether the active curve is an arc or circle (Step 1218). If not, the system proceeds to Step 1224, described below. Referring now to FIG. 6B, if the active curve is a spline, the system in Steps 1220 and 1222 loops through all possible constraint types that can apply to an arc (suitably comprising concentric arc, equal radius arc, coincident arc, tangent, endpoints-on-a-curve) and when a constraint type is satisfied, checks whether a TCS exists for it. If such a TCS exists, the system adds ACTCURVID to the existing TCS; if not, the system starts a new TCS of the type being processed. After thus creating or appending to a TCS, the system queries whether All curves have been processed (Step 1210). If so, the system continues at Step 1206, described below; if not, the system selects the next curve identifier in CURVLIST, places it in the active curve register, and continues as before at Step 1212.

If at Step 1218 the system did not find an arc or circle, the system comprehends in an exemplary embodiment that the active curve must be either a conic or a spline. The system in Steps 1224 and 1226 loops through all possible constraint types that can apply to a conic or spline (suitably comprising horizontal, vertical, parallel ellipses, coincident ellipses, and endpoint-on-a-curve) and when a constraint type is satisfied, checks whether a TCS exists for it. If such a TCS exists, the system adds ACTCURVID to the existing TCS; if not, the system starts a new TCS of the type being processed. After thus creating or appending to a TCS, the system queries whether All curves have been processed (Step 1210). If so, the system continues at Step 1206, described below; if not, the system selects the next curve identifier in CURVLIST, places it in the active curve register, and continues as before at Step 1212.

In Step 1206, after the system has processed all curves and identified their respective topological constraint sets, the system queries whether all view sets have been processed. If not, the system loops back to Step 1202, increments the view, and continues as before with Step 1208. If all view sets have been processed, the system exits the subroutine (Step 1204).

Figure 7:
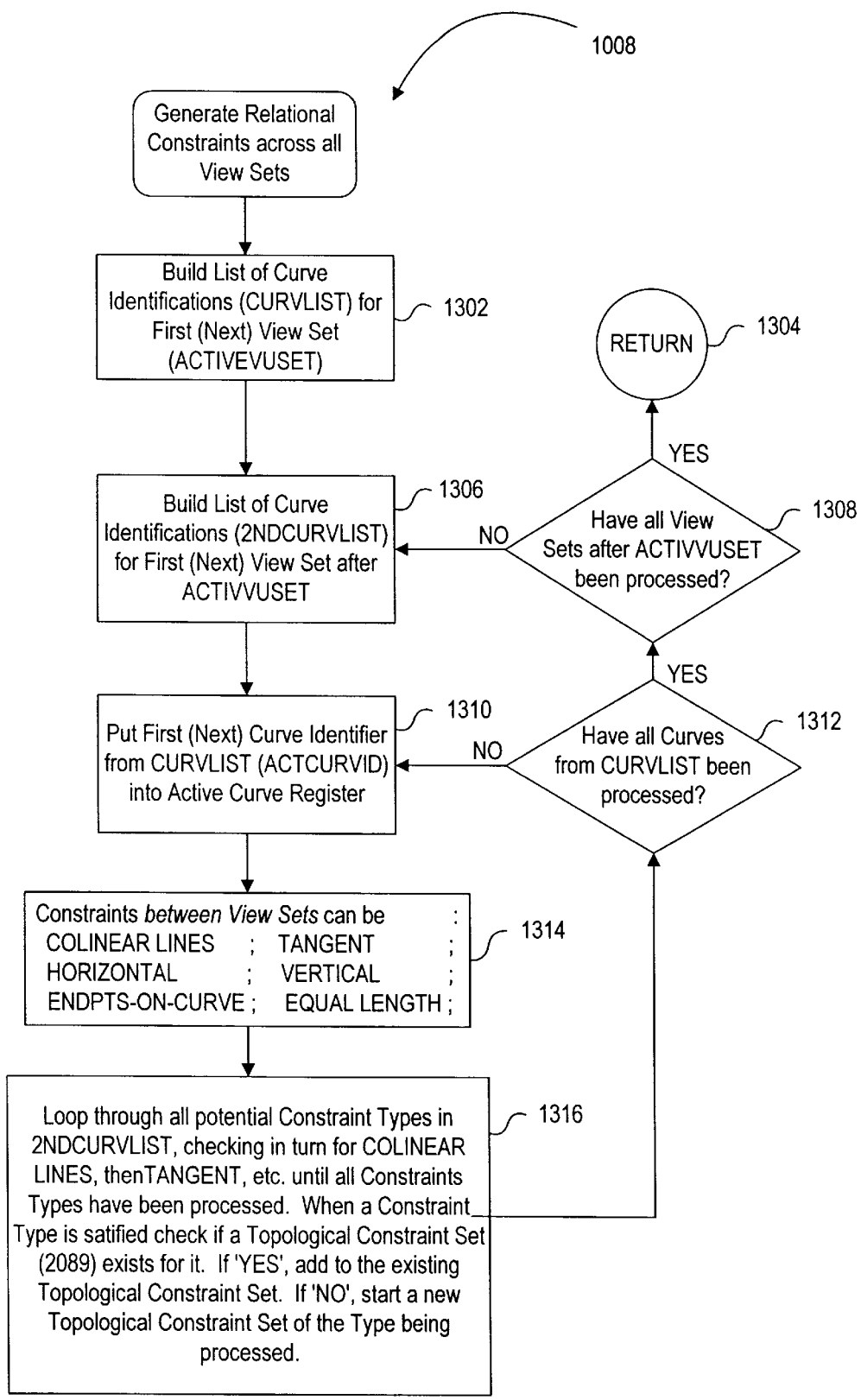
FIG. 7 are flowcharts setting forth an exemplary method of determining relational constraints across view sets.

Having thus generated all relational constraints within each view set, the system then similarly generates all constraints across view sets (Step 1008 in FIG. 4). Referring now to FIG. 7, an exemplary method of doing so will now be described. First, in Step 1302, the system builds a list of curve identifications (CURVLIST) for the first view set (ACTIVEVUSET). Next, the system builds a list of curve identifications (2NDCURVLIST) for the first view set after ACTWVUSET (Step 1306). The first curve identifier from CURVLIST (ACTCURVID) is then placed in the active curve register (Step 1310).

In Steps 1314 and 1316, the system loops through all possible constraint types that can apply between view sets (suitably comprising collinear lines, horizontal, endpoints-on-a-curve, tangent, vertical, and equal length) until all constraint types have been processed. When a constraint type is satisfied, the system checks whether a TCS exists for it. If so, the ACTCURVID is placed in the existing TCS; if not, a new TCS is created and ACTCURVID is placed in the this new TCS.

Having generated all constraints between the instant pair of view sets, the system then queries whether all curves in CURVLIST have been processed (Step 1312). If so, the system proceeds to Step 1308, described below; if not, the system selects then next curve identifier from CURVLIST, places it into the active curve register, then continues at Step 1314 as before.

In the case where all curve in a particular CURVLIST have been processed, the system continues on to Step 1308 and determines whether all view sets after ACTIVVUSET have been processed. If not, the system in Step 1306 builds another list of curve identifications for the next view set after ACTIVVUSET and continues at Step 13 10. When all view sets after ACTIVVUSET have been processed ("yes" branch in Step 1308) the system exists the subroutine (Step 1304).

An exemplary procedure for ordering view sets (Step 1010) will now be described in detail. In a broad sense, this step involves examining the location of each view set with respect to the plan view and, given common drafting, design, and engineering conventions, labeling and ordering each of these view sets as front, back, and so on. For example, with momentary reference to FIG. 3, it can be seen that the sample drawing comprises five separate views. Even if the views were not labeled as front, left end, bottom, and so on, a competent machinist or draftsman would intuitively ascertain that the view set immediately to the left of the plan view (left end view 306) corresponds to the left end view, and that the view set immediately below the plan view (front view 304) corresponds to the front view of the object; that is, the positioning of views is standardized within the drafting community in order to facilitate graphical communication—for example, through the American National Standards Institute drafting standards (ANSI). Nevertheless, the process by which this categorization may be automated is non-trivial, and is the subject of the following discussion.

Figure 8A:
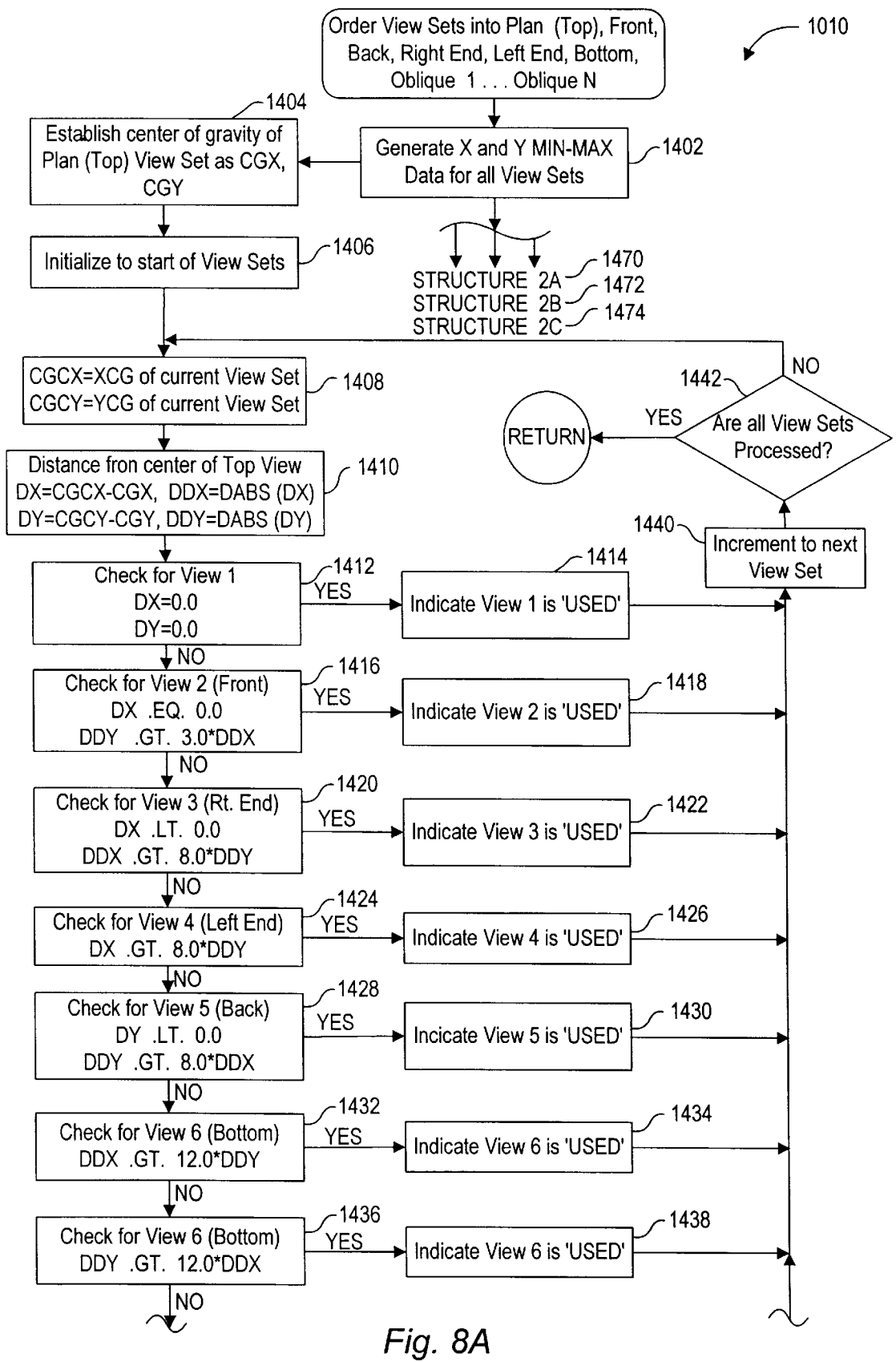
FIGS. 8A and 8B are flowcharts setting forth an exemplary method for ordering view sets in accordance with the present invention.
Figure 8B:
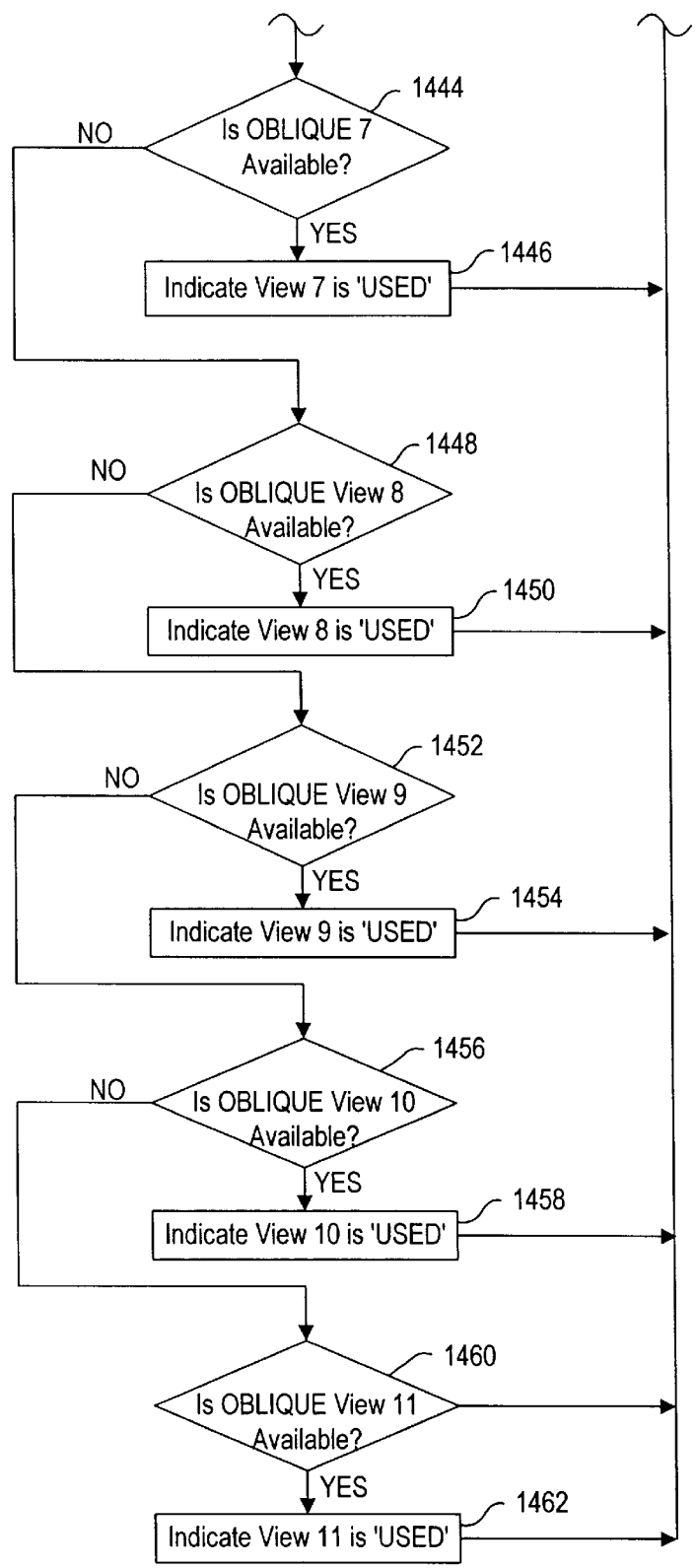
Figure 8C:
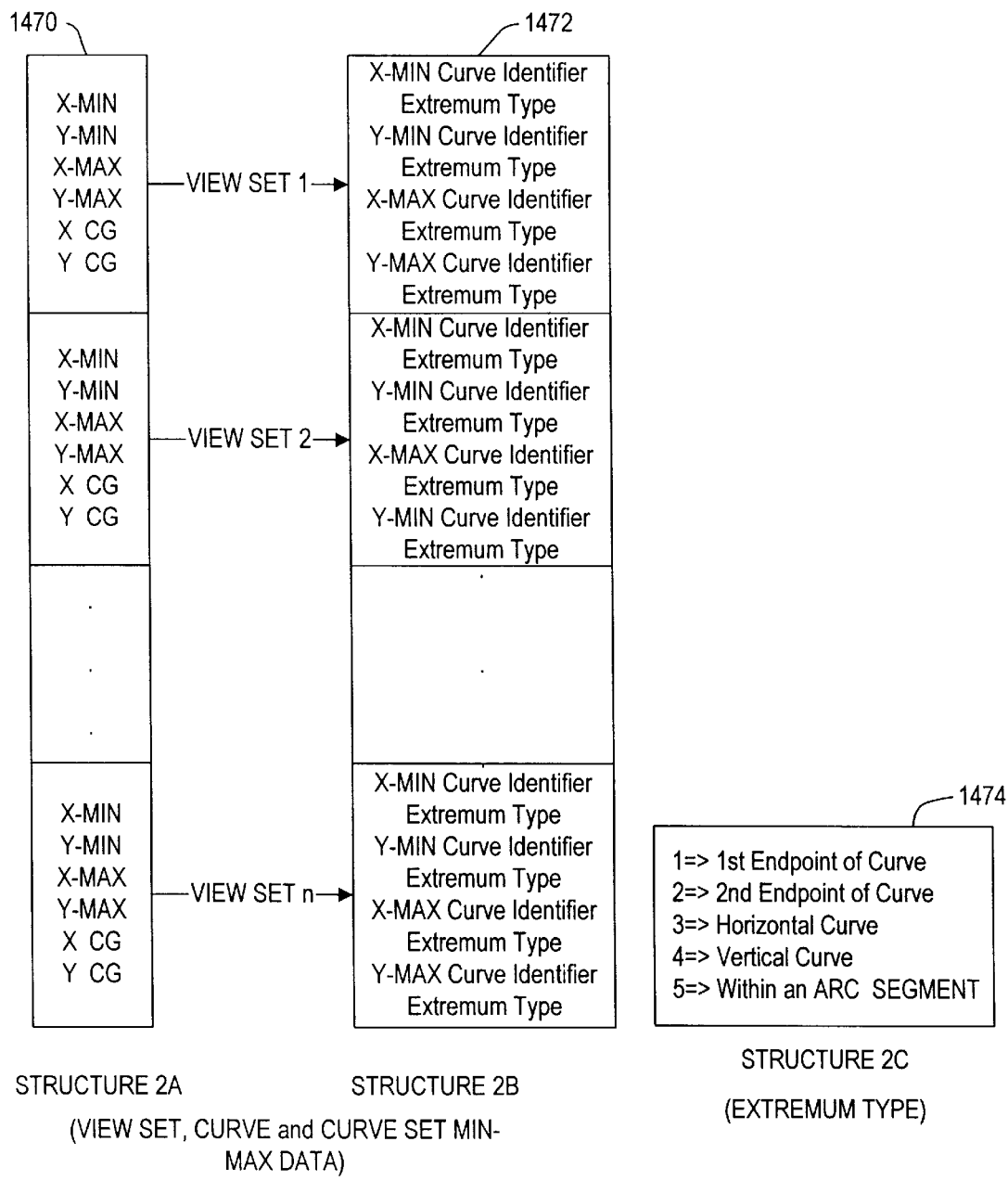
FIG. 8C depicts exemplary data structures showing the various records comprising the view set min-max data and extremes type structures.

Referring now to FIGS. 8A and 8B, the system first determines the maximum X and Y coordinate values for data within each view set (Step 1402). In this regard, the system assumes that when the view sets were previously defined and organized (Step 1004), the plan view was designated as the first view set. This is a prerequisite for correct interpretation of the remaining view sets. These values are labeled XMIN, XMAX, YMIN, and YMAX. The center of gravity of the plan view set is then determined (Step 1404), and this data is labeled CGX and CGY. Referring momentarily to FIG. 8C, the view set min-max data structures 1470 and 1472 are used to store values generated during Step 1402. Structure 1470 suitably comprises extremum and center of gravity values for each view set. Structure 1472 suitably comprises an identification of the corresponding curve and extremum types for each extremum in the view set. Structure 1474 sets forth a suitable list of five possible extremum types (i.e., locations on a curve where an extremes might occur), comprising: first endpoint of curve, second endpoint of curve, horizontal curve, vertical curve, and within an arc segment.

Referring again to FIGS. 8A and 8B, the system then initializes to the start of the view set list (Step 1406). The X and Y coordinates of the center of gravity of the current view set is determined, and the variables CGCX and CGCY are assigned the X and Y values respectively (Step 1408). Next, the distance of the current view set from the plan view is determined (Step 1410). Specifically, the following values are computed:

$$DX = CGCX - CGX$$

$$DDX = ABS(DX)$$

$$DY = CGCY - CGY$$

$$DDY = ABS(DY)$$

The system then determines whether DX=0.0 and DY=0.0 (Step 1412). If so, then the current view is marked as the plan view (view 1), and is marked as 'USED' (Step 1414), after which the system increments to the next view set (Step 1440) and checks whether all view sets have been processed (Step 1442). If all view sets are processed, then the ordering operation is complete. If not, the system continues by looping back to step 1408. If, at step 1412, it was determined that the current view set did not correspond to the plan view, the system progresses to step 1416.

In Step 1416, as well as Steps 1420, 1424, 1428, 1432, and 1436, the system similarly checks the values of DX, DY, DDX, and DDY against a particular set of criteria for each view in order to characterize the current view. More particularly, the current view is designated the front view (view 2) when DX=0.0 and DDY>3.0*DDX (Step 1416), the right end view (view 3) when DX<0.0 and DDX>8.0*DDY (Step 1420), the left end view (view 4) when DX>8.0*DDY (Step 1424), the back view (view 5) when DY<0.0 and DDY>8.0*DDX (Step 1428), and the bottom view (view 6) when DDX>12.0*DDY (Step 1432) or DDY>12.0*DDX (Step 1436). If none of these criteria are met, the system then checks in Steps 1444, 1448, 1452, 1456, and 1460 whether the current view is an oblique view.

In accordance with steps 1440 and 1442, this ordering procedure continues until all view sets are processed and the system has identified and numbered each view.

An exemplary method for parsing entities into open curve sets, closed curve sets, and disjointed curves will now be described in detail. Referring to FIGS. 9D and 9E, the system suitably uses four data structures for organizing curve sets: curve topology structure 900, closed curve set structure 920, open curve set structure 940, and disjoint curve structure. Curve topology structure 900 comprises data related to the number and identification of closed, open, and disjoint curves, and suitably comprises a closed curve set count 902, a first structure identifier 904, an open curve set count 906, a second structure identifier 908, a disjoint curve count 910, and a third structure identifier 912. This high level structure is suitably used, therefore, as simply a pointer to the various curve sets ordered previously in Step 1012.

Closed curve set structure 920 suitably comprises data specifying the contents of each closed curve set, and suitably includes, for each closed curve set, a curve count 922 (the number of curves within the set), a first curve identifier 924, a second curve identifier 926, and subsequent curve identifiers for each curve within the curve set. Open curve set structure 940 suitably comprises data specifying the contents of each open curve set, and suitably includes, for each open curve set, a curve count 942, a first curve identifier 944, a second curve identifier 946, and subsequent curve identifiers for each curve within the curve set.

Disjoint curve structure 960 comprises a list of all individual disjoint curves, and suitably includes a curve count 962 and curve identifier 964 for each of the disjoint curves.

Referring now to FIGS. 9A, 9B, and 9C, a preferred method used to characterize curves will be described. First, as shown in Step 1502, an "endpoint structure" table of endpoints is generated for all curves. This data structure (1504) suitably comprises four scalar endpoint values for each curve: X1, Y1, X2, and Y2. Next, an "identification structure" table is created (Step 1506) which suitably lists three indicia for each curve: a curve identifier, the view set location, and a flag indicating whether the curve is "available" (i.e., whether it has already been included in a curve set).

After creation of the end point and identification structures, the system queries whether any curves are "available" (Step 1510). If not, the ordering procedure is complete. If at least one curve is designated as "available," the system continues to Step 1512.

In Step 1512, the next "available" curve is chosen as the start of the current curve set and is marked as "not available." If no remaining curves are available (Step 1514), then the last curve is added to disjoint curves structure 960. If, at Step 1514, the system determines that additional curves are available, the next available curve is designated as the active test curve (ATC) (Step 1518).

The system then determines in Step 1520 whether the first end of ATC matches the first end of the current curve set. If not, the system proceeds to Step 1524. If so, then the second end of ATC is used as the first end of the current curve set (Step 1522), the ATC is added to the start of the curve set (Step 1528), and the system proceeds to Step 1546 (detailed below).

In Step 1524, the system determines whether the second end of ATC matches the first end of the current curve set. If not, then the system proceeds to Step 1530. If so, then the first end of ATC is used as the first end of the current curve set (Step 1526), the ATC is added to the start of the curve set (Step 1528), and the system proceeds to Step 1546 (detailed below).

In Step 1530, the system determines whether the first end of ATC matches the second end of the current curve set. If not, then the system proceeds to Step 1534. If so, then the second end of ATC is used as the second end of the current curve set (Step 1532), the ATC is added to the end of the current curve set (Step 1540), and the system proceeds to Step 1546.

In Step 1534, the system determines whether the second end of ATC matches the second end of the current curve set. If not, the system proceeds to Step 1538. If so, then the first end of ATC is used as the second end of the current curve set, the ATC is added to the end of the current curve set (Step 1540), and the system proceeds to Step 1546.

In Step 1540, the system determines whether the curve set is closed (that is, whether the first end is coincident with the second end). If it closed, then the curve set is added to closed curve set structure 920 (Step 1552). If it is not closed, then the system proceeds to Step 1538.

In Step 1538, the system determines whether any non-checked curves are "available." If so, then the system loops back to Step 1518. If no more non-checked curves are "available," then the system looks at the number of curves within the current curve set (Step 1544). If there is more than one curve in the current curve set, then the curve set is added to open curve set structure 940 (Step 1550) and the procedure is complete. If there is only one curve within the current curve set, then the last curve is added to disjoint curve structure 960 (Step 1542) and the system proceeds to Step 1548. In Step 1548, the system determines whether any more curves are "available." If more curves are available, then the system loops back to Step 1518. If not, then the procedure is complete.

Referring now to FIG. 10, an exemplary method for establishing a main boundary for each view set in accordance with a preferred embodiment of the present invention will now be described. The system first sets the current view to "one" (step 1602), which corresponds to initially interrogating the plan view, inasmuch as the plan view was ordered as the "number one" view in step 1010.

Having isolated the then current view (at this stage of the process, the plan view), the system orders the closed curve sets associated with the then current view in order of decreasing area within the curve set (step 1604). That is, at step 1604 the system identifies the closed curve sets associated with the then current view, and assigns order number 1 to the closed curve set having the largest area, order number 2 to the curve set having the next greatest area (if one exists), and so on.

More particularly, the system suitably interrogates closed curve set structure 920 (step 1552), and selects the first closed curve set in the data structure. The system then computes the area within the first closed curve set or, alternatively, the system simply interrogates a field within data structure 920 which sets forth the area for that closed curve set if the area has previously been ascertained, for example, in connection with the processes described in connection with FIG. 9.

The system then interrogates the next closed curve set within data structure 920 (if any), and similarly computes the area within that closed curved set, and so on. When the area has been calculated for each closed curve set within a particular view, they are simply ordered in terms of magnitude, with the curve set having the greatest area identified as the first closed curve set for the then current view set. Having ordered the closed curve sets by area for the then current view set, the system then increments the current view by one (Step 1606); the system then checks to see if the closed curve sets have been ordered for all view sets (Step 1608). If closed curve sets for all view sets have not yet been ordered ("no" branch from step 1608), the system returns to step 1604 to effect the ordering, by area, of the closed curve sets corresponding to the then current view.

Returning to step 1608, if the closed curve sets have been ordered for all views (corresponding to the "yes" branch from step 1608), the system determines the main boundary for each view set (step 1610). Specifically, the system selects the highest ordered closed curve set (as determined in step 1604) which corresponds to the closed curve set having the greatest area within a particular view set, and defines that highest area closed curve set as the main boundary for that particular view. The system similarly identifies the main boundary for every view set.

In this regard, it can be seen with reference to FIG. 3 that the plan view 302 comprises a plurality of closed curve sets. In particular, respective entities 324 and 325 each comprise a closed curve set, even though they each comprise a single element (namely, a circle). In addition, closed curve set 330 is defined by a plurality of adjacent curves which, for clarity, are not separately labeled. As can be seen by casual visual inspection of plan view 302, the closed curve set having the greatest area is that curve set which comprises the contiguous entities 320, 321, 312, 313, 314, 315, 316, 317, 318, and 319. As alluded to above, while a skilled machinist can readily and intuitively identify the "main boundary" associated with plan view 302, prior art systems have simply not appreciated the desirability of implementing this process in a software-based system in the context of a system for generating a 3-dimensional rendering of a solid object from a plurality of 2-dimensional views of the object. Indeed, one of the key elements of the present invention surrounds the present inventor's appreciation of the need to identify and define the important attributes of a machinist's skill and experience, and to replicate these processes in machine executable code.

Referring now to FIG. 11, an exemplary method for determining the plan view depth (step 1016) will now be described.

Recall from FIG. 10 that the system of the present invention determined the main boundary for each view set, wherein the main boundary for a particular view set corresponds to the closed curve set having the greatest area within a view set. In the context of FIG. 11, the system focuses on the main boundary of the plan view.

With regard to FIG. 11, it will be appreciated that an important technique employed in context of the present invention surrounds the notion of identifying a "main body" or "main solid," which essentially performs the function of identifying a baseline solid which grossly approximates, at least in terms of aggregate size, the final 3-dimensional object under inspection. By analogy, this can be thought of as the process undertaken by a sculptor when creating a detailed statue, figurine, or the like. The sculptor starts with a large block or other form which is initially devoid of relevant detail, but which nonetheless functions as a gross approximation of the finished artwork. Just as the sculptor removes a desired amount of material from specific locations of the block to progressively arrive at a desired figure, the system in accordance with the present invention employs boolean operations to successively remove predetermined shapes and volumes from a gross main body to ultimately arrive at the final 3-dimensional geometric solid.

Accordingly, although the sculptor's starting block of material bears little resemblance to the finished statue, a sculptor must nonetheless start with something he can work with. Analogously, the system of the present invention strives to identify a gross main body which it then uses to incrementally redefine into the ultimate finished 3-dimensional drawing. The procedure described below in connection with FIG. 11 relates to an exemplary technique for conveniently defining a gross 3-dimensional structure as a starting point for future definition. Succinctly, the system isolates a main boundary from the plan view (FIG. 10), and then sweeps or otherwise manipulates the plan view main boundary to produce a 3-dimensional base solid (as discussed, for example, in connection with step 1018 of FIG. 4). However, in order to determine the base solid from the plan view main boundary, the system needs to first ascertain the extent of the axial sweep (or other extrapolation of the main boundary into 3-dimensional space); the determination of the extent to which the plan view main boundary should be vertically swept to create a base solid is the focus of FIG. 11.

The system inspects the coordinates of the plan view main boundary, and determines the coordinate extremis associated with that main boundary (step 1602). More particularly, the system inspects the X- and Y-coordinate values associated with the main boundary closed curve set, and in so doing, identifies and captures the point on the main boundary having the smallest X-coordinate value (XMIN), the point on the main boundary curve having the smallest Y-coordinate value (YMIN), the point on the curve having the largest X-coordinate value (XMAQ, and the point on the main boundary curve having the largest Y-coordinate value (YMAX).

Having determined the plan view main boundary extremes, the system then inspects the front view to ascertain whether the main boundary associated with the front view shares the same XMIN and XMAX values previously determined in step 1802. If the XMIN and XMAX values associated with the front view main boundary are the same as the XMIN and XMAX values associated with the top view main boundary ("yes" branch of step 1806), the system concludes that an appropriate depth associated with the plan view main boundary may be advantageously defined by the YMAX and YMIN values associated with the front view (Step 1806). Specifically, in accordance with the illustrated embodiment, the system selects the scaler value (YMAX−YMIN) as the "depth" of the plan view main boundary.

If, on the other hand, the plan view XMIN and XMAX values do not correspond with the XMIN and XMAX values of the front view ("no" branch from step 1806), then the system concludes that it must look elsewhere, i.e., it must look to a view other than the front view to determine the appropriate "depth" of the plan view main boundary. Thus, the system next compares the plan view XMIN and XMAX values with the XMIN and XMAX values of the main boundary associated with the rear view (step 1810). If they are the same ("yes" branch from step 1812), the "depth" of the plan view main boundary is advantageously defined as the scaler value (YMAX−YIN) taken from the rear view (step 1814). If the plan view X-coordinate extremis do not coincide with the rear view X-coordinate extremis ("no" branch from step 1812), the system again concludes that it must continue searching for an appropriate yardstick for measuring the appropriate "depth" of the plan view main boundary.

In particular, the system then compares the plan view XMIN and XMAX with the XMIN and XMAX values associated with the right view (step 1816), and if correspondence is ascertained ("yes" branch from step 1818), the system defines the plan view main boundary depth as the magnitude of the difference between XMAX and XMIN associated with the rear view. If the X-coordinate extremis of the plan view do not correspond with the X-coordinate extremis of the right view ("no" branch from step 1818), the system then looks for a match in the left view (step 1822). If a match is found ("yes" branch from step 1824), the system defines the depth of the plan view main boundary as the difference between the XMAX and the XMIN value of the left view (step 1826). If no match is found ("no" branch from step 1824), meaning that the plan view main boundary X-coordinate extremis did not match up with the X-coordinate extremis in either the front view, rear view, right view, or left view, then the system generates an error signal. This could mean that one or more of the entities in one or more of the view sets was either improperly entered, improperly characterized, or corrupted. Intuitively, this means that the three views which are orthogonal to the plan view (front, right, and left) do not include a main boundary which, when viewed in conjunction with the plan view main boundary, result in a solid object.

Referring again to FIG. 4, recall that at Step 1016, the system determines the view depth of the plan view main boundary. Having determined the view depth of the main boundary of the plan view, the system then creates a base solid (Step 1018). As also briefly discussed above, a suitable base solid may be generated using one of several techniques, depending on the principal geometric characteristics of the three dimensional solid under inspection. For example, the system may employ, inter alia, the following solid generation methods: axial sweeps, rotational sweeps, blended solids, and curve driven solids. An exemplary methodology for determining which solid generation technique is most appropriate for the particular three dimensional object under inspection will now be described.

More particularly and referring now to FIG. 12A, the various criteria for selecting an optimum (or at least appropriate) solid generating technique are set forth. The system first isolates the top view (Step 1802), inasmuch as most of the information necessary to make an initial determination as to the appropriate solid generation model to be employed can be gleaned from an inspection of the curves set forth in the top view.

The system then inspects the curves associated with the top view to determine whether all of the curves in the top view comprise one or more closed curve sets (Step 1806). If all of the curves in the top view are not closed curve sets ("no" branch from Step 1806), the system concludes that neither a rotational sweep nor a smooth blended object is under inspection, and thus employs an axial sweep (Step 1818), for example as discussed above in connection with Step 1018 in the context of FIG. 4.

In this regard, it should be noted that for most solids generated by the subject system, an axial sweep methodology will likely be the most appropriate solid generation technique. However, the system recognizes that certain special cases may be encountered from time to time, wherein a rotational sweep or smooth blended technique are appropriate. The present inventor has determined that the rotational sweep and smooth blended techniques are only possible if, among other things, every curve in the top view corresponds to a closed curve set. Thus, if at least one curve associated with the top view is not part of a closed curve set, the system can immediately conclude that an axial sweep (which may also be thought of as the default condition for solid generation) will be employed.

With continued reference to Step 1806 of FIG. 12A, if the system determined that all curves in the top view correspond to closed curve sets ("yes" branch from Step 1806), the system undertakes further analysis to determine one of the special cases for rotational sweep or smooth blended solid generation techniques may be employed.

More particularly, upon determining that all curves in the top view set correspond to closed curve sets, the system may suitably be configured to finally determine whether a rotational sweep technique may be employed. In this regard, a rotational sweep technique for generating a base solid is particularly appropriate wherein the solid object under inspection may be described as having a vertical axis, and further wherein the object is symmetric about any vertical plane which includes the vertical axis of the object. One can visualize such an object as, for example, a simple rounded bowl, flower vase, or the like, which, in top view, comprises a series of concentric circles. Thus, one technique employed in the context of the present invention for determining whether the object under inspection satisfies these criteria is to ascertain whether all of the closed curves in the top view comprise concentric circles (Step 1810). If all of the closed curves in the top view are not concentric circles ("no" branch from Step 1810), the system concludes that the rotational sweep technique is not appropriate, and goes on to determine whether a smooth blended solid generation technique would be appropriate.

If, on the other hand, all closed curves in the top view are concentric circles ("yes" branch from Step 1810), the system determines whether all other rotational sweep criteria are satisfied (Step 1812). If all other rotational sweep criteria are not satisfied ("no" branch from Step 1812), the system proceeds to Step 1814 to determine whether a smooth blended solid generation technique may be employed. If, on the other hand, all other rotational sweep criteria are satisfied ("yes" branch from Step 1812), the system employs a rotational sweep solid generation technique (Step 1808).

More particularly and with continued reference to Step 1810, having determined that all top curves constitute closed curve sets and that the closed curve sets are all concentric circles, the system determines whether both of the following criteria are satisfied: (i) do the concentric circles constitute circular arrays of closed curve sets concentric with the main boundaries; and (ii) is the additional view (i.e., in addition to the top view) axi-symmetric about its center (i.e., if the additional view is a front or back view, it will be axi-symmetric about the vertical axis; if the additional view is a left or right view, it is axi-symmetric about its horizontal axis). In the illustrated embodiment, the system employs a rotational sweep (Step 1808) for generating the base solid only if the foregoing criteria are satisfied as part of the analysis performed in Step 1812. If both of these criteria are not satisfied, the system determines whether the smooth blended criteria are satisfied (Step 1814).

More particularly, in Step 1814, the system determines if the additional view (i.e., the view shown in the drawing in addition to the top view) is a front view; if it is not, the system performs an axial sweep. If the additional view is a front view, the system determines whether the front view consists only of horizontal lines whose ends would coincide with the extensions of vertical tangents to the extrema of each top view closed curve set. If this criteria is satisfied in Step 1814, the system concludes that a smooth blended solid generation technique is appropriate (Step 1816).

Returning briefly to Step 1814, if the system determines that the additional view is either not a front view, or if the system determines that the additional view is a front view, but that it does not consist only of horizontal lines whose ends would coincide with the extensions of vertical tangents to the extrema of each top view closed curve set ("no" branch from Step 1814), the system concludes that neither the rotational sweep nor the smooth blended solid generation techniques are appropriate, and thus proceeds to perform an axial sweep (Step 1818).

Referring again to Step 1808, a base solid may be generated using the rotational sweep technique in accordance with one aspect of the present invention by ascertaining the profile of the three dimensional object and rotating that profile about the axis of symmetry. This may suitably be accomplished through the use of commonly known methods, for example, by computing the locus of points resulting from a curve rotated in arbitrarily small increments about a straight line.

Returning now to Step 1812, a base solid may be generated using the smooth blended technique in accordance with the present invention, for example, by using a series of closed curve sets, wherein either straight or smooth blends are used to transition between each successive curve.

Referring now to FIG. 13A, an exemplary method for processing disjoint curves will now be described. In the general sense, this process involves carving away at the base solid by closing off each disjoint curve, rotating or otherwise manipulating the resulting curve set into place with respect to the base solid, then applying solid generation techniques to the curve set in order to form the appropriate solid atom.

The number of disjoint curves in the current view is first placed in the active register (Step 1902). Note that this number corresponds to first record 962 within disjoint curve structure 960 for the current view. The system then extracts the first curve identifier from this structure (Step 1904) and categorizes the orientation of the corresponding curve as either horizontal, vertical, or oblique. For curves that are lines, horizontal means parallel to the X-axis, and vertical means parallel to the Y-axis. Oblique lines are simply those lines which are neither vertical nor horizontal. For curves which are not lines—i.e., arcs, conics, and splines—the system operates as though an implied line segment exists between the curve's endpoints and then categorizes the orientation of the curve according to the orientation of this implied line segment.

The system then examines the disjoint curve (DC) to determine whether it is vertical (Step 1908). If not, then the system proceeds to Step 1924. If so, then the system further queries whether the curve is a non-line (i.e., a member of the group suitably comprising arcs, conics, and splines). For lines, the system proceeds to Step 1912 (Process Vertical Disjoint Line), which is discussed below in conjunction with FIGS. 13B, 13C, 13D, 13L, and 13M. For non-lines, the system proceeds to Step 1914 (Process Vertical Disjoint Curve), discussed below in conjunction with FIG. 13E.

If previously at Step 1908 the system did not find DC to be vertical, then the system proceeds to Step 1914, and queries whether DC is horizontal. If not, then the system proceeds to Step 1922; if so, then the system branches according to whether the curve is a line or non-line (Step 1926). For lines, the system proceeds to Step 1928 (Process Horizontal Disjoint Lines), which is discussed below in conjunction with FIG. 13F. Non-lines are processed according to Step 1930 (Process Horizontal Disjoint Curve), which is discussed below in conjunction with FIG. 13I.

For curves that are oblique (neither vertical nor horizontal), the system proceeds to Step 1922 (Process Oblique Disjoint Line), which will be discussed in further detail below in conjunction with FIG. 13J.

After the current disjoint curve DC has been categorized and processed through the appropriate subroutine (Steps 1912, 1914, 1928, 1930, and 1922), the system adds the resulting axial sweep atom to the atom definitions structure (Step 1916). In this regard, and with reference to FIG. 12B, atom definitions structure 1822 comprises records which identify the solid atoms produced through processing of the disjoint, closed, and open curves. This structure suitably includes a count of the number of atoms 1824 and, for each atom, the following eight records 1826(*a*)–(*n*): a curve set identifier, a Boolean key identifying how the atom should operate on the main solid (1=union, 2=difference, 3=intersection), a work view number designated which view was utilized to create the atom, solid type (1=axial sweep, 2=rotational sweep, 3=smooth blended), the atom ZTOP, the atom ZBOTTOM, the ZTOP blend radius, and ZBOTTOM blend radius. ZTOP and ZBOTTOM, as will be seen shortly, refer to the extent of sweep that the solid will undergo during atom creation.

If not all disjoint curves within the view have been processed (Step 1918), the next disjoint curve is selected and, returning again to Step 1906, the procedure is repeated until the list of disjoint curves within the view set has been exhausted.

Having thus described the main procedural loop used to process all disjoint curves within a view set, we now turn to the five logical modules used to create the solid atoms which will function to effectively "build upon" or "carve away at" the main solid. In this regard, FIGS. 13L and 13M will be referred to intermittently in order to impart an intuitive understanding of the system's operation.

Referring now to the flowchart in FIG. 13B, an exemplary method of processing vertical disjoint lines will now be described in detail (Step 1912 in FIG. 4). First, the topological constraint sets (TCSs) are examined until the identifier for the active disjoint line (ADL) is found (Steps 1930, 1932, and 1934). In a preferred embodiment, the system considers in its search only a subset of TCS relation. More particularly, the present inventor has determined that three primary relations may be advantageously employed in characterizing the vast majority of objects likely to be encountered in practice; that is, tangent, collinear line, and endpoint on a curve.

If all TCSs have been explored, and the ADL identifier has not been found, then the system proceeds to Step 1936. After setting the ERROR register to "NO CONSTRAINT FOUND", the system exits the subroutine (Step 1942).

Referring now to FIG. 13C, if the ADL was found previously in Step 1932, then the system proceeds to Step 1943 and locates another curve in the same TCS which is not in the current view. This new view is designated as the "work view." Note that since the present subroutine comprehends only vertical lines, the work view will necessarily be either the front or back view; that is, the only views that may comprise elements which bear the relationship of tangent or collinear with respect to ADL are the front or back views. The collinear or tangent line identified thereby is designated as MATCHCURV (Step 1945). For example, and with momentarily reference to FIG. 13L, note that if plan view vertical line 2090 is the ADL, then collinear line 2091 fulfills the requirements for MATCHCURV: it is collinear and exists within a different view (front).

Having identified MATCHCURV, the system then determines whether MATCHCURV is an element in the work view main boundary (Step 1946) or an element within an "interior" closed curve set (Step 1947). "Interior" in this context means a curve set which describes an area which lies within the larger main boundary. With momentary reference to FIG. 13L, MATCHCURV 2091 is an example of an element in the work view main boundary.

If MATCHCURV is part of the work view main boundary, then the system proceeds to Step 1950. If MATCHCURV is part of an interior closed curve set, the system proceeds to Step 1953. If MATCHCURV does not fit within either category, then the ERROR register is set to 'No Atom Defined' (Step 1948), and the subroutine ends (Step 1949).

If MATCHCURV is in an interior closed curve set, this set is moved into the active curve set (ACS) and the system then proceeds to Step 1953 described below.

Consider now the work view main boundary scenario (Step 1950). Here, the system starts at MATCHCURV and progresses forward and (if necessary) backward along the main boundary closed curve set until the resulting chain of curves encounters exactly two from the set XMIN, YMIN, XMAX, and YMAX. In other words, the system identifies a short chain of elements whose outermost members terminate at the boundary of the main outline. Thus, for example, the region 2092 in FIG. 13L is bounded in part by a set of three contiguous elements (two lines and an arc). This chain of elements intersects YMAX and XMIN in the front view. The resulting boundary curves then are ordered such that the first Extremum touching curve is listed 1st, and the last Extremum touching curve is listed last within the active curve set. In this regard, note that the main boundary is a closed curve set, and a basic feature of closed curve sets is that they can be termed "SCROC"s that is, such a set is Simple (does not cross itself), Closed (the start point is the end point), Rectifyable (has a fmite length), Orientable ("inside" is always on left while moving along curves counter clockwise), and a Curve (or set of curves).

In Steps 1951 through 1952, one or more "phantom curves" are added to the chain of boundary curves in order to close it off—i.e., to create a closed curve set which will be used to define the solid atom. Specifically, the active curve set (ACS) is closed using the rules set forth below in Table 1.

TABLE 1

ACS Closing Rules

| 1st Extremum | 2nd Extremum | Closing Rule |
|---|---|---|
| XMAX | YMAX | Add line from (XMAX, Y of XMAX touch curve) to (XMAX, YMAX), then close with line from (XMAX, YMAX) to (X of YMAX touch curve, YMAX) |
| YMAX | XMIN | Add line from (X of YMAX touch curve, YMAX) to (XMIN, YMIN), then close with line from (XMIN, YMIN) to XMIN, Y of XMIN touch curve) |
| XMIN | YMIN | Add line from (XMIN, Y of XMIN touch curve) to (XMAX, YMAX) then close with line from (XMAX, YMAX) to (X of YMIN touch curve, YMAX) |
| YMIN | XMAX | Add line from (X of YMIN touch curve, YMAX) to (XMIN, YMAX) then close with line from (XMIN, YMAX) to (XMIN, Y of XMAX touch curve) |
| XMIN | XMIN | Add line from (XMIN, Y of 1st XMIN touch curve) to (XMIN, Y of 2nd XMIN touch curve) |
| XMAX | XMAX | Add line from (XMAX, Y of 1st XMAX touch curve) to (XMAX, Y of 2nd XMAX touch curve) |
| YMIN | YMIN | Add line from (X of 1st YMIN touch curve, YMIN) to (X of 2nd YMIN touch curve, YMIN) |
| YMAX | YMAX | Add line from (X of 1st YMAX touch curve, YMAX) to (X of 2nd YMAX touch curve) |

With momentary reference to FIG. 13L, note once again that the three boundary curves defining in part region 2092 intersect the main boundary at XMIN and YMAX. Thus, in this example, the system closes the curve set by adding horizontal and vertical lines in accordance with the second rule listed in Table 1 and as illustrated in FIG. 13L.

Note that the solid atom which will ultimately be created through this subroutine will operate on the main solid as a Boolean difference, and will therefore be used to subtract either a corner or non-corner as specified in Step 1951.

Having effectively closed the curve set in the working view, the system then proceeds to Step 1954, wherein an axis of rotation is then defined according to whether the working view is the front or back view. In the front view, the axis of rotation is defined as the YMIN line. In the back view, the axis of rotation is defined as the YMAX line.

In visualizing the steps that follow, it is important to note that the key transformations will take place out of the drawing plane—that is, much in the same way a finished section of framed wall is lifted from the ground and manipulated into place during a barn-raising, portions of the front or back views will be rotated out of the page and positioned advantageously with respect to the main solid. It should be remembered however, that the base solid was swept in such a way that it "exists" below the drawing plane.

Having defined the axis of rotation for the working view, the system then rotates the ACS 90 degrees clockwise about the YMIN axis for the front view or 90 degrees counter clockwise about the YMAX axis for the back view. Returning again to the example shown in FIG. 13L, rotation of ACS 2092 about axis of rotation 2093 results in a closed curve 2094 lying in plane perpendicular to the drawing.

Next a 3×4 matrix is defined such that it operates to translate the ACS into place in front of the base solid (Steps 1956 and 1958). In essence, this step consists of two movements: (1) a translation of the ACS along the positive Y-axis by a distance equal to the difference between the active disjoint line YMIN and front view YMIN, and (2) a translation of the ACS along the negative Z-axis by a distance equal to the thickness of the base solid (determined earlier in Step 1016). Note that no X-axis translation is necessary because the front and back views have the same X range as the plan view. Finally, as shown in Step 1960, the ACS is swept along the length of the active disjoint line to form the solid atom which will ultimately be subtracted from the base solid (for example, atom 2097 in FIG. 13M). The solid atom is added to the atom definitions structure as: ZTOP=YMIN of ADL, ZBOTTOM=YMAX of ADL, Work View number=2 (Front) or 5 (Back), BOOLE register=2 (Difference). After thus defining the atom, the system exits the subroutine (Step 1962).

Referring now to FIG. 13E, an exemplary method for processing vertical disjoint non-lines (Step 1914) will now be described. First, the system cycles through the topological constraint sets (TCSs) until the identifier for the active disjoint curve (ADC) is found (Steps 1970, 1972, and 1974). In a preferred embodiment, only tangent relations need be considered. If no ADC is found, the system sets ERROR register to "No Collinear Line" and returns (Step 1978). If the ADC has been found, the system proceeds to Step 1980 and extracts a tangent line (ATANLN) from the TCS. As shown in Step 1982, if ATANLN is in the top view, the system returns to Step 1970, and continues to cycle through the TCS. If ATANLN is in the top view, then the system proceeds to Step 1984, and finds the intersections of ADC with the top view main boundary. In Step 1986 the system defines the following parameters: ZDEL=length of ATANLN, ZTOP=0.0, and ZBOTTOM=−ZDEL The solid atom is then created by closing the ADC where it touches the top view main boundary and sweeping from ZTOP to ZBOTTOM. In this case, the work view will either be the front or back view, depending upon where ATANLN is found. After creating this atom, the system exits the subroutine (Step 1962).

Referring now to FIG. 13F, an exemplary for processing horizontal disjoint lines (Step 1928) will now be described. As a preliminary matter, it should be clear that the method of processing horizontal disjoint lines will necessarily be analogous and in some cases identical to the method used for vertical disjoint lines. For instance, while the front and back views were the most useful work views in the vertical context (from the standpoint of gathering sufficient information to generate an atom), the left end and right end views are the most useful in the horizontal context.

First, the system cycles through the first topological constraint set until the identifier for the active disjoint line (ADL) is found (Steps 2000, 2002, and 2004). If an ADL is found, the system proceeds to Step 2016. If no ADL has been found, and all TCSs have been processed, the system proceeds to Step 2008. In Step 2008, the system checks whether the ADL intersects with the intersection of two contiguous curves in either the left end or right end views; if so, then an atom is created (Step 2008). Specifically, the system loops back to Step 1944 in FIG. 13C and proceeds as before up to Step 1962.

Next, the system checks to see whether an atom was created (Step 2010), in which case the system exits the subroutine (Step 2014). If no atom was created, the ERROR register is set to "No Atom Created" (a non-fatal error), and the system exits.

If an ADL was found in Step 2004, the system finds another curve in the same TCS which is not in the current view (Step 2014). This view (either left end or right end) becomes the work view (Step 2018), and the matching collinear or tangent curve in the TCS is identified as CLT-CURV (Step 2020).

Next, CLTCURV is examined (Steps 2022 and 2024). If CLTCLURV is part of the work view main boundary, the system proceeds to Step 2030. If CLTCURV is part of an interior closed curve set, the system proceeds to Step 2036, moves the closed curve set into the active curve set (ACS), then continues at Step 2038 (described below).

For work view main boundary curves (Step 2030) the system starts at CLTCURV and progresses forward and (if necessary) backward along the main boundary closed curve set until the resulting chain of curves encounters exactly two from the set XMIN, YMIN, XMAX, and YMAX. Thus, the system identifies a short chain of elements whose outermost members terminate at the boundary of the main outline. The resulting boundary curves then are ordered such that the first Extremum touching curve is listed 1 st, and the last Extremum touching curve is listed last within the active curve set.

In Steps 2032 and 2034, one or more "phantom curves" are added to the chain of boundary curves in order to close it off—i.e., to create a closed curve set which will be used to define the solid atom. Specifically, the active curve set (ACS) is closed using the rules set forth previously in Table 1.

Having thus defined the active curve set, the system then defines an axis of rotation (Step 2038). If the work view is the left end view, the vertical XMIN line is used; if the work view is the right end view, the vertical XMAX line is used.

Next, in accordance with step 2040, the ACS is rotated 90 degrees clockwise about the XMIN axis (for the left end view) or 90 degrees counter clockwise about the XMAX axis (for the right end view).

A 3×4 matrix is defined such that it operates to translate the ACS into place in front of the base solid (Steps 2042 and 2044). In essence, this step consists of two movements: (1) a translation of the ACS along the positive X-axis by a distance equal to the difference between the active disjoint line XMIN and the X value of all curves within the ACS, and (2) a translation of the ACS along the negative Z-axis by a distance equal to the thickness of the base solid (determined earlier in Step 1016). Note that no Y-axis translation is necessary because the left end and right end views have the same Y range as the plan view. Finally, as shown in Step 2046, the solid atom is defined as follows: ZTOP=YMIN of ADL, ZBOTTOM=YMAX of ADL, and BOOLE register=2 (Difference)

Referring now to FIG. 13I, an exemplary method for processing horizontal disjoint non-lines (Step 1930) will now be described. First, the system cycles through the topological constraint sets (TCSs) until the identifier for the active disjoint curve (ADC) is found (Steps 2050, 2052, and 2054). In a preferred embodiment, only tangent relations need be considered.

If no ADC is found, the system sets the ERROR register to "No Collinear Line" and returns (Step 2058). If the ADC has been found, the system proceeds to Step 2052 and extracts a tangent line (ATANLN) from the TCS. As shown in Step 2062, if ATANLN is in the top view, the system returns to Step 2050, and continues to cycle through the TCSs. If ATANLN is in the top view, then the system proceeds to Step 2064, and finds the intersections of ADC with the top view main boundary. In Step 2066 the system defines the following parameters: ZDEL=length of ATANLN, ZTOP=0.0, and ZBOTTOM=−ZDEL.

The solid atom is then created by closing the ADC where it touches the top view main boundary and sweeping from ZTOP to ZBOTTOM. In this case, the work view will either be the right end or left end views, depending upon where ATANLN is found. After creating this atom, the system exits the subroutine (Step 1962).

Referring now to FIG. 13J, an exemplary method of processing oblique disjoint lines will now be described.

In Step 2072 the system determines the current view main boundary curve (CVMBC) that touches the oblique disjoint line (ODL). More specifically, the system addresses in turn each of the curves that comprise the main boundary of the current view in order to determine which curve or curves touch the ODL. In the case where more than one curve is a candidate for CVMBC, the system chooses the curve which is in the direction of an extant oblique view. If more than one curve meets this additional criterion, then the choice of CVMBC is arbitrary, and the first one is suitably selected.

Next, in Step 2073, the system cycles through the topological constraint sets until the identifier for the ODL is found. The first collinear, tangent, or 'endpoint on a curve' element related to ODLINE is identified as CLTCURV. It should be noted that while more than one curve might satisfy these conditions, any one of the available curves may be chosen by the system for the purposes of generating the necessary solid atom. The system then checks whether CLTCURV is a member of an interior closed curve set. If not, then a nonfatal error is returned. If so, then the closed curve set is moved into the active curve set (ACS).

Having determined CVMBC, the system then defines a rotation point along an extension of ODLINE which falls outside the current view (Step 2074). The exact placement of this point is not critical, as long as it lies outside the current view. In a preferred embodiment, the point is defined to be 0.1 inches outside the current view.

A rotation angle ROTANG is then computed as the angle that TMBCRV makes with the positive X-Axis (Step 2076).

Next, in Step 2078, the actual work view number corresponding to the appropriate oblique view is determined. Recall that available oblique views were numbered previously in Step 1010 starting at 7 and ending at 6+n, where n is the total number of oblique views.

In Step 2084, a number of curves are rotated counter-clockwise about the rotation point defined in Step 2074 by an angle ROTANG defined in Step 2076. This will effectively allow the system to process the oblique line exactly it processed vertical disjoint lines in Step 1912. More particularly, The following curves and curve sets are rotated about the rotation point: 1) the top main boundary, 2) the entire oblique working view set, 3) the active curve set ACS, and 4) the oblique disjoint line ODL. This step effectively transforms the oblique view into a front view, referred to as the "pseudo-front view."

Having rotated and aligned the appropriate entities within the plane, an axis of rotation is defined in Step 2086 as the horizontal YMIN line in the pseudo-front view. The ACS is then rotated 90 degrees clockwise about this axis, then translated along the Y axis by a distance equal to the YMIN value of ODLINE minus the Y value of ACS within the pseudo-front view. Next, the ACS is translated along the negative Z axis by a distance equal to the main solid thickness (determined earlier in Step 1016).

As shown in Step 2088, the parameters for the new atom are given by: ZTOP=YMIN of ODLINE, and ZBOTTOM=YMAX of ODLINE.

Next, all rotated data plus all atom definition data (including ZTOP and ZBOTTOM) is rotated back clockwise about the rotation point by ROTANG degrees (Step 2090). The work view number is then set to the oblique view number (Step 2092), and the system exits the subroutine (Step 2094).

Referring now to FIG. 14A, an exemplary method for processing closed curve sets will now be described in detail. A count of closed curve sets is placed in the active register (Step 2102), and the first closed curve set identifier is extracted from the closed curve set structure (structure 920 in FIG. 9D). Next, in step 2110, the closed curve set XMAX curve and identifier are extracted from extrema structure (structure 1472 in FIG. 8A).

The system then queries whether the XMAX curve is vertical (Step 2114). If so, then the system processes the vertical XMAX closed curve set (Step 2118). If XMAX is not vertical ("no" branch from Step 2114), the system proceeds to Step 2116, and determines whether the XMAX curve is non-linear (e.g., a spline, conic, or arc). If the XMAX curve is found to be non-linear, then the system processes a non-linear XMAX closed curve set (Step 2120).

If at Step 2116 the system determined that the XMAX curve is not non-linear, the system then proceeds to Step 2126, and queries whether XMAX is a point on a curve. If so, the system processes a point on a curve XMAX closed curve set (Step 2128). If in Step 2126 the system determined that XMAX is not a point on a curve, the system extracts the closed curve set YMAX curve and identifier and places them in the active curve register and active curve identifier register respectively.

Next, the system successively queries whether YMAX is horizontal (Step 2136), non-linear (Step 2138), or a point on a curve (Step 2140). If YMAX is horizontal, the system processes a horizontal YMAX closed curve set (Step 2142). If YMAX is non-linear, the system processes a non-linear YMAX closed curve set (Step 2144). If YMAX is a point on a curve, the system processes a point-on-a-curve YMAX closed curve set (Step 2146).

The system flow provides that, after each of the major processing subroutines have been completed (i.e., Steps 2118, 2120, 2128, 2136, 2138, and 2140), the system interrogates whether the ERROR register is zero. If not, then the system proceeds to Step 2108, described below. If the ERROR register was found to be zero in Steps 2122, 2124, 2148, 2150, or 2152, then the system proceeds to Step 2104. In this step the system adds the resulting axial sweep atom to the atom definitions structure then proceeds to Step 2108.

In Step 2108, the system determines whether all closed curve sets have been processed. If so, the system exits this subroutine (Step 2112); if not, then the system loops back to Step 2106, extracts the next closed curve identifier from the closed curve set structure, and proceeds as before until all closed curve sets have been processed.

Referring now to FIG. 14C, the method of processing vertical XMAX closed curve sets will now be described in detail (Step 2118). First, the system cycles through the first collinear topological constraint set TCS until the identifier for the active XMAX line (AXL) is found (Step 2154). If a collinear AXL has been found, the system continues to Step 2164. If no collinear AXL has been found after processing all TCSs (Step 2158), then the system indicates that no atom was created (a non-fatal error), and exits the subroutine (Step 2162).

If a collinear AXL was previously found ("yes" branch from Step 2156), then the system finds another curve in the same TCS which is not in the current view (Step 2164). Referring now to FIG. 14D, the system then decides which view will be designated the work view (Step 2168). More particularly, the system designates the non-top view as the work view for the new atom if and only if: 1) the top view closed curve set is a rectangle parallel to the X-axis, and 2) the front (or back) view line collinear with AXL is a part of a closed curve set which is not a rectangle parallel to the X-axis. If one or both of these criteria are not met, then the top view becomes the work view and the system proceeds to Step 2174. If both criteria are met, the system proceeds to Step 2172 and moves the closed curve set into the active curve set (ACS) and the top view XMAX line identifier into the active disjoint line register (Step 2172). That is, in this special case (when both criteria are satisfied) we can effectively treat the XMAX line as an active disjoint curve and process it in accordance with the procedure described above in conjunction with FIG. 13H. Specifically, the system proceeds back to Step 2038 in FIG. 13H and processes the line accordingly.

If both criteria set forth in Step 2168 were not satisfied, the system branches to Step 2174 via Step 2170. In Step 2174, the system defines the top view as the work view and designates the line collinear with AXL as "COLINLN" (the length of which is ZDEL). Next, the system queries whether the top view closed curve set is "inside" a larger closed curve set. If not, then the system establishes 0.0 as the "local top." That is, such a closed curve set effectively resets the local top extrema for the purposes of atom generation. Next, the system determines whether COLINLN YMAX is above the local top. If so then the resulting solid atom is defined as: BOOLE register=1, ZBOTTOM=local top, and ZTOP=ZBOTTOM+ZDEL. The system then sets "local top" as ZTOP, then exits the subroutine (Step 2186).

If at Step 2180 COLINLN YMAX was found to be above the local top, then the system defines the solid atom as: BOOLE register=2, ZTOP=local top, and ZBOTTOM=ZTOP−ZDEL. After defining the solid atom, the system sets local top=ZBOTTOM then exits the subroutine.

Referring now to FIG. 14E, an exemplary method of processing horizontal YMAX closed curve sets will now be described in detail (Step 2142). First, the system cycles through the first collinear topological constraint set until the identifier for the active YMAX line (AYL) is found (Step 2188). If a collinear AYL has been found, the system continues to Step 2198. If no collinear AXL has been found after processing all TCSs (Step 2192), then the system indicates that no atom was created (a non-fatal error), and exits the subroutine (Step 2196).

If a collinear AXL was previously found ("yes" branch from Step 2190), then the system finds another curve in the same TCS which is not in the plan view (Step 2198). Referring now to FIG. 14F, the system then decides which view will be designated the work view (Step 2202). More particularly, the system designates the non-top view as the work view for the new atom if and only if: 1) the top view closed curve set is a rectangle parallel to the X-axis, and 2) the left (or right) view line collinear with AYL is a part of a closed curve set which is not a rectangle parallel to the X-axis. If one or both of these criteria are not met, then the top view becomes the work view and the system proceeds to Step 2204. If both criteria are met, the system proceeds to Step 2206 and moves the closed curve set into the active curve set (ACS) and the top view YMAX line identifier into the active disjoint line register (Step 2206). That is, in this special case (where both criteria are satisfied) we can effectively treat the YMAX line as an active disjoint curve and process it in accordance with the procedure described above. Thus, the system proceeds to Step 2030 in FIG. 13G and continues to Step 2048, where the subroutine exits.

If both criteria set forth in Step 2202 are not satisfied, then the system branches to Step 2208 via Step 2204. In Step 2208, the system defines the top view as the work view and designates the line collinear with AYL as "COLINLN" (the length of which is ZDEL). Next, the system queries whether the top view closed curve set is "inside" a larger closed curve set. If not, then the system establishes 0.0 as the "local top." Next, the system determines whether COLINLN XMAX is above the local top. If so then the resulting solid atom is defined in Step 2214 as: BOOLE register=1, ZBOTTOM= local top, and ZTOP=ZBOTTOM+ZDEL. The system then sets "local top" as ZTOP, then exits the subroutine (Step 2220).

If at Step 2214 COLINLN YMAX was found not to be above the local top, then the system in Step 2218 defines the solid atom as: BOOLE register=2, ZTOP=local top, ZBOTTOM=ZTOP−ZDEL. After defining the solid atom, the system sets local top=ZBOTTOM then exits the subroutine.

Referring now to FIG. 14G, an exemplary method for processing non-linear XMAX closed curve sets will now be described in detail (Step 2120). First, the system cycles through the first tangent TCS until the identifier for the active XMAX curve (AXC) is found (Step 2222). If, after examining all TCSs, the system fails to find a tangent AXC, then the system indicates that no atom was created (non-fatal error), end exits the subroutine (Steps 2226, 2228, and 2230).

If previously at Step 2224 the system successfully found a tangent AXC, then the system proceeds to Step 2232 and locates another curve in the same TCS which is not in the current view. As will be seen in Steps 2234 through 2248, this non-top view curve will be used to provide the ZTOP, ZBOTTOM, and length of the new solid atom.

Referring now to FIG. 14H, the top view is designated as the work view, and the line tangent to AXC is labeled TANLINE. ZDEL is set equal to the length of TANLINE. Next, the system queries whether the top view closed curve set is "inside" a larger closed curve set (Step 2238). If not, the system proceeds to Step 2240 and establishes 0.0 as the local top. From Step 2240, the system proceeds to Step 2242, described in detail below.

If the top view closed curve set was found to be inside a larger closed curve set ("yes" branch from Step 2238), the system determines whether the TANLINE YMAX is above the local top (Step 2242). If so, the solid atom is defined in Step 2244 as: BOOLE register =1, ZBOTTOM=local top, ZTOP=ZBOTTOM+ZDEL. The local top is then set to ZTOP, and the system exits the subroutine (Step 2248).

When the system determines that the TANLINE YMAX is not above the local top ("no" branch from Step 2242), the solid atom is defined in Step 2246 as: BOOLE register=2, ZBOTTOM=ZTOP−ZDEL, and ZTOP=Local top. The local top is then set to ZBOTTOM, and the system exits the subroutine (Step 2248).

Referring now to FIG. 14I, an exemplary method for processing point-on-a-curve XMAX closed curve sets will now be described in detail (Step 2128). First, the system cycles through the first point-on-a-curve TCS until the identifier for the active XMAX curve (AXC) is found (Step 2250). If, after examining all TCSs, the system fails to find a point-on-a-curve AXC, then the system indicates that no atom was created (non-fatal error), end exits the subroutine (Steps 2254, 2256, and 2258).

If previously at Step 2252 the system successfully found a point-on-a-curve AXC, then the system proceeds to Step 2260 and locates another curve in the same TCS which is not in the plan view. As will be seen in Steps 2262 through 2276, this non-top view curve will be used to provide the ZTOP, ZBOTTOM, and length of the new solid atom.

Referring now to FIG. 14J, the top view is designated as the work view, and the line related to AXC as an end-point-on-a-curve is labeled ENDPTLINE. ZDEL is set equal to the length of ENDPTLINE. Next, the system queries whether the top view closed curve set is "inside" a larger closed curve set (Step 2266). If not, the system proceeds to Step 2268 and establishes 0.0 as the local top. From Step 2268, the system proceeds to Step 2270, described in detail below.

If the top view closed curve set was found to be inside a larger closed curve set ("yes" branch from Step 2266), the system determines whether the ENDPTLINE YMAX is above the local top (Step 2270). If so, the solid atom is defined in Step 2272 as: BOOLE register=1, ZBOTTOM= local top, and ZTOP=ZBOTTOM+ZDEL. The local top is then set to ZTOP, and the system exits the subroutine (Step 2248). When the system determines that the ENDPTLINE YMAX is not above the local top ("no" branch from Step 2270), the solid atom is defined in Step 2274 as: BOOLE register=2, ZBOTTOM=ZTOP−ZDEL, and ZTOP=Local top. The local top is then set to ZBOTTOM, and the system exits the subroutine (Step 2276).

Referring now to FIG. 15A, an exemplary method for processing open curve sets will now be described in detail (Step 1026 in FIG. 4). Initially, in Step 2302, the count of open curve sets is placed into the active register. The system then extracts the identifier of the first open curve set from open curve set structure. This becomes the active open curve set (AOPNCS). Next, the system finds the curve in the plan view main profile which the AOPNCS touches (referred to as the "touching" curve), then determines its orientation and whether the resulting atom should be added or subtracted from the base solid (Step 2314). This step is discussed in further detail below in conjunction with FIG. 15M.

Having determined the orientation and appropriate Boolean operation of the "touching" curve, the system then queries whether the ACPNCS is semi-rectangular. As used here, semi-rectangular means either 1) an open curve set comprising two line segments defining a right angle, or 2) an open curve set comprising three line segments which define three sides of a rectangle (i.e., opposite sides which are parallel, of equal length, and perpendicular to the third side).

If AOPNCS is not semi-rectangular ("no" branch from Step 2316), the system processes the open curve set which using the 2nd view main boundary (Step 2318). This process is described in further detail below in conjunction with FIGS. 15Q and 15P. If AOPNCS is semi-rectangular, the system proceeds to Step 2322 and queries whether the "touching" curve is horizontal. If so, the system processes a horizontal touching curve (Step 2324); if not, then the system proceeds to Step 2326 and determines whether the "touching" curve is vertical. If the "touching" curve is vertical, the system proceeds to Step 2328 and processes a vertical touching curve. If it is not vertical, the system processes an oblique touching curve (Step 2330).

After each of Steps 2324, 2328, and 2330 have been completed—corresponding to the processing of horizontal, vertical, and oblique curves respectively—the system advances to Step 2308 and queries whether all open curve sets have been processed. If so, the system exits the subroutine (Step 2312); if not, the system proceeds to Step 2306, extracts the next open curve set identifier, and continues as above until the list of open curve sets has been exhausted.

Having described the main loop associated with an exemplary method of processing open curve sets, the individual subroutines used to process the various classes of open curve sets will now be described in detail.

Figure 15C:
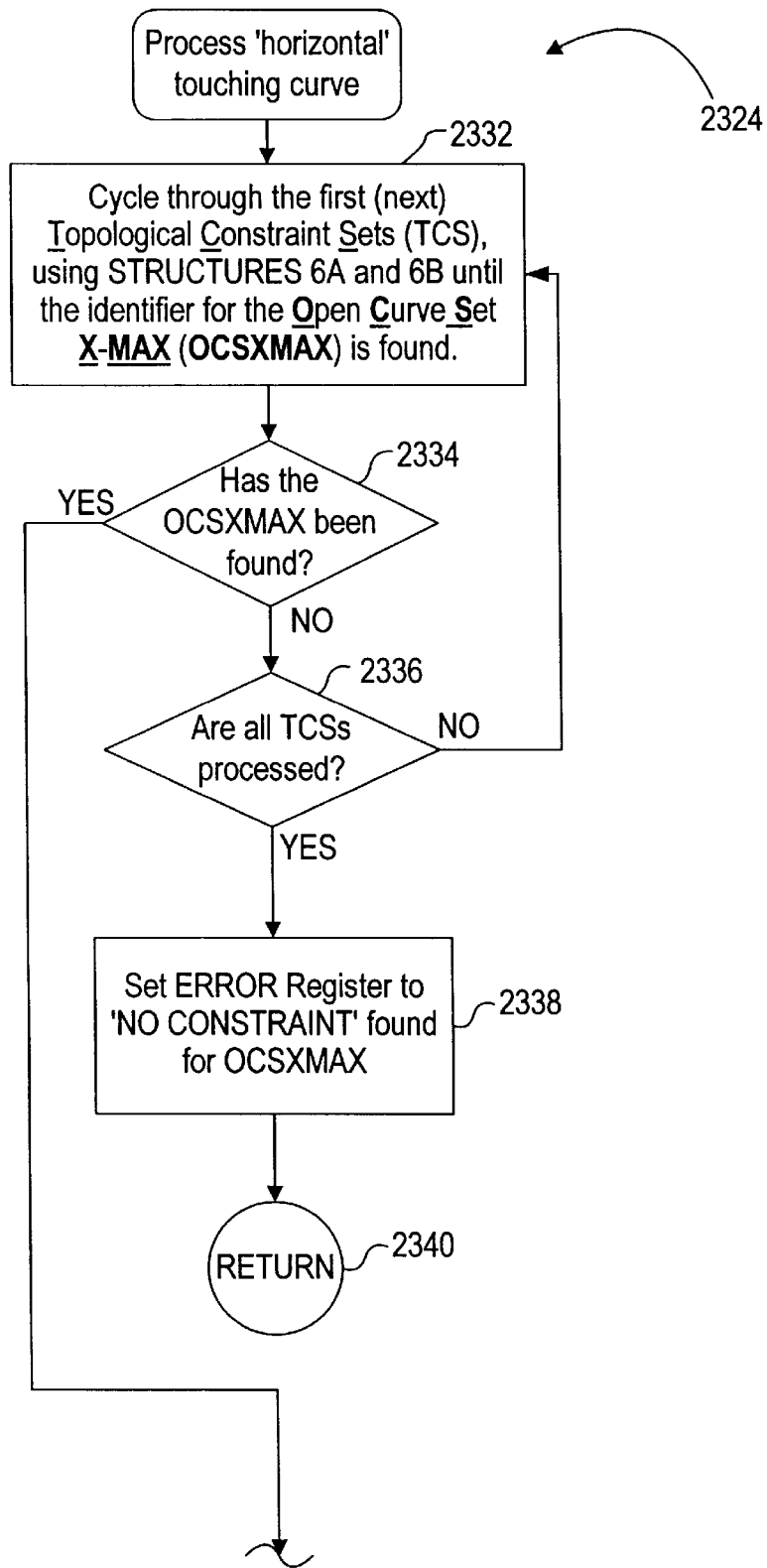

An exemplary method of processing open curve sets satisfying the horizontal "touching" curve condition will now be described in conjunction with FIG. 15C. First, in Step 2332, the system cycles through the TCS until the identifier for the open curve set XMAX (OCSXMAX) is found. If the OCSXMAX has been found, the system branches from Step 2334 and proceeds to Step 2342. If the OCSXMAX has not been found after all TCSs have been processed (Step 2336), the system sets the ERROR register to "NO CONSTRAINT" found (Step 2338), and exits the subroutine.

Figure 15D:
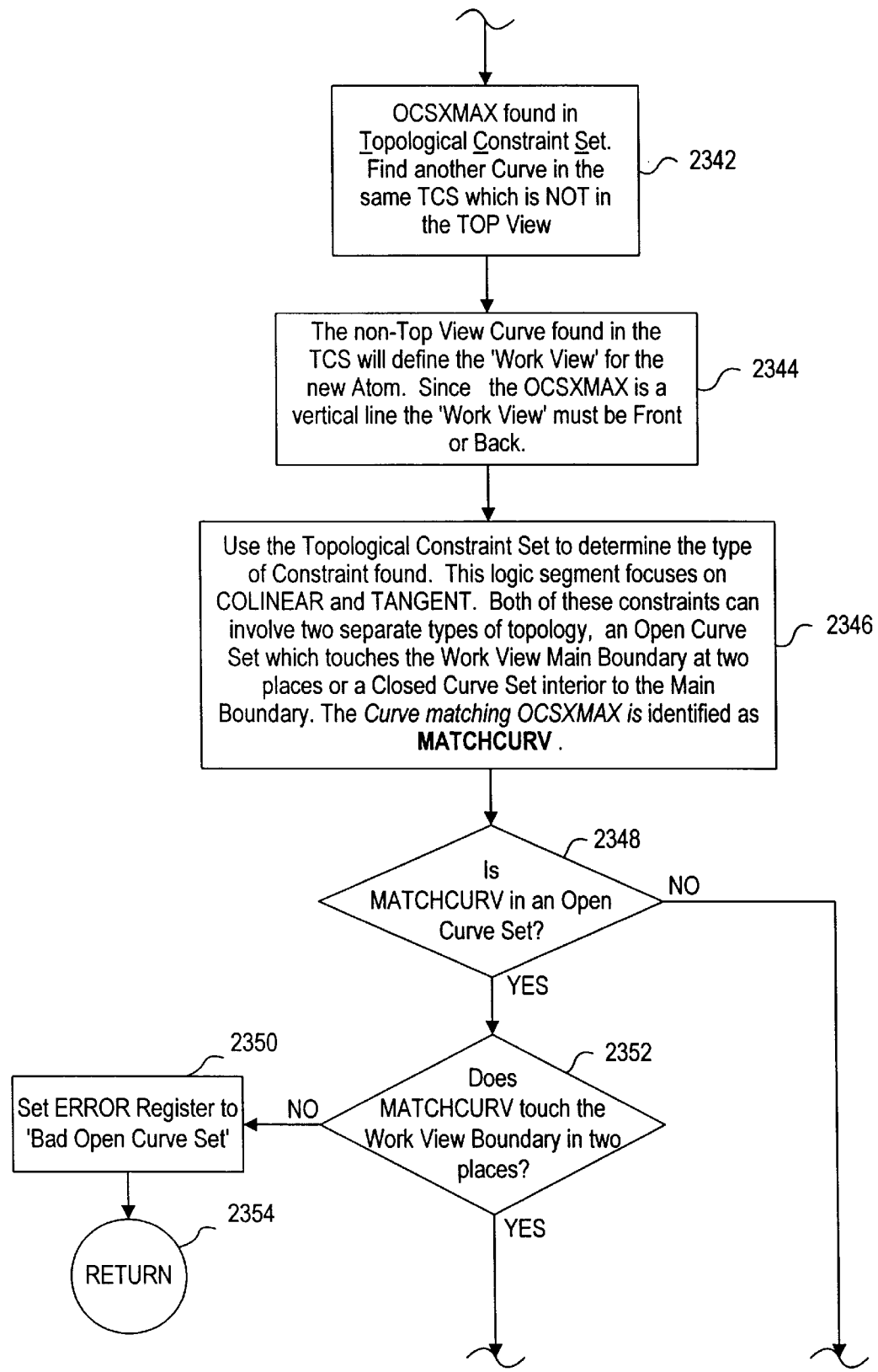

Referring now to FIG. 15D, in the case where OCSXMAX has been found ("yes" branch in Step 2334), the system finds another curve in the same TCS which is not in the plan view (Step 2344). The work view is set to the non-plan view curve found in the TCS. Note that since OCSXMAX is a vertical line, the work view must be front or back.

In Step 2346, the type of constraint is determined from the TCS, and the curve matching OCSXMAX is identified as MATCHCURV.

Next, the system determines whether MATCHCURV is an element of an open curve set (Step 2348). If not, the system moves the closed curve set into the active curve set (ACS), then advances to Step 2370, described below.

In the case where MATCHCURV was found to be an element in an open curve set ("yes" branch in Step 2348), the system proceeds to Step 2352 and queries whether MATCHCURV touches the work view boundary in two places. If not, the ERROR register is set to "Bad Open Curve Set," and the system exits the subroutine (Step 2354). It should be noted that it is topologically possible to have within a drawing a MATCHCURV which is part of an open curve set but which does not touch the work view boundary in two places. Nevertheless, this situation—while clearly comprehended by the present invention—is deemed by the present inventor to be relatively uncommon, and hence it is not included in the illustrated exemplary embodiment.

Figure 15E:
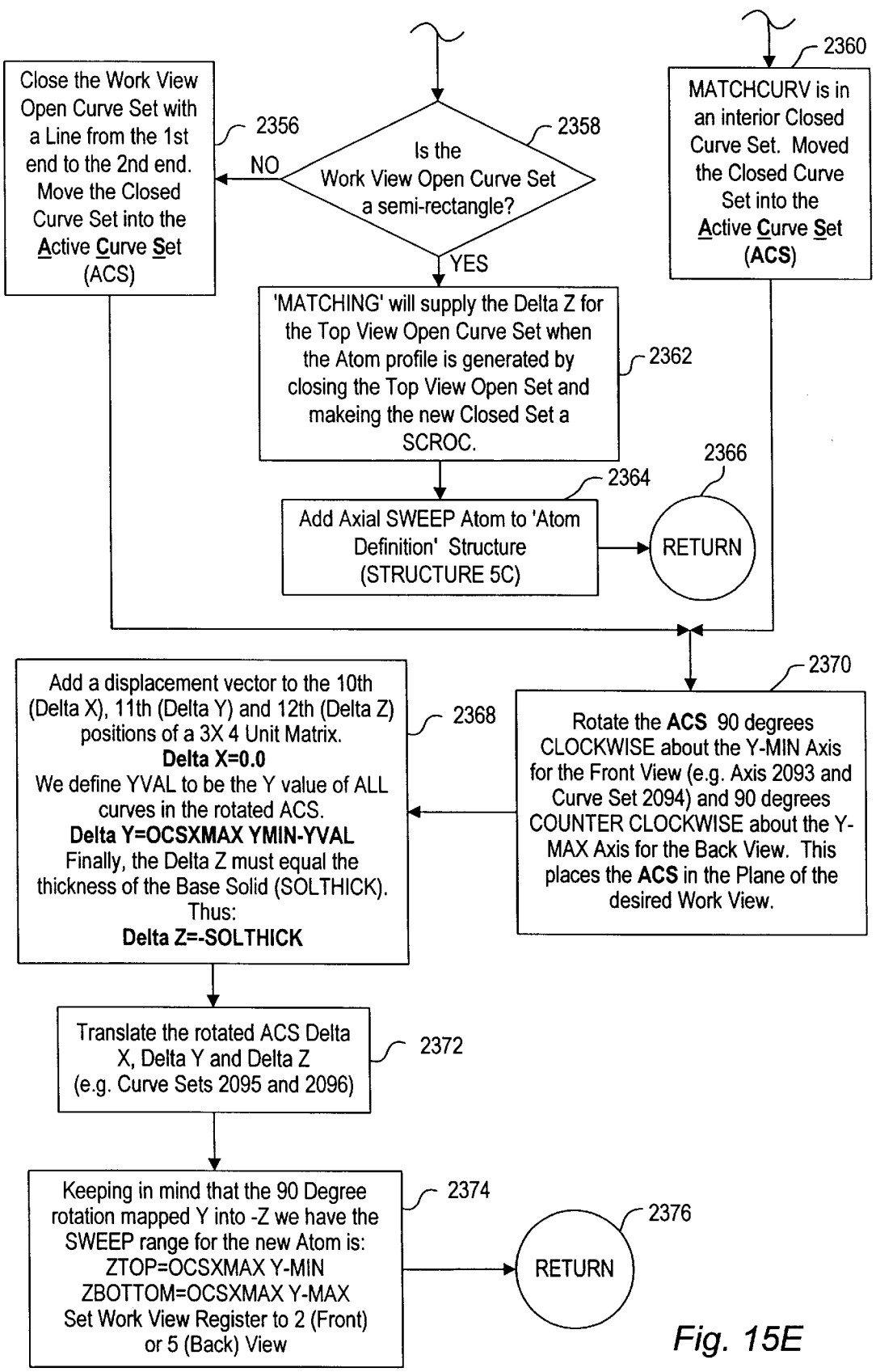

Referring now to FIG. 15E, when MATCHCURV is found to touch the work view boundary in two places ("yes" branch in Step 2352), the system queries whether the work view open curve set is a semi-rectangle (Step 2358). If not, the system proceeds to Step 2356, where the work view open curve set is closed with a line extending from the first to second end. This closed curve is then moved into the ACS and the system proceeds to Step 2370, described below.

If, in Step 2358, the work view open curve set is found to be a semi-rectangle, then the system proceeds to Step 2362 and defines the atom to be created. More particularly, the system defines an atom where: ZTOP=0, and the length of sweep=length of MATCHCURV. This atom is then added as an axial sweep to the atom definition structure (Step 2364) and the system exists the subroutine (Step 2366).

After closing the work view open curve set in accordance with Step 2356, or moving the closed curve set into the ACS in accordance with Step 2360, the system proceeds to Step 2370 and employs a rotation of ACS out of the drawing plane in order to position the curve set advantageously with respect to the base solid. More particularly, the system rotates the ACS 90 degrees clockwise about the YMIN axis for the front view, or 90 degrees counter clockwise about the YMAX axis for the back view.

Next, in Step 2368, a 3×4 unit matrix is defined to produce a spatial translation of the ACS, wherein: DeltaX=0.0, DeltaY=OCSXMAX YMIN−YVAL, and Delta Z=−SOLTHICK. This operation is applied to the ACS (Step 2372), then the resulting solid atom is defined as: ZTOP= OCSXMAX YMIN, ZBOTTOM=OCSXMAX YMAX, and Work View register=2 (Front) or 5 (Back). After defining the solid atom, the system exits the subroutine (Step 2376).

Figure 15F:
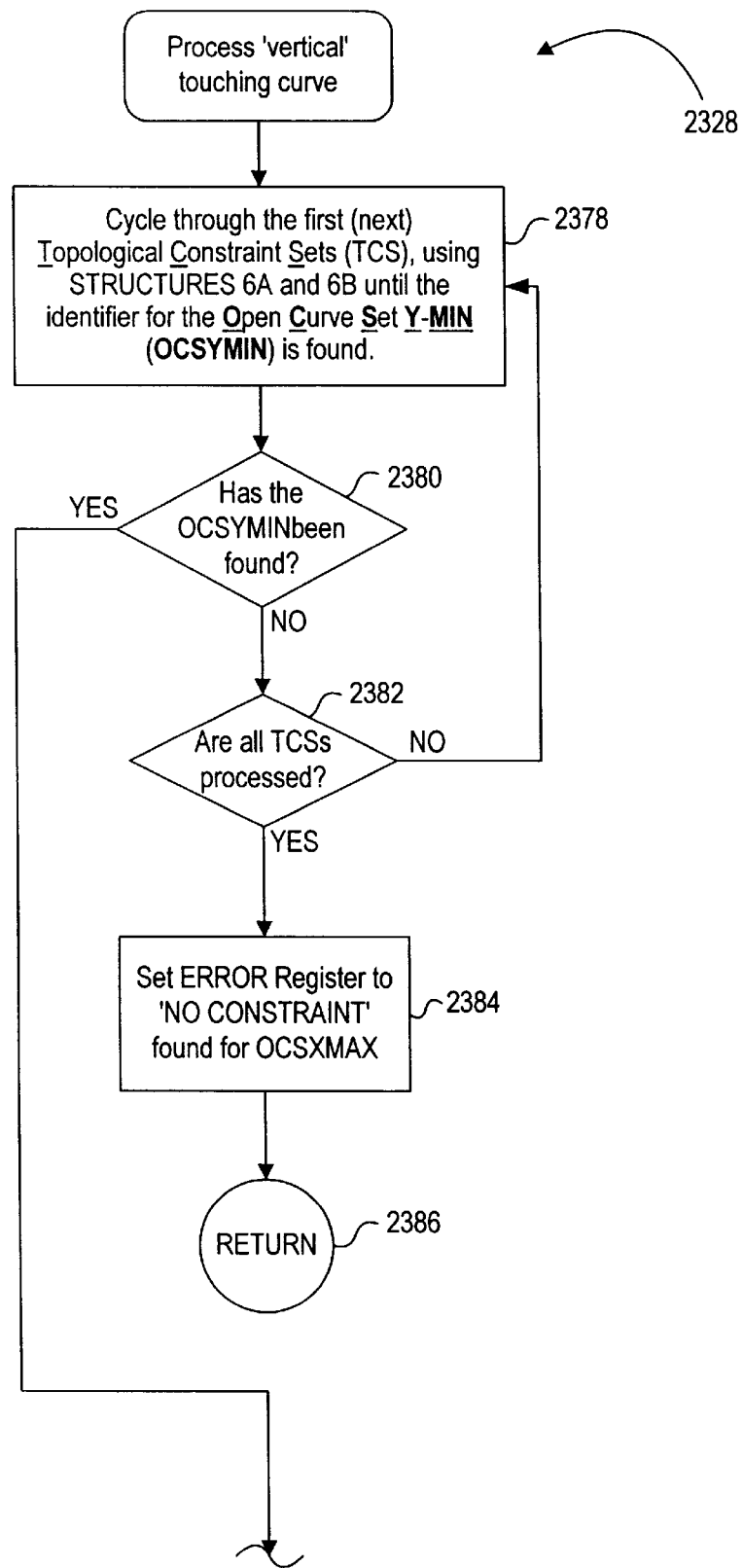

An exemplary method of processing open curve sets satisfying the vertical "touching" curve condition will now be described in conjunction with FIG. 15F. First, in Step 2378, the system cycles through the TCS until the identifier for the open curve set YMIN (OCSYMN) is found. If the OCSYMIN has been found, the system branches from Step 2384 and proceeds to Step 2392. If the OCSYMIN has not been found after all TCSs have been processed (Step 2382), the system sets the ERROR register to "NO CONSTRAINT FOUND" (Step 2384), and exits the subroutine (Step 2386).

Figure 15G:
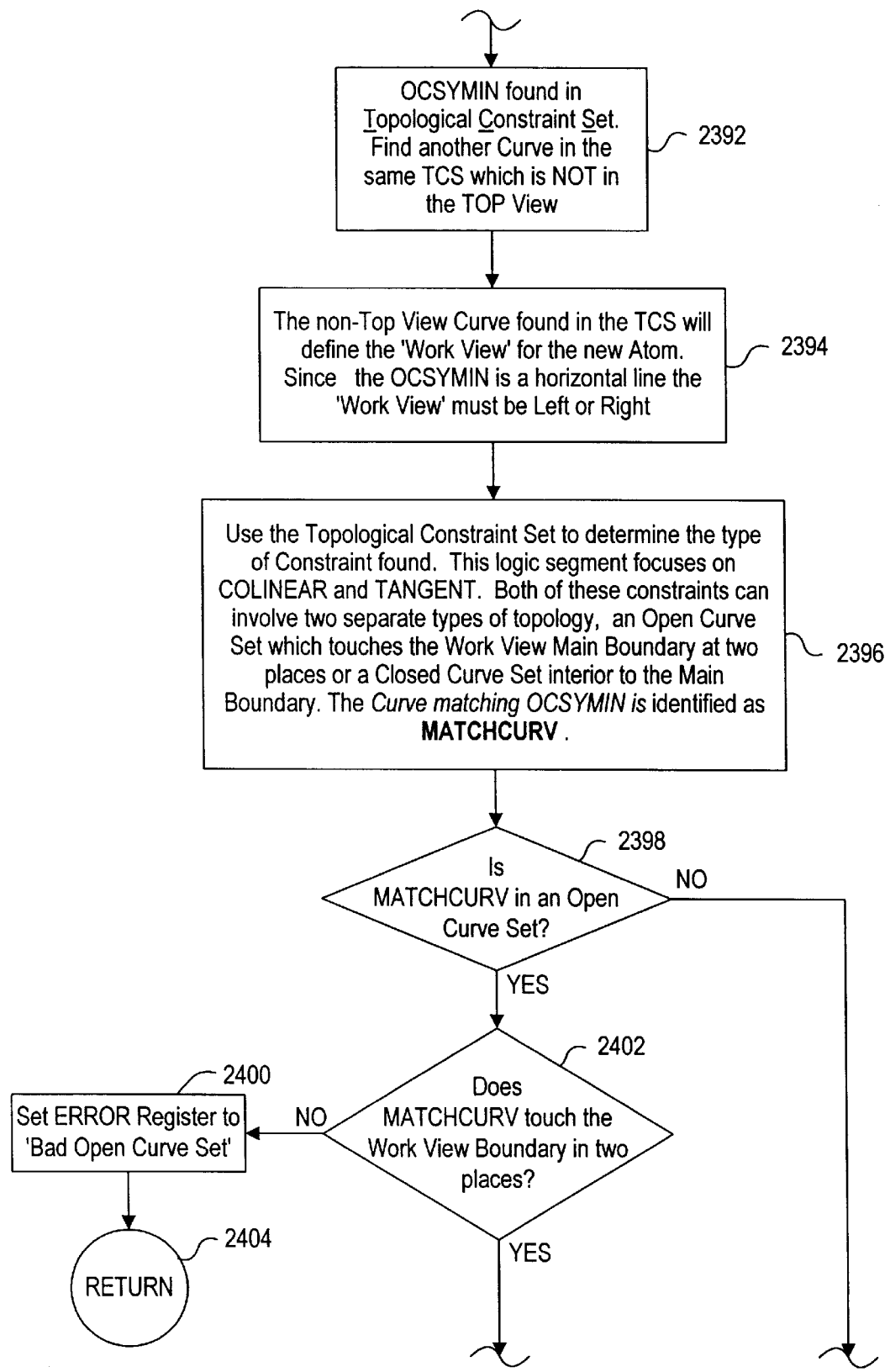

Referring now to FIG. 15G, in the case where OCSYMIN has been found ("yes" branch in Step 2380), the system finds another curve in the same TCS which is not in the plan view (Step 2392). The work view is set to the non-plan view curve found in the TCS. Note that since OCSYMIN is a vertical line, the work view must be left or right.

In Step 2396, the type of constraint is determined from the TCS, and the curve matching OCSYMIN is identified as MATCHCURV.

Next, the system determines whether MATCHCURV is an element in an open curve set (Step 2398). If not, the system moves the closed curve set into the active curve set (ACS), then advances to Step 2420, described below.

In the case where MATCHCURV was found to be an element in an open curve set ("yes" branch in Step 2398), the system proceeds to Step 2402 and queries whether MATCHCURV touches the work view boundary in two places. If not, the ERROR register is set to "Bad Open Curve Set," and the system exits the subroutine (Steps 2400 and 2404).

Figure 15H:
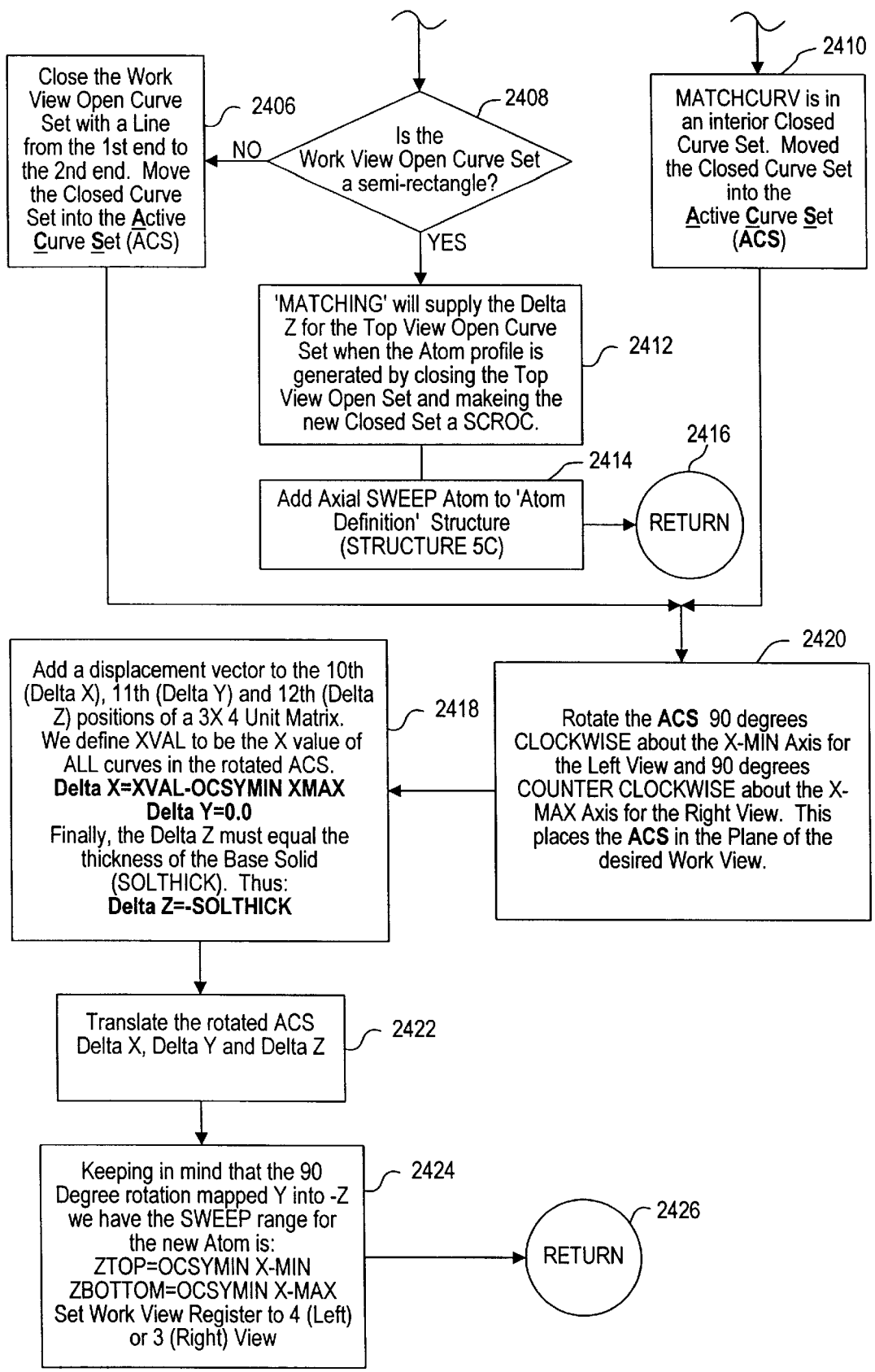

Referring now to FIG. 15H, when MATCHCURV is found to touch the work view boundary in two places ("yes" branch in Step 2402), the system queries whether the work view open curve set is a semi-rectangle (Step 2408). If not, the system proceeds to Step 2406, where the work view open curve set is closed with a line extending from the first to second end. This closed curve is then moved into the ACS and the system proceeds to Step 2420, described below.

If, in Step 2408, the work view open curve set was found to be a semi-rectangle, then the system proceeds to Step 2412 and defines the atom to be created. More particularly, the system creates an atom where: ZTOP=0, Length of sweep=length of MATCHCURV. This atom is then added as an axial sweep to the atom definition structure (Step 2414) and the system exists the subroutine (Step 2416).

After closing the work view open curve set in accordance with Step 2406, or moving the closed curve set into the ACS in accordance with Step 2410, the system proceeds to Step 2420 and employs a rotation of ACS out of the drawing plane in order to position the curve set advantageously with respect to the base solid. More particularly, the system rotates the ACS 90 degrees clockwise about the XMIN axis for the left view, or 90 degrees counter clockwise about the XMAX axis for the right view.

Next, in Step 2418, a 3×4 unit matrix is defined to produce a spatial translation of the ACS, wherein: Delta X=XVAL− OCSYMIN XMAX, Delta Y=0.0, AND Delta Z=−SOLTHICK. This operation is applied to the ACS (Step 2422), then the resulting solid atom is defined as: ZTOP= OCSXMIN XMIN, ZBOTTOM=OCSYMIN XMAX, and Work View register=4 (Left) or 3 (Right). After defining the solid atom, the system exits the subroutine (Step 2426).

Figure 15I:
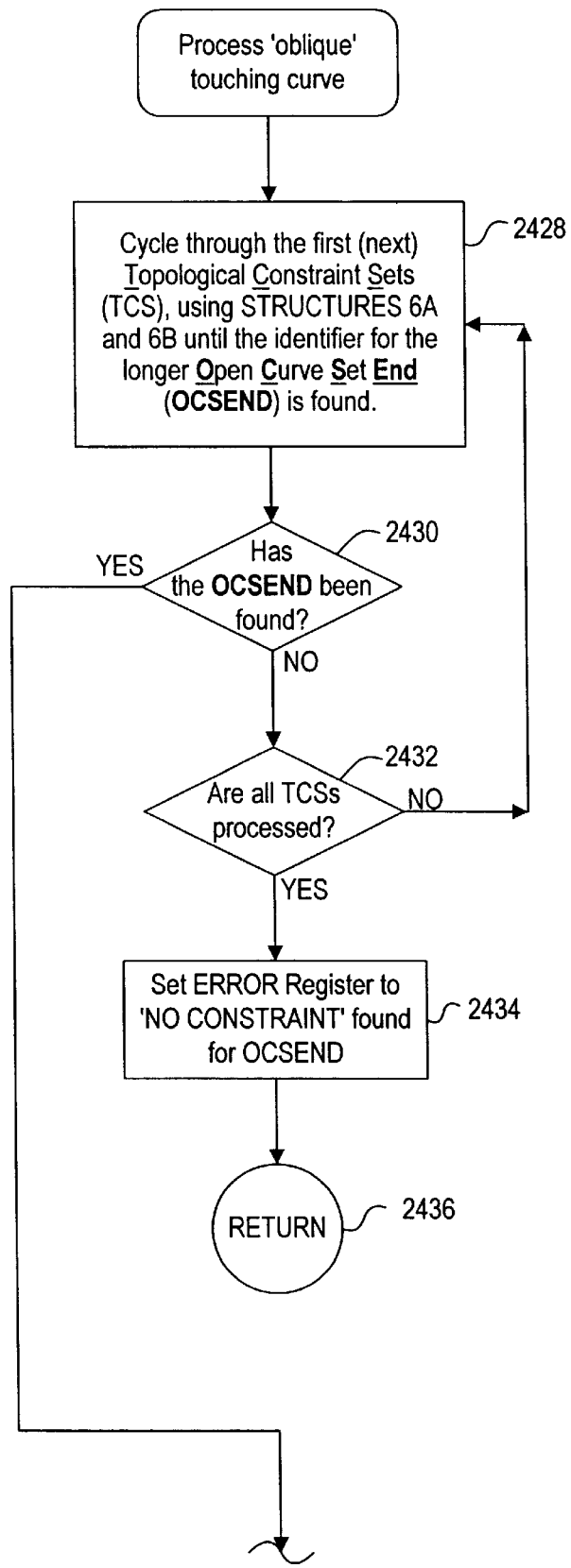

An exemplary method of processing open curve sets satisfying the oblique "touching" curve condition (referred to now as TOUCHING) will now be described in conjunction with FIG. 15I. First, in Step 2428, the system cycles through the TCS until the identifier for the open curve set end (OCSEND) is found. If the OCSEND has been found, the system branches from Step 2430 and proceeds to Step 2438. If the OCSEND has not been found after all TCSs have been processed (Step 2432), the system sets the ERROR register to "NO CONSTRAINT" found (Step 2434), and exits the subroutine (Step 2436).

Figure 15J:
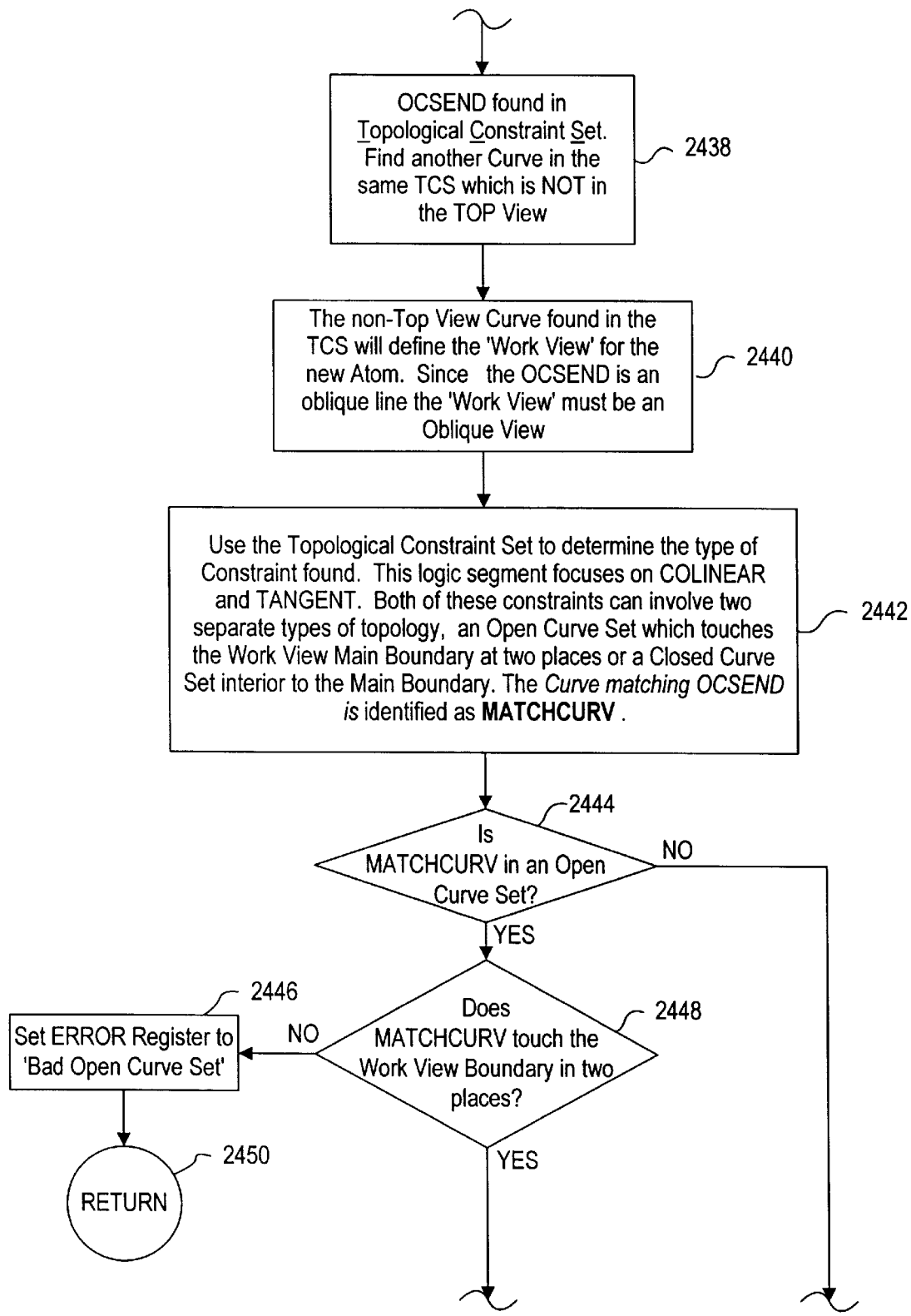

Referring now to FIG. 15J, in the case where OCSEND has been found ("yes" branch in Step 2430), the system finds another curve in the same TCS which is not in the plan view (Step 2438). The work view is set to the non-plan view curve found in the TCS. Note that since OCSEND is an oblique line, the work view must be an oblique view.

In step 2442, the type of constraint is determined from the TCS, and the curve matching OCSEND is identified as MATCHCURV.

Next, the system determines whether MATCHCURV is an element in an open curve set (Step 2444). If not, the system moves the closed curve set into the active curve set (ACS), then advances to Step 2464, described below.

In the case where MATCHCURV was found to be an element in an open curve set ("yes" branch in Step 2444), the system proceeds to Step 2448 and queries whether MATCH-CURV touches the work view boundary in two places. If not, the ERROR register is set to "Bad Open Curve Set," and the system exits the subroutine (Steps 2446 and 2450).

Figure 15K:
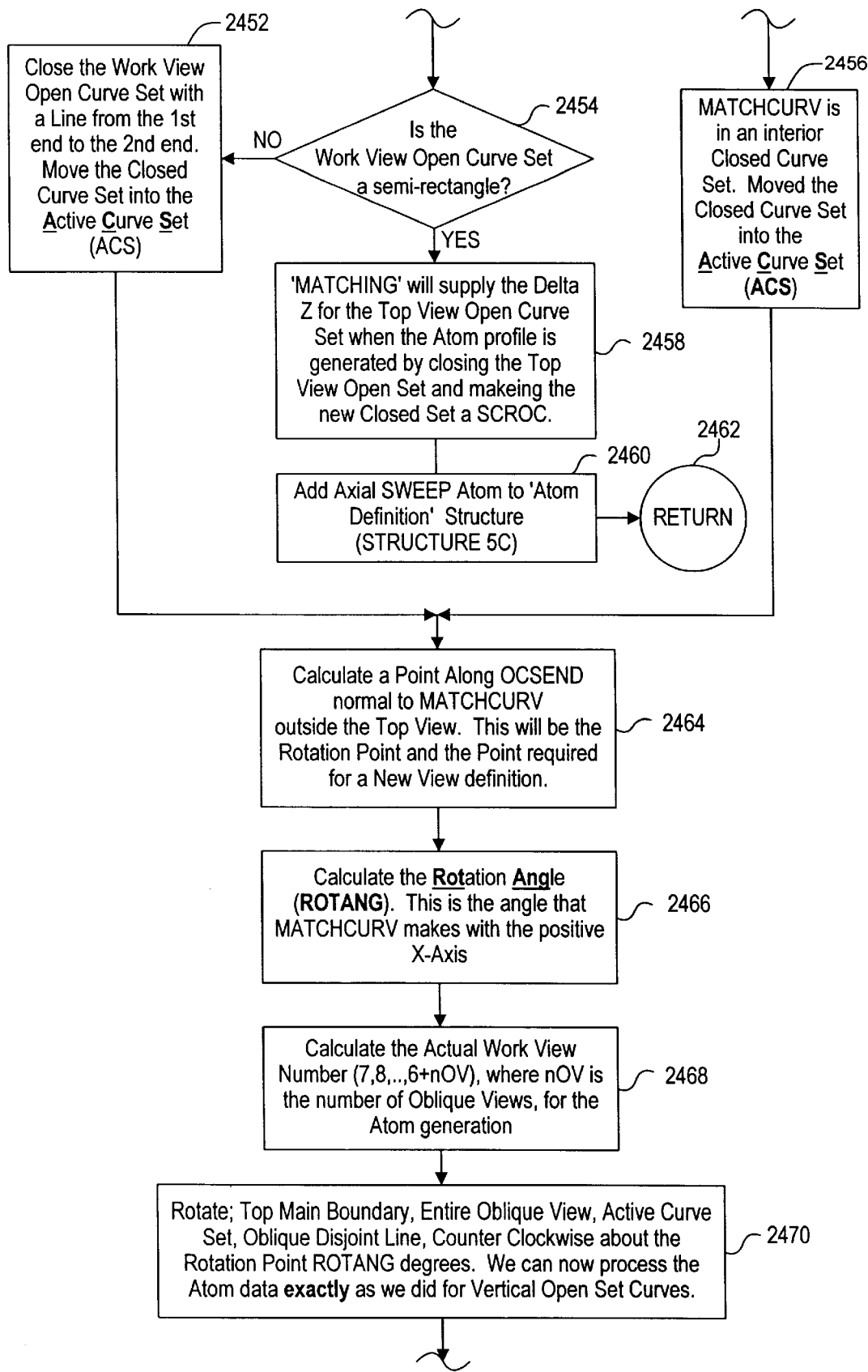
Figure 15L:
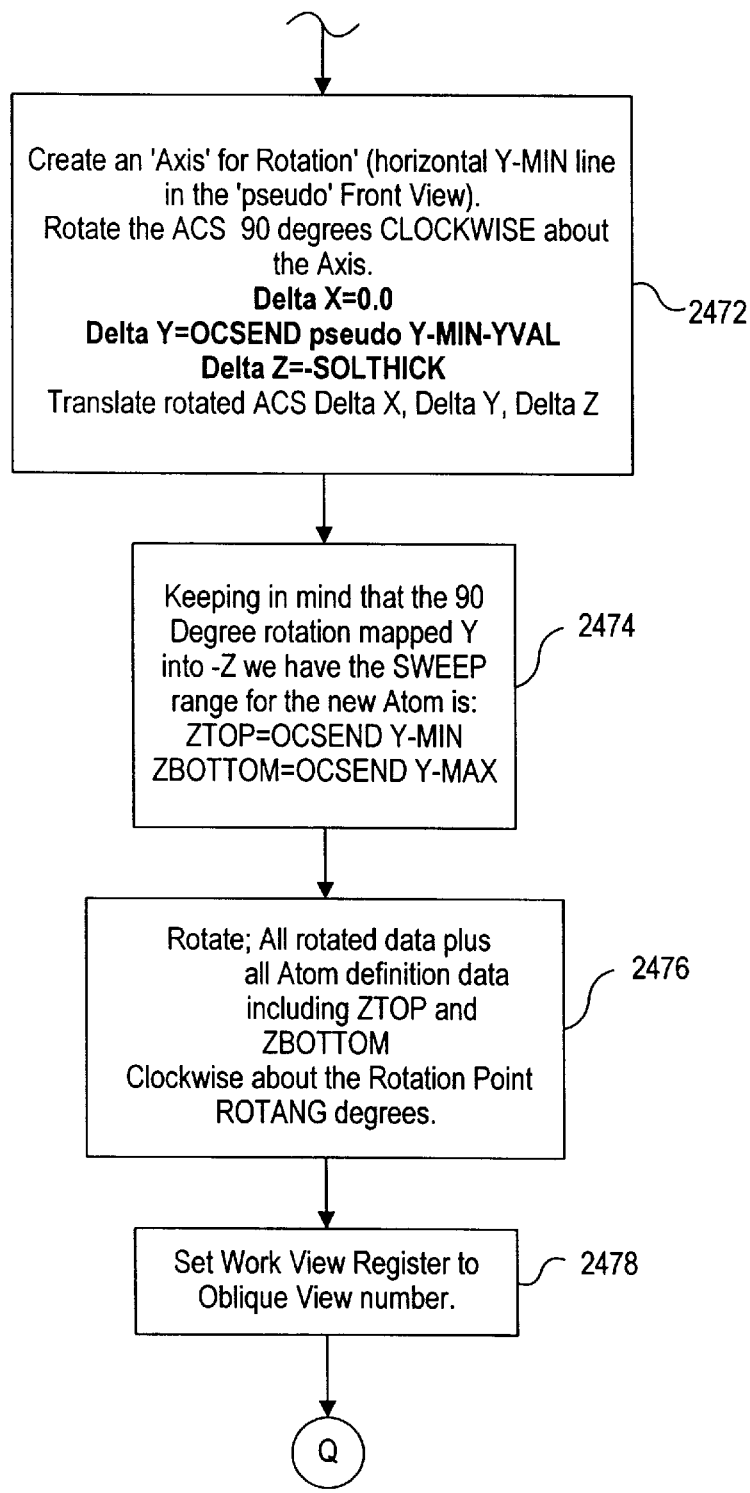

Referring now to FIG. 15K, when MATCHCURV is found to touch the work view boundary in two places ("yes" branch in Step 2448), the system queries whether the work view open curve set is a semi-rectangle (Step 2454). If not, the system proceeds to Step 2452, where the work view open curve set is closed with a line extending from the first to second end. This closed curve is then moved into the ACS and the system proceeds to Step 2464, described below.

If, in Step 2454, the work view open curve set was found to be a semi-rectangle, then the system proceeds to Step 2458 and defines the atom to be created. More particularly, the system creates an atom where: ZTOP=0, and length of sweep=length of MATCHCURV. This atom is then added as an axial sweep to the atom definition structure (Step 2460) and the system exists the subroutine (Step 2462).

After closing the work view open curve set in accordance with Step 2452, or moving the closed curve set into the ACS in accordance with Step 2456, the system proceeds to Step 2464.

In Step 2464 the system defines a rotation point along an extension of OCSEND which falls outside the current view. The exact placement of this point is not critical, as long as it lies outside the current view. In a preferred embodiment, the point is defined to be 0.1 inches outside the current view.

After defining a rotation point, a rotation angle is defined as the angle that MATCHCURV makes with the positive X-axis (Step 2466). The system then determines the actual work view number (i.e., the number corresponding to the particular oblique view of interest) then rotates a number of curves and curve sets counter clockwise about the rotation point by ROTANG degrees. The curves rotated about this point suitably comprise: 1) the top main boundary, 2) the entire oblique view, 3) the active curve set, and 4) the OCSEND curve.

Having rotated the oblique view such that it has effectively become the front view, or "pseudo-front view," the system them defines an axis of rotation as the horizontal YMIN line in the pseudo front view (Step 2472). Next, the system rotates the ACS 90 degrees clockwise about the axis of rotation. A 3×4 unit matrix is defined to produce a spatial translation of the ACS, wherein: Delta X=0.0, Delta Y=(OCSEND pseudo YMIN)−YVAL, and Delta Z=−SOLTHICK. This translation operation is applied to the ACS, allowing us to define the solid atom as: ZTOP= OCSEND YMIN, and ZBOTTOM=OCSYMIN YMAX.

After defining the solid atom, the system rotates all previously rotated data (including ZTOP and ZBOTTOM) clockwise about the rotation point ROTANG degrees (Step 2476). The system sets the work view register to the oblique view number (Step 2478), then exits the subroutine (Step 2478).

Figure 15M:
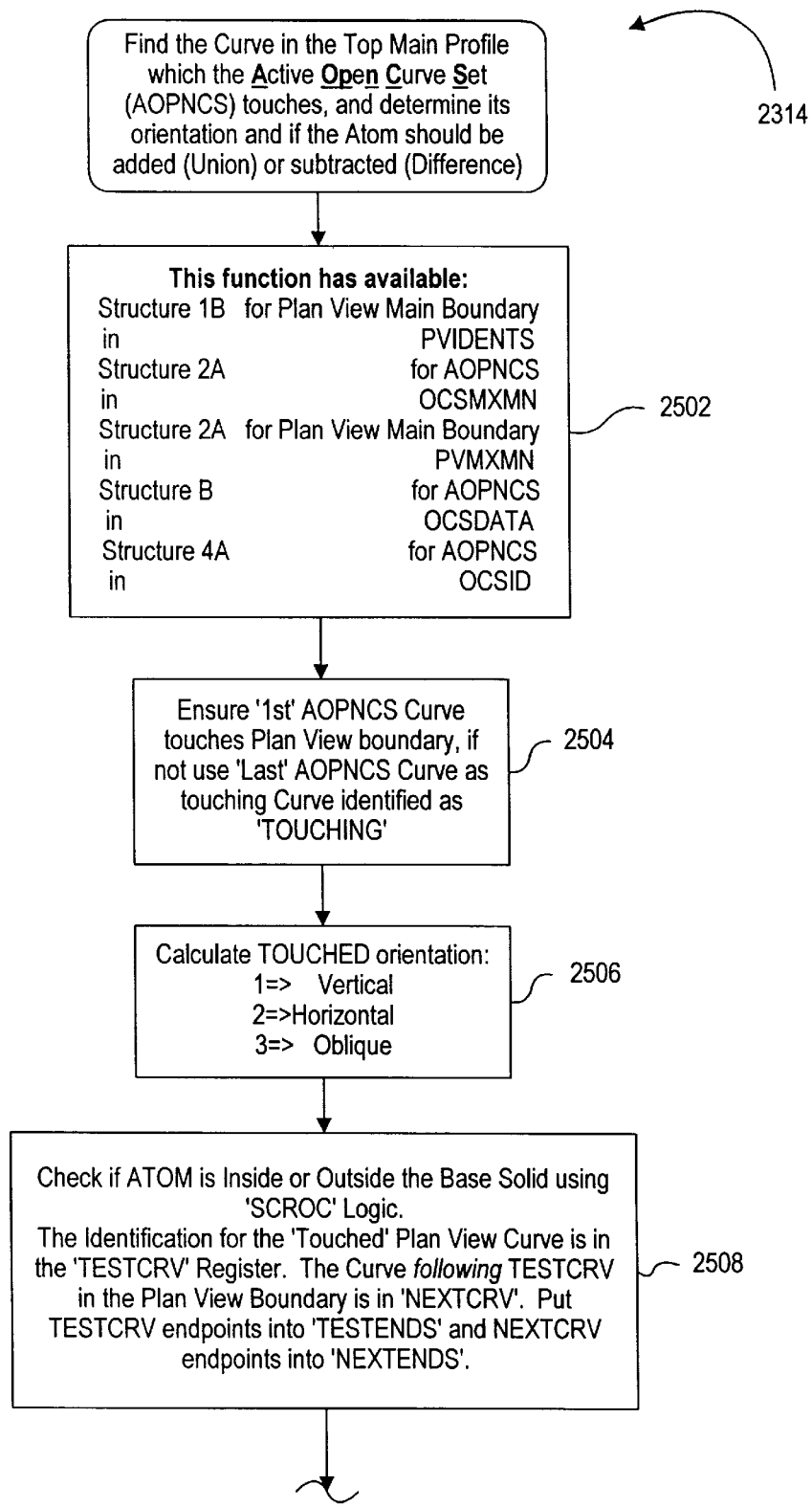

Referring now to FIG. 15M, an exemplary method for determining the TOUCHING curve orientation and whether the atom should be added or subtracted from the base solid will now be described in detail (this step corresponds to Step 2314 in FIG. 15A).

In Step 2504 the system determines whether the first active open curve set (AOPNCS) curve touches the plan view boundary. If so, the system designates the first AOP-NCS curve as the TOUCHING curve; if not, the then last AOPNCS curve is designated as such.

Next, in Step 2506, the orientation of the TOUCHED curve is determined (i.e., either vertical, horizontal, or oblique). The TOUCHED curve is simply that curve which the TOUCHING curve makes contact with along the plan view main boundary.

In the steps that follow, the system determines whether the atom to be created is inside or outside the base solid. As a preliminary matter, a number of registers are defined and initialized in Step 2508. Specifically, the curve identifier for the TOUCHED current view curve is placed in the TEST-CRV register, the curve following (i.e. next in the list after) TESTCRV in the current view boundary is placed in the NEXTCRV register, the TESTCRV endpoints are placed into the TESTENDS register, and the NEXTCRV endpoints are placed in the NEXTENDS register.

Having initializing the registers, the system then proceeds to Step 2510 (FIG. 15N), where a branching occurs according to the orientation of the TOUCHED curve. More particularly, when the TOUCHED curve is horizontal, the system proceeds to Step 2534; when the TOUCHED curve is vertical, the system proceeds to Step 2512; and when the TOUCHED curve is oblique, the system proceeds to Step 2534.

Figure 15N:
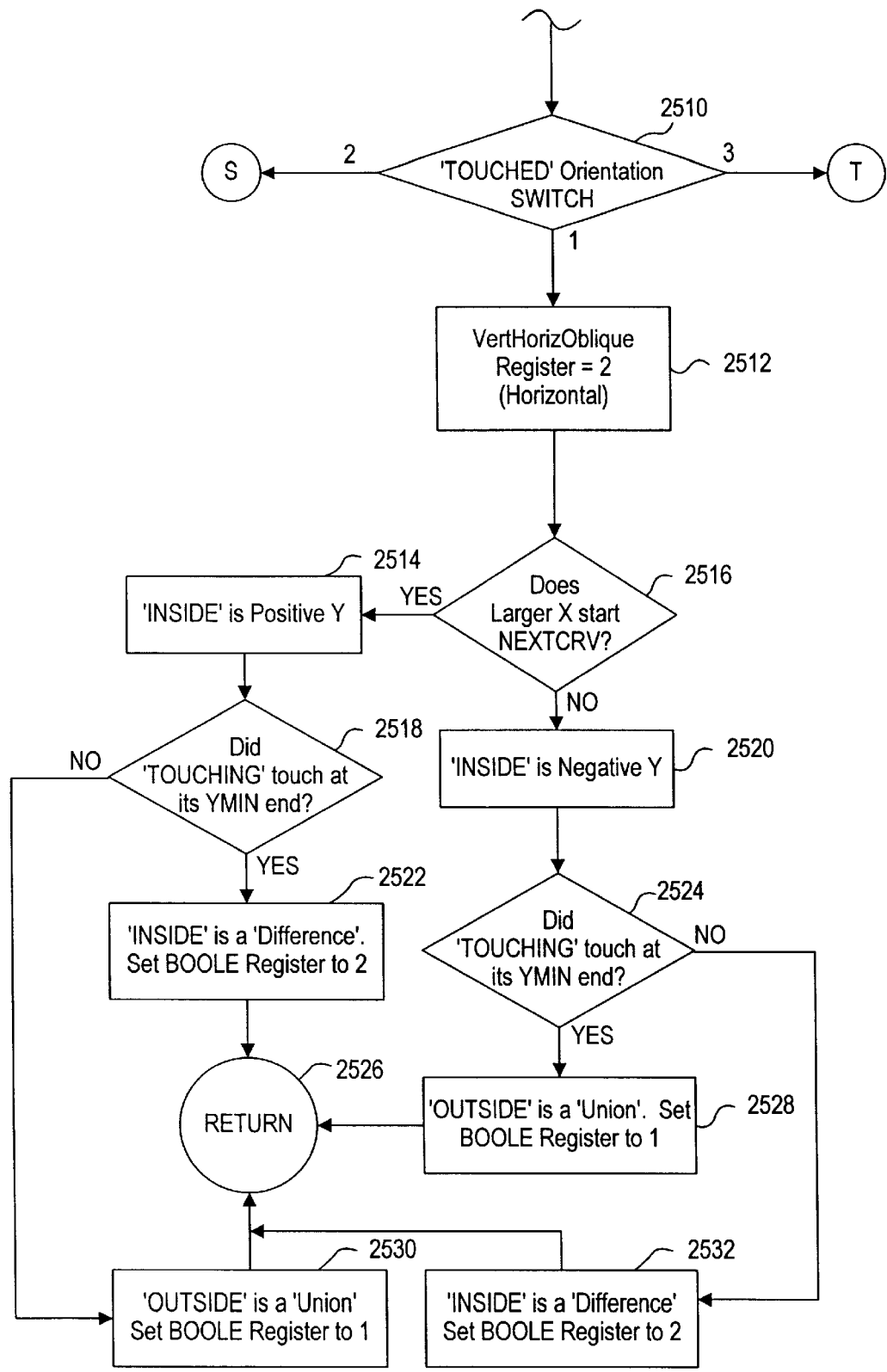
Figure 150:
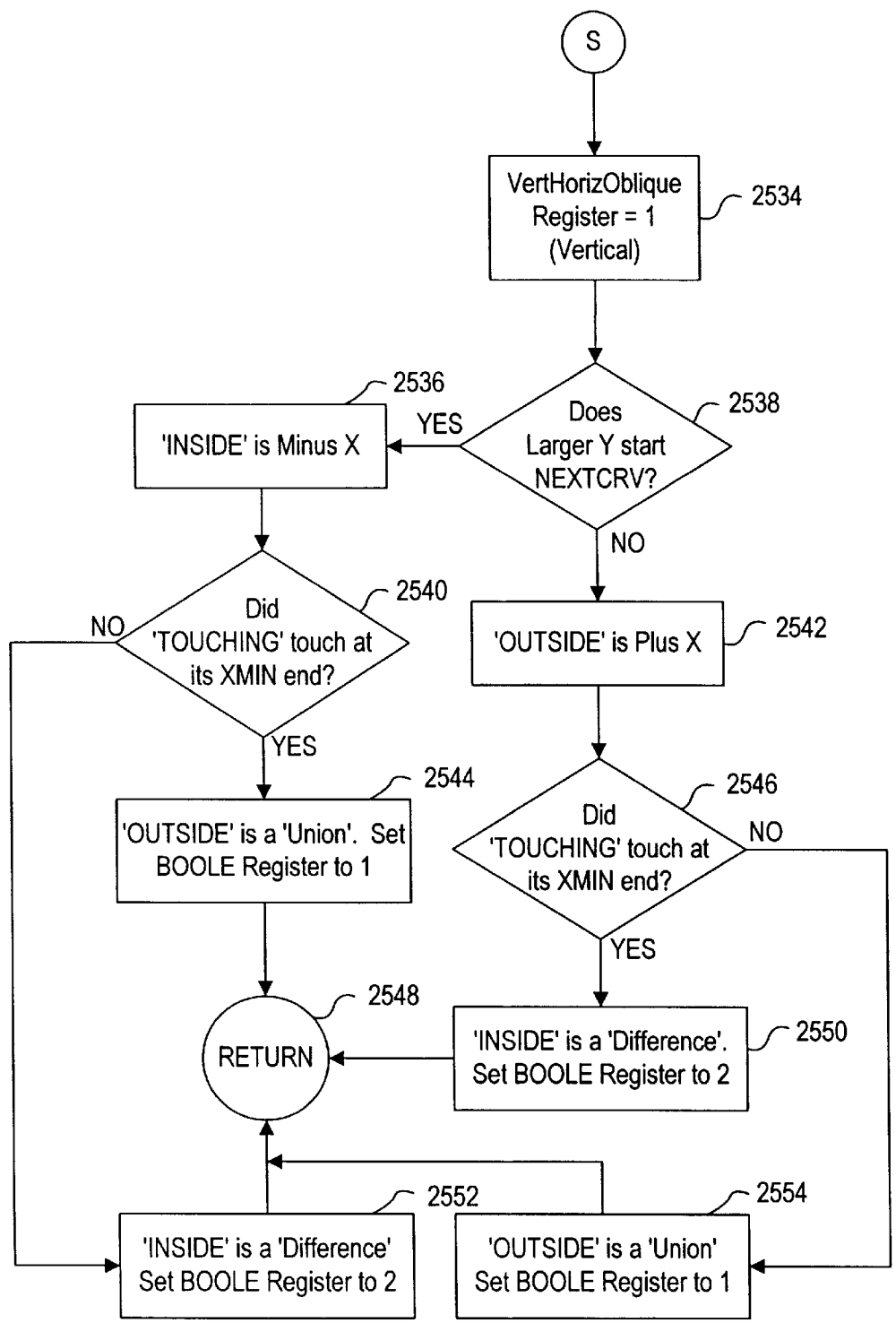

Referring now to FIG. 15N, an exemplary method for examining horizontal TOUCHED curves (Step 2512) will now be described in detail.

First, the system queries NEXTCRV and determines whether the X-value of its endpoints are greater then TEST-CRV (Step 2516). If so, then the system concludes that the "inside" of the closed curve is in the positive Y direction (Step 2514); if not, the system concludes that the inside of the closed curve is in the negative Y direction (Step 2520).

When the inside is determined to be in the positive Y direction ("yes" branch in Step 2516), the system continues to Step 2518 and queries whether TOUCHING contacts the main boundary at its YMIN end. If so, then a difference operation for the inside region is called for, and the system sets the BOOLE register to 2 (Step 2522); if not, then a union operation for the outside region is called for, and the system sets the BOOLE register to 1 (Step 2530). After setting the value of the BOOLE register in either of Steps 2522 or 2530, the system exits the subroutine (Step 2526).

When the inside is determined to be in the negative Y direction ("no" branch in Step 2516), the system continues to Step 2524 and queries whether TOUCHING contacts the main boundary at its YMIN end. If so, then a union operation for the outside region is called for, and the system sets the BOOLE register to 1 (Step 2528); if not, then a difference operation for the inside region is called for, and the system sets the BOOLE register to 2 (Step 2532). After setting the value of the BOOLE register in either of Steps 2528 or 2532, the system exits the subroutine (Step 2526).

Referring now to FIG. 15O, an exemplary method for examining vertical TOUCHED curves (Step 2534) will now be described in detail.

First, the system queries NEXTCRV and determines whether the Y-value of its endpoints are greater then TEST-CRV (Step 2538). If so, then the system concludes that the "inside" of the closed curve is in the negative X direction (Step 2536); if not, the system concludes that the outside of the closed curve is in the positive X direction (Step 2542).

When the inside is determined to be in the negative X direction ("yes" branch in Step 2538), the system continues to Step 2540 and queries whether TOUCHING contacts the main boundary at its XMIN end. If so, then a union operation for the outside region is called for, and the system sets the BOOLE register to 1 (Step 2544); if not, then a difference operation for the inside region is called for, and the system sets the BOOLE register to 2 (Step 2552). After setting the value of the BOOLE register in either of Steps 2552 or 2544, the system exits the subroutine (Step 2548).

When the outside is determined to be in the positive X direction ("no" branch in Step 2538), the system continues to Step 2546 and queries whether TOUCHING contacts the main boundary at its XMIN end. If so, then a difference operation for the inside region is called for, and the system sets the BOOLE register to 2 (Step 2550); if not, then a union operation for the outside region is called for, and the system sets the BOOLE register to 1 (Step 2554). After setting the value of the BOOLE register in either of Steps 2554 or 2550, the system exits the subroutine (Step 2548).

Figure 15P:
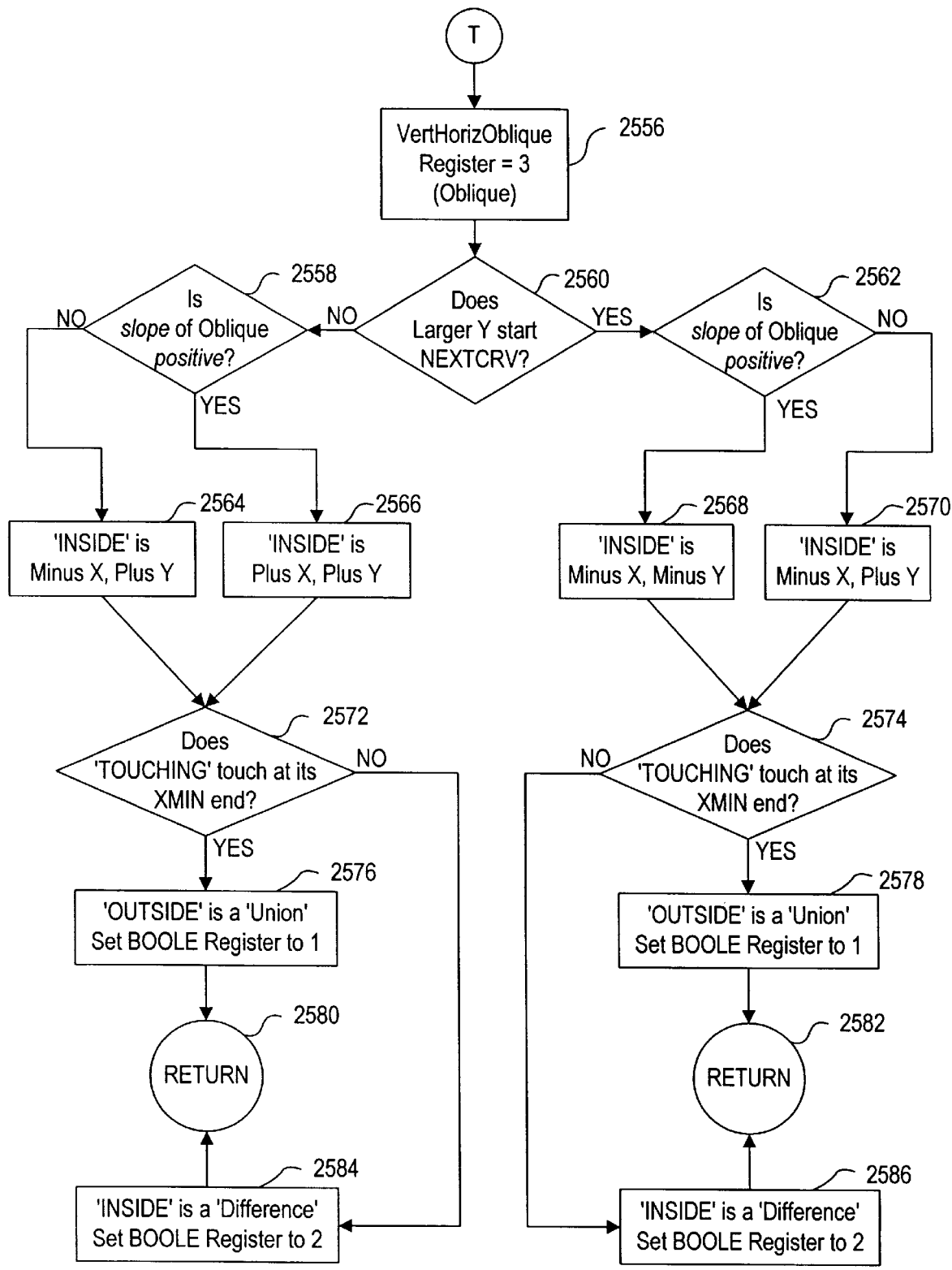

Referring now to FIG. 15P, an exemplary method for examining oblique TOUCHED curves (Step 2556) will now be described in detail.

In Step 2560, the system first determines whether NEXTCRV starts with a larger Y value. If so, the system proceeds to Step 2562; if not, the system proceeds to Step 2558.

When a larger Y value does not start NEXTCRV ("no" branch in Step 2560), the system determines whether the slope of the oblique curve is positive (Step 2558). If so, the system concludes that the inside of the closed curve corresponds to the positive X and positive Y directions (Step 2566); if not, the system concludes that the inside of the closed curve corresponds to the negative X and positive Y directions (Step 2564). After thus determining the direction of the inside region, the system proceeds to Step 2572 and queries whether the TOUCHING curve contacts the main boundary at its XMIN end. If so, the system concludes that a union operation is appropriate for the outside region, and sets the BOOLE register to 1 (Step 2576); if not, the system uses a difference operation for the inside region and sets the BOOLE register to 2. After thus setting the BOOLE register in Steps 2576 and 2584, the system exits the subroutine (Step 2580).

When a larger Y value starts NEXTCRV ("yes" branch in Step 2560), the system determines whether the slope of the oblique curve is positive (Step 2562). If so, the system concludes that the inside of the closed curve corresponds to the minus X and minus Y directions (Step 2568); if not, the system concludes that the inside of the closed curve corresponds to the negative X and positive Y directions (Step 2570). After thus determining the direction of the inside region, the system proceeds to Step 2574 and queries whether the TOUCHING curve contacts the main boundary at its XMIN end. If so, the system concludes that a union operation is appropriate for the outside region, and sets the BOOLE register to 1 (Step 2578); if not, the system uses a difference operation for the inside region and sets the BOOLE register to 2. After thus setting the BOOLE register in Steps 2578 and 2586, the system exits the subroutine (Step 2580).

Figure 15Q:
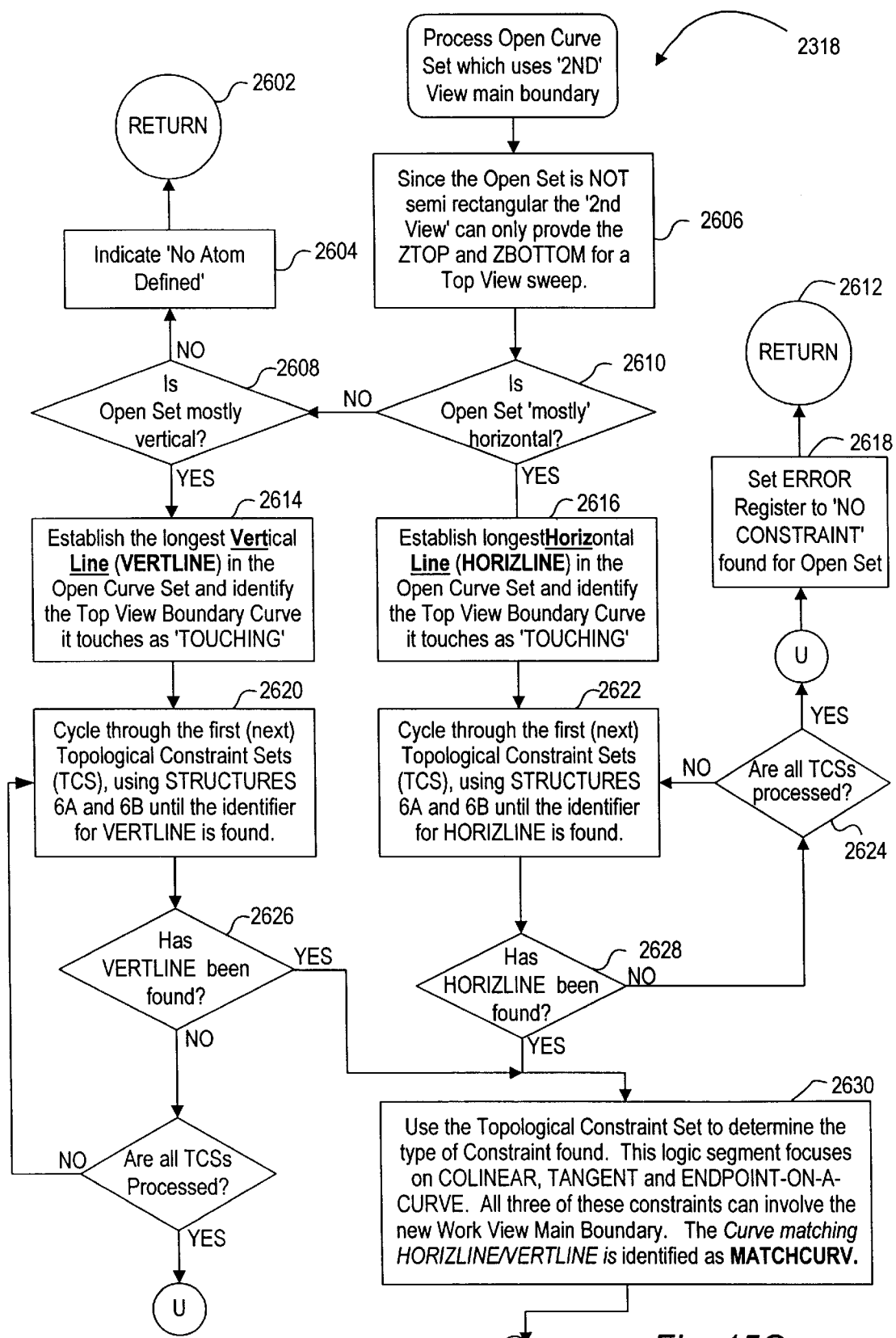
Figure 15:
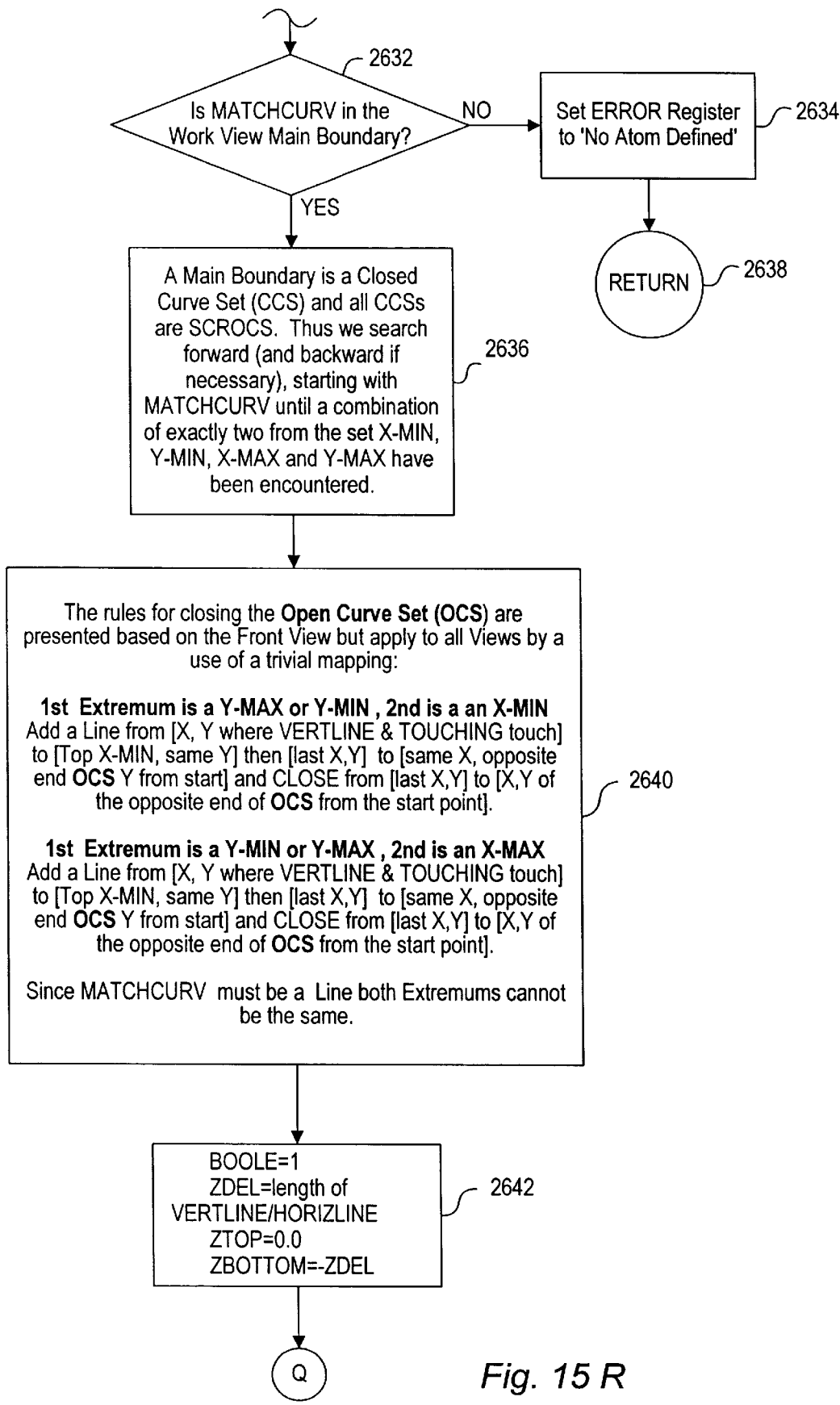

Referring now to FIGS. 15Q and 15R, an exemplary method of processing open curve sets which uses the "2nd view" main boundary (Step 2318) will now be described. First, it will be appreciated that since the open set is not semi-rectangular, the 2nd view can only provide the ZTOP and ZBOTTOM for a top view sweep. Thus, in Step 2610, the system queries whether the open set is mostly horizontal; that is, whether the curve set, taken as a whole, has greater X-axis extrema than Y-axis extrema (or, more succinctly, whether it's wider than it is tall). If the open set is not mostly horizontal, the system proceeds to Step 2608, discussed below. Otherwise, the system establishes the longest horizontal line (HORIZLINE) in the open curve set and identifies the top view boundary curve it touches (Step 2616). This curve is thereafter referred to as TOUCHING. Next, in Step 2622, the system cycles through the first TCS until the identifier for HORIZLINE is found. If HORIZLINE is not found, the system loops back to Step 2622 via Step 2624 until all TCSs are processed. In the event HORIZLINE is still not found, the system sets the ERROR register to "NO CONSTRAINT" (Step 2618), then exits the subroutine (Step 2612). If previously at Step 2628 the system successfully located HORIZLINE in a TCS, the system proceeds to Step 2630, discussed below.

If the open set was not found to be mostly horizontal ("no" branch in Step 2610), the system queries whether the open set is mostly vertical (Step 2608). If not, the system indicates that no atom was defined (Step 2604) and returns (Step 2602). If the open set is found to be mostly vertical, then the system establishes the longest vertical line (VERTLINE) in the open curve set and identifies the top view boundary curve that it touches (Step 2614). This curve is identified as TOUCHING. In Step 2620, then, the system cycles through the first TCS until the identifier for VERTLINE is found. If VERTLINE is not found, the system cycles through the remaining TCSs until all have been processed (Step 2624). If VERTLINE has still not been found after examining all TCSs, the system sets the ERROR register to "NO CONSTRAINT" and exits (Steps 2618 and 2612).

In the case where either VERTLINE or HORIZLINE has been found ("yes" branch in Step 2626 and "yes" branch in Step 2628), the system in Step 2630 then focuses on a subset of constraints, suitably consisting of colinear, tangent, and endpoint-on-a-curve. The curve matching HORIZLINE or VERTLINE in the work view is identified as MATCH-CURV.

Next, the system queries whether MATCHCURV is an element in the work view main boundary (Step 2632). If not, the system sets the ERROR register to "No atom defined" and returns (Steps 2634 and 2638).

Where MATCHCURV is an element in the work view main boundary, the system searches forward (and backward if necessary), starting with MATCHCURV, until a combination of exactly two from the set XMIN, YMIN, XMAX, and YMAX have been encountered (Step 2636). The system then closes the open curve set (Step 2640). This closing is done according to the nature of the extrema encountered in Step 2636. More particularly, if the first extremum is a YMAX or YMIN, and the second extremum is an XMIN, then the system adds a line from the (X, Y) point where TOUCHING and VERTLINE contact to a point defined as (Top XMIN, Y where TOUCHING and VERTLINE contact). Another line is added from the previous point to a point defined as (Top XMIN, opposite end of OCS Y from start). A final line is then added from the previous point to a point defined by the (X,Y) coordinates of the opposite end of OCS from the start point.

If the first extremum is a YMAX or YMIN, and the second extremum is an XMAX, then the system adds a line from the (X, Y) point where TOUCHING and VERTLINE contact to a point defined as (Top XMIN, Y where TOUCHING and VERTLINE contact). Another line is added from the previous point to a point defined as (Top XMIN, opposite end of OCS Y from start). A final line is then added from the previous point to a point defined by the (X,Y) coordinates of the opposite end of OCS from the start point.

It will be appreciated that since MATCHCURV is a line, both extremum cannot be the same. It will also be appreciated that although these closing rules are set forth above based on the front view, the same rules may be employed in other views through a trivial mapping.

After thus closing the open curve set, the system defines a solid atom as: BOOLE=1, ZDEL=length of VERTLINE (or HORIZLINE), ZTOP=0.0, and ZBOTTOM=−ZDEL (Step 2642). At this point, the system returns to previously described Step 2304 (FIG. 15A).

At this point, all disjoint, closed, and open curve sets have been processed and the respective solid atoms have been cataloged in atom definitions structure 3000. The system then, in Step 1032, takes the first two atoms (atom number one being the base solid generated previously in Step 1018) and, in accordance with methods well known in the art, applies the corresponding Boolean operation to the base solid. The resulting solid then becomes the new working base solid, and the system continues through the list of atoms until the finished geometric solid is created.

Although the present invention is set forth herein in the context of the appended drawing figures, it should be appreciated that the invention is not limited to the specific forms shown. Various other modifications, variations, and enhancements in the design and arrangement of the systems and methods discussed herein may be made in the context of the present invention. For example, a preferred embodiment of the present invention is described herein in the context of a traditional computer system operating in a sequential mode; however, the present invention may be advantageously utilized in a parallel processing environment.

In addition, while an exemplary embodiment of the present invention was described in the context of generating a single contiguous solid, it will be appreciated that the described methods may be utilized for generating multiple solids or assemblies. More particularly, two-dimensional drawing data portraying multiple parts—for example, exploded views of interacting components—may be converted into a group of corresponding geometric solids.

These and other modifications may be made in the design and implementation of various aspects of the invention without departing from the spirit and scope of the invention as set forth in the appended claims.

I claim:

1. A method of generating and displaying a three-dimensional geometric solid from two-dimensional drawing data using a digital computer, wherein said two-dimensional drawing data comprises a plurality of geometric entities, comprising the steps of:

(a) segregating said geometric entities into a plurality of respective view sets, wherein said segregating step comprises the steps of:

grouping said geometric entities into closed curve sets, open curve sets and disjoint curves;

ordering said closed curve sets as a function of area;

computing a center of gravity for each of said closed curve sets;

grouping at least one of said closed curve sets into a unique one of said view sets in accordance with said ordering step, said computing step, and whether said curve set makes contact with another of said closed curve sets;

grouping at least one of said open curve sets into a unique one of said view sets by identifying a closed curve set with which it makes contact; and grouping each of said disjoint curves into a unique one of said view sets by identifying a closed curve set with which it makes contact;

(b) automatically identifying a plurality of relational constraints associated with said geometric entities; and (c) automatically generating and displaying said three-dimensional geometric solid in accordance with said segregating and defining steps.

2. The method of claim 1, wherein said generating step comprises the steps of:

ordering said view sets as a plan view set and at least one second view set, wherein said ordering step comprises the steps of:

computing a center of gravity for each of said view sets;

identifying a plan view set in accordance with user input; and ordering said second view set in accordance with the position of said plan view set center of gravity with respect to the position of said second view set center of gravity;

grouping said geometric entities within said plan view set and said second view set into closed curve sets, open curve sets and disjoint curves;

determining a base solid type;

defining a base solid in accordance with said base solid type;

defining a plurality of solid atoms; and creating said three-dimensional geometric solid in accordance with said base solid and said plurality of solid atoms.

3. The method of claim 1, wherein said generating step comprises the steps of:

ordering said view sets as a plan view set and at least one second view set;

grouping said geometric entities within said plan view set and said second view set into closed curve sets, open curve sets and disjoint curves;

determining a base solid type, wherein said step of determining the base solid type comprises the steps of:

classifying the base solid as a rotational sweep type when:

a) all closed curves in said plan view set are concentric circles or closed curve sets substantially concentric with the plan view main boundary; and b) said second view set is substantially axi-symmetric about its center;

classifying the base solid as a smooth blended solid type when said second view set comprises only geometric entities that are lines whose ends would coincide with the extensions of vertical or horizontal tangents to the extrema of each of said closed curve sets within said plan view set; and classifying the base solid as an axial sweep type when neither the smooth blended solid criteria nor rotational sweep criteria are met;

defining a base solid in accordance with said base solid type;

defining a plurality of solid atoms; and creating said three-dimensional geometric solid in accordance with said base solid and said plurality of solid atoms.

4. The method of claim 1, wherein said generating step comprises the steps of:
   ordering said view sets as a plan view set and at least one second view set;
   grouping said geometric entities within said plan view set and said second view set into closed curve sets, open curve sets and disjoint curves;
   determining a base solid to be of the axial sweep type;
   defining a base solid, wherein said step of defining said base solid comprises the steps of:
      establishing the main boundary of said plan view set;
      identifying a view depth geometric entity associated with said plan view main boundary in accordance with said relational constraints; and
      defining an axial sweep base solid in accordance with said plan view main boundary and said view depth geometric entity;
   defining a plurality of solid atoms; and
   creating said three-dimensional geometric solid in accordance with said base solid and said plurality of solid atoms.

5. The method of claim 1, wherein said generating step comprises the steps of:
   ordering said view sets as a plan view set and at least one second view set;
   grouping said geometric entities within said plan view set and said second view set into closed curve sets, open curve sets and disjoint curves;
   determining a base solid to be of the rotational sweep type;
   defining a base solid, wherein said step of defining said base solid comprises the steps of:
      ascertaining a profile corresponding to said plan view main boundary;
      determining the axis of symmetry; and
      defining the base solid in accordance with the locus of points resulting from a rotation of said profile about said axis of symmetry in arbitrarily small increments;
   defining a plurality of solid atoms; and
   creating said three-dimensional geometric solid in accordance with said base solid and said plurality of solid atoms.

6. The method of claim 1, wherein said generating step comprises the steps of:
   ordering said view sets as a plan view set and at least one second view set;
   grouping said geometric entities within said plan view set and said second view set into closed curve sets, open curve sets and disjoint curves;
   determining a base solid to be of the smooth blended type;
   defining a base solid, wherein said step of defining said base solid comprises the step of forming smooth blends as transitions between each successive closed curve set;
   defining a plurality of solid atoms; and
   creating said three-dimensional geometric solid in accordance with said base solid and said plurality of solid atoms.

7. The method of claim 1, wherein said generating step comprises the steps of:
   ordering said view sets as a plan view set and at least one second view set;
   grouping said geometric entities within said plan view set and said second view set into closed curve sets, open curve sets and disjoint curves;
   determining a base solid type;
   defining a base solid in accordance with said base solid type;
   defining a plurality of solid atoms; and
   creating said three-dimensional geometric solid in accordance with said base solid and said plurality of solid atoms;
   wherein said step of defining a plurality of solid atoms comprises the steps of:
      performing, for each of said view sets taken in an order determined by said ordering step, the steps of:
         a) designating said view set as the current view set;
         b) processing each of said disjoint curves, wherein said processing comprises the steps of:
            1) establishing the orientation of said disjoint curve, wherein said orientation is either vertical, horizontal, or oblique;
            2) establishing the curve type, wherein said curve type is either a line or non-line;
            3) defining a solid atom associated with said disjoint curve in accordance with said curve type and orientation;
         c) processing each of said closed curve sets, wherein said processing comprises the steps of:
            1) establishing the extrema orientation of said closed curve set;
            2) establishing the extrema curve type, wherein said extrema curve type is either linear or non-linear;
            3) establishing whether the YMAX extrema is a point-on-a-curve;
            4) defining a solid atom associated with said closed curve set in accordance with said curve type and orientation;
         c) processing each of said open curve sets, wherein said processing comprises the steps of:
            1) locating a touching curve within said current view set which contacts said open curve set;
            2) determining the orientation of said touching curve;
            3) determining whether said open curve set is semi-rectangular; and
            4) defining a solid atom associated with said open curve set in accordance the orientation of said touching curve and whether said open curve set is semi-rectangular.

8. The method of claim 7, wherein said step of defining a solid atom associated with said disjoint curve includes the step of processing vertical disjoint lines, said step comprising the steps of:
   a) identifying, within a view set other than said current view set, a match curve which corresponds to said disjoint curve in accordance with said relational constraints, wherein the view set comprising said match curve is designated the work view set;
   b) in the case where said match curve is within the work view set main boundary, performing the steps of:

1) searching within the curve set comprising said match curve for a chain of curves whose extrema values include exactly two chosen from the set XMIN, YMIN, XMAX, and YMAX
2) designating said chain of curves as the active curve set;
3) closing said active curve set in accordance with said extrema values;

c) in the case where said match curve is within an interior closed curve set, defining said closed curve set as the active curve set;

d) determining an axis of rotation in accordance with said work view set;

e) rotating said active curve set about an axis of rotation in order to place said active curve set within the plane of said work view set;

f) translating said active curve set by a translation vector defined in accordance with the position of said disjoint curve with respect to said active curve set and the thickness of said base solid; and g) defining said solid atom in accordance with said active curve set, said translation vector, and the length of said disjoint line.

9. The method of claim 7, wherein said step of defining a solid atom associated with said disjoint curve includes the step of processing vertical disjoint non-lines, said step comprising the steps of:

a) identifying a tangent line, in a view set other than said current view set, which corresponds to said vertical disjoint non-line in accordance with said relational constraints, wherein the view set comprising said tangent line is designated the work view set;

b) locating the intersections of said vertical disjoint non-line and said current view main boundary;

c) closing the vertical disjoint non-line in accordance with said intersections and said current view main boundary;

d) defining a translation vector in accordance with the length of said tangent line; and e) defining said solid atom in accordance with said vertical disjoint non-line and said translation vector.

10. The method of claim 7, wherein said step of defining a solid atom associated with said disjoint curve includes the step of processing horizontal disjoint lines, said step comprising the steps of:

a) identifying a match curve, in a view set other than said current view set, which corresponds to said disjoint curve in accordance with said relational constraints, wherein the view set comprising said match curve is designated the work view set;

b) in the case where said match curve is within the work view set main boundary, performing the steps of:
1) searching within the curve set comprising said match curve for a chain of curves whose extrema values include exactly two chosen from the set XMIN, YMIN, XMAX, and YMAX;
2) designating said chain of curves as the active curve set;
3) closing said active curve set in accordance with said extrema values;

c) in the case where said match curve is within an interior closed curve set, defining said closed curve set as the active curve set;

d) determining an axis of rotation in accordance with said work view set;

e) rotating said active curve set about an axis of rotation in order to place said active curve set within the plane of said work view set;

f) translating said active curve set by a translation vector defined in accordance with the position of said disjoint curve with respect to said active curve set and the thickness of said base solid; and g) defining said solid atom in accordance with said active curve set, said translation vector, and the length of said disjoint line.

11. The method of claim 7, wherein said step of defining a solid atom associated with said disjoint curve includes the step of processing horizontal disjoint non-lines, said step comprising the steps of:

a) identifying a tangent line, in a view set other than said current view set, which corresponds to said horizontal disjoint non-line in accordance with said relational constraints, wherein the view set comprising said tangent line is designated the work view set;

b) locating the intersections of said horizontal disjoint non-line and said current view main boundary;

c) closing the horizontal disjoint non-line in accordance with said intersections and said current view main boundary; and d) defining said solid atom in accordance with said vertical disjoint non-line and the length of said vertical disjoint non-line.

12. The method of claim 7, wherein said step of defining a solid atom associated with said disjoint curve includes the step of processing oblique disjoint lines, said step comprising the steps of:

a) identifying a main boundary curve which contacts said oblique disjoint line;

b) identifying a match curve, in a view set other than said current view set, which corresponds to said disjoint curve in accordance with said relational constraints, wherein the view set comprising said match curve is designated the work view set;

c) defining a rotation point collinear with said oblique disjoint line which lies outside said current view set main boundary;

d) defining a rotation angle as the angle that said main boundary curve makes with the positive X-coordinate axis of said current view set;

e) designating as the work view set an appropriate oblique view set corresponding to said match curve;

f) determining the intersections of said oblique disjoint non-line and said current view main boundary;

g) closing the oblique disjoint line in accordance with said intersections and said current view set main boundary, thereby defining an active curve set;

h) defining an axis of rotation in accordance with said work view set;

i) rotating said active curve set about said axis of rotation in order to place said active curve set within a plane of said work view set;

j) translating said active curve set by a translation vector defined in accordance with the position of said disjoint curve with respect to said active curve set and the thickness of said base solid; and k) defining said solid atom in accordance with said active curve set, said translation vector and said axis of rotation.

13. The method of claim 7, wherein said step of defining a solid atom associated with said closed curve set includes the step of processing vertical XMAX closed curve sets, said step comprising the steps of:

a) defining an active XMAX line;
b) identifying a collinear line, in a view set other than said current view set, which corresponds to said XMAX line in accordance with said relational constraints;
c) in the case where said vertical XMAX closed curve set is a rectangle parallel to the X-coordinate axis of said current view set and said collinear line is part of a closed curve set which is not a rectangle parallel to said X-coordinate axis, performing the steps of:
  1) defining the closed curve set comprising said collinear line as the active curve set;
  2) defining said active XMAX line as the active disjoint line;
  3) determining an axis of rotation in accordance with said work view set;
  4) rotating said active curve set about said axis of rotation in order to place said active curve set within the plane of said work view set;
  5) translating said active curve set by a translation vector defined in accordance with the position of said disjoint curve with respect to said active curve set and the thickness of said base solid;
  6) defining said solid atom in accordance with said active curve set, said translation vector, and the length of said disjoint line;
d) in the case where said vertical XMAX closed curve set is not a rectangle parallel to the X-coordinate axis of said current view set or said collinear line is not a part of a closed curve set which is not a rectangle parallel to said X-coordinate axis, performing the steps of:
  1) defining a local top in accordance with whether said closed curve set is within a larger closed curve set; and
  2) defining said solid atom in accordance with said local top, the length of said collinear line, and said vertical XMAX closed curve set.

14. The method of claim 7, wherein said step of defining a solid atom associated with said closed curve set includes the step of processing non-linear YMAX closed curve sets, said step comprising the steps of:
a) defining an active YMAX curve;
b) identifying a line tangent to said active YMAX curve, in a view set other than said current view set, which corresponds to said YMAX curve in accordance with said relational constraints;
c) defining the view set comprising said tangent line as the work view set;
d) defining a local top in accordance with whether said closed curve set is within a larger closed curve set; and
e) defining said solid atom in accordance with said local top, the length of said tangent line, and said non-linear YMAX closed curve set.

15. The method of claim 7, wherein said step of defining a solid atom associated with said closed curve set includes the step of processing horizontal YMAX closed curve sets, said step comprising the steps of:
a) defining an active YMAX line;
b) identifying a collinear line, in a view set other than said current view set, which corresponds to said YMAX line in accordance with said relational constraints;
c) in the case where said horizontal YMAX closed curve set is a rectangle parallel to the X-coordinate axis of said current view set and said collinear line is part of a closed curve set which is not a rectangle parallel to said X-coordinate axis, performing the steps of:
  1) defining the closed curve set comprising said collinear line as the active curve set;
  2) defining said active YMAX line as the active disjoint line;
  3) determining an axis of rotation in accordance with said work view set;
  4) rotating said active curve set about said axis of rotation in order to place said active curve set within the plane of said work view set;
  5) translating said active curve set by a translation vector defined in accordance with the position of said disjoint curve with respect to said active curve set and the thickness of said base solid;
  6) defining said solid atom in accordance with said active curve set, said translation vector, and the length of said disjoint line;
d) in the case where said horizontal YMAX closed curve set is not a rectangle parallel to the X-coordinate axis of said current view set or said collinear line is not a part of a closed curve set which is not a rectangle parallel to said X-coordinate axis, performing the steps of:
  1) defining a local top in accordance with whether said closed curve set is within a larger closed curve set; and
  2) defining said solid atom in accordance with said local top, the length of said collinear line, and said horizontal YMAX closed curve set.

16. The method of claim 7, wherein said step of defining a solid atom associated with said closed curve set includes the step of processing non-linear XMAX closed curve sets, said step comprising the steps of:
a) defining an active XMAX curve;
b) identifying a line tangent to said active XMAX curve, in a view set other than said current view set, in accordance with said relational constraints;
c) defining the view set comprising said tangent line as the work view set;
d) defining a local top in accordance with whether said closed curve set is within a larger closed curve set; and
e) defining said solid atom in accordance with said local top, the length of said tangent line, and said non-linear XMAX closed curve set.

17. The method of claim 7, wherein said step of defining a solid atom associated with said closed curve set includes the step of processing point-on-a-curve XMAX closed curve sets, said step comprising the steps of:
a) defining an active XMAX curve;
b) identifying a line tangent to said active XMAX curve, in a view set other than said current view set, in accordance with said relational constraints;
c) defining the view set comprising said tangent line as the work view set;
d) defining a local top in accordance with whether said closed curve set is within a larger closed curve set; and
e) defining said solid atom in accordance with said local top, the length of said tangent line, and said point-on-a-curve XMAX closed curve set.

18. The method of claim 7, wherein said step of defining a solid atom associated with said open curve set includes the step of processing open curve sets which use a second view main boundary, said step comprising the steps of:
a) in the case where said open curve set is substantially horizontal, performing the steps of:
  1) identifying a longest line as the longest horizontal line in said open curve set;

2) identifying a touching curve in said current view main set boundary which contacts said longest line;
3) identifying a match curve, in a view set other than said current view set, which corresponds to said longest line in accordance with said relation constraints;
4) defining the view set comprising said match curve as the work view set;
5) continuing with step c) below;

b) in the case where said open curve set is substantially vertical, performing the steps of:
  1) identifying a longest line as the longest vertical line in said open curve set;
  2) identifying a touching curve in said current view main boundary which contacts said longest line;
  3) identifying a match curve, in a view set other than said current view set, which corresponds to said longest line in accordance with said relational constraints;
  4) defining the view set comprising said match curve as the work view set;

c) in the case where said match curve is within the main boundary, performing the steps of:
  1) searching within the curve set comprising said match curve for a chain of curves whose extrema values include exactly two chosen from the set XMIN, YMIN, XMAX, and YMAX;
  2) designating said chain of curves as the active curve set;
  3) closing said active curve set in accordance with said extrema values; and
  4) defining said solid atom in accordance with said active curve set and the length of said longest line.

19. The method of claim 7, wherein said step of defining a solid atom associated with said open curve set includes the step of processing horizontal touching curve open curve sets, said step comprising the steps of:

a) defining an open curve set XMAX line;
b) identifying a match curve, in a view set other than said current view set, which corresponds to said open curve set XMAX line in accordance with said relational constraints;
c) defining the view set comprising said match curve as the work view set;
d) in the case where said match curve is within a work view open curve set and said work view open curve set is a semi-rectangle, performing the following steps:
  1) closing said horizontal touching curve open curve set; and
  2) defining said solid atom in accordance with said match curve and said closed horizontal touching curve open curve set;
e) in the case where said work view open curve set touches said work view set boundary in two places but is not a semi-rectangle, performing the steps of:
  1) closing said work view open curve set;
  2) defining an active curve set to be said closed work view open curve set;
  3) defining an axis of rotation in accordance with said work view set;
  4) rotating said active curve set about said axis of rotation in order to place said active curve set within a plane of said work view set;
  5) defining a displacement vector in accordance with said open curve set XMAX line, said active curve set, and the thickness of said base solid;
  6) defining said solid atom in accordance with said displacement vector, said axis of rotation, and said closed work view open curve set;
f) in the case where said match curve is within a closed curve set, performing the steps of:
  1) defining an active curve set to be said closed curve set;
  2) defining an axis of rotation in accordance with said work view set;
  3) rotating said active curve set about said axis of rotation in order to place said active curve set within a plane of said work view set;
  4) defining a displacement vector in accordance with said open curve set XMAX line, said active curve set, and the thickness of said base solid; and
  5) defining said solid atom in accordance with said displacement vector, said axis of rotation, and said closed work view open curve set.

20. The method of claim 7, wherein said step of defining a solid atom associated with said open curve set includes the step of processing vertical touching curve open curve sets, said step comprising the steps of:

a) defining an open curve set YMIN line;
b) identifying a match curve, in a view set other than said current view set, which corresponds to said YMIN line in accordance with said relational constraints;
c) defining the view set comprising said match curve as the work view set;
d) in the case where said match curve is within a work view open curve set and said work view open curve set is a semi-rectangle, performing the following steps:
  1) closing said vertical touching curve open curve set; and
  2) defining said solid atom in accordance with said match curve and said closed vertical touching curve open curve set;
e) in the case where said work view open curve set touches said work view set boundary in two places but is not a semi-rectangle, performing the steps of:
  1) closing said work view open curve set;
  2) defining an active curve set to be said closed work view open curve set;
  3) defining an axis of rotation in accordance with said work view set;
  4) rotating said active curve set about said axis of rotation in order to place said active curve set within a plane of said work view set;
  5) defining a displacement vector in accordance with said open curve set YMIN line, said active curve set, and the thickness of said base solid;
  6) defining said solid atom in accordance with said displacement vector, said axis of rotation, and said closed work view open curve set;
f) in the case where said match curve is within a closed curve set, performing the steps of:
  1) defining an active curve set to be said closed curve set;
  2) defining an axis of rotation in accordance with said work view set;
  3) rotating said active curve set about said axis of rotation in order to place said active curve set within a plane of said work view set;
  4) defining a displacement vector in accordance with said open curve set YMIN line, said active curve set, and a thickness of said base solid; and
  5) defining said solid atom in accordance with said displacement vector, said axis of rotation, and said closed work view open curve set.

21. The method of claim 7, wherein said step of defining a solid atom associated with said open curve set includes the step of processing oblique touching curve open curve sets, said step comprising the steps of:
   a) defining an open curve set end line;
   b) identifying a match curve, in a view set other than said current view set, which corresponds to said end line in accordance with said relational constraints;
   c) defining a view set comprising said match curve as the work view set;
   d) in the case where said match curve is within a work view open curve set and said work view open curve set is a semi-rectangle, performing the following steps:
      1) closing said horizontal touching curve open curve set; and
      2) defining said solid atom in accordance with said match curve and said closed oblique touching curve open curve set;
   e) in the case where said work view open curve set touches the work view set boundary in two places but is not a semi-rectangle, performing the steps of:
      1) closing said work view open curve set;
      2) defining an active curve set to be said closed work view open curve set;
      3) defining an axis of rotation in accordance with said work view set;
      4) rotating said active curve set about said axis of rotation in order to place said active curve set within a plane of said work view set;
      5) defining a displacement vector in accordance with said open curve set XMAX line, said active curve set, and a thickness of said base solid;
      6) defining said solid atom in accordance with said displacement vector, said axis of rotation, and said closed work view open curve set;
   f) in the case where said match curve is within a closed curve set, performing the steps of:
      1) defining an active curve set to be said closed curve set;
      2) defining an axis of rotation in accordance with said work view set;
      3) rotating said active curve set about said axis of rotation in order to place said active curve set within a plane of said work view set;
      4) defining a displacement vector in accordance with said open curve set XMAX line, said active curve set, and the thickness of said base solid; and
      5) defining said solid atom in accordance with said displacement vector, said axis of rotation, and said closed work view open curve set.

* * * * *